United States Patent
Haitani et al.

(10) Patent No.: US 11,593,871 B1
(45) Date of Patent: Feb. 28, 2023

(54) VIRTUALLY MODELING CLOTHING BASED ON 3D MODELS OF CUSTOMERS

(71) Applicant: Amazon Technologies, Inc., Seattle, WA (US)

(72) Inventors: Robert Yuji Haitani, Seattle, WA (US); William R. Hazlewood, Seattle, WA (US); Alaa-Eddine Mendili, Seattle, WA (US); Dominick Khanh Pham, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 16 days.

(21) Appl. No.: 17/129,674

(22) Filed: Dec. 21, 2020

Related U.S. Application Data

(63) Continuation of application No. 15/608,902, filed on May 30, 2017, now abandoned.

(Continued)

(51) Int. Cl.
*G06Q 30/06* (2012.01)
*G06Q 30/0601* (2023.01)
(Continued)

(52) U.S. Cl.
CPC ....... *G06Q 30/0643* (2013.01); *G02B 27/017* (2013.01); *G06F 1/1686* (2013.01);
(Continued)

(58) Field of Classification Search
CPC ............ G06Q 30/0643; G06Q 30/0633; A63F 2300/5553; G06T 19/006; G06V 40/20; G06F 21/31
(Continued)

(56) References Cited

U.S. PATENT DOCUMENTS 5,880,731 A 3/1999 Liles et al.
7,184,047 B1 2/2007 Crampton
(Continued)

FOREIGN PATENT DOCUMENTS

JP 2006338167 A * 12/2006 ............... G06T 3/00

OTHER PUBLICATIONS

Kim, Dong-Eun, "Psychophysical testing of garment size variation using three-dimensional virtual try-on technology"; published Mar. 2016 in Textile Research Journal86.4: 365-379. Sage Publications Ltd., retrieved on May 2, 2022.*

(Continued)

*Primary Examiner* — Yogesh C Garg
(74) *Attorney, Agent, or Firm* — Athorus, PLLC

(57) ABSTRACT

Three-dimensional models (or avatars) may be defined based on imaging data captured from a customer. The avatars may be based on a virtual mannequin having one or more dimensions in common with the customer, a body template corresponding to the customer, or imaging data captured from the customer. The avatars are displayed on displays or in user interfaces and used for any purpose, such as to depict how clothing will appear or behave while being worn by a customer alone or with other clothing. Customers may drag-and-drop images of clothing onto the avatars. One or more of the avatars may be displayed on any display, such as a monitor or a virtual reality headset, which may depict the avatars in a static or dynamic mode. Images of avatars and clothing may be used to generate print catalogs depicting the appearance or behavior of the clothing while worn by the customer.

20 Claims, 31 Drawing Sheets

Related U.S. Application Data

(60) Provisional application No. 62/491,169, filed on Apr. 27, 2017.

(51) Int. Cl.

| | | |
|---|---|---|
| *G06F 1/16* | (2006.01) | |
| *G06F 21/31* | (2013.01) | |
| *G02B 27/01* | (2006.01) | |
| *G06F 3/14* | (2006.01) | |
| *G06T 19/00* | (2011.01) | |
| *G06V 40/20* | (2022.01) | |

(52) U.S. Cl.
CPC ............ *G06F 3/1407* (2013.01); *G06F 21/31* (2013.01); *G06T 19/006* (2013.01); *G06V 40/20* (2022.01); *A63F 2300/5553* (2013.01); *G06Q 30/0633* (2013.01)

(58) Field of Classification Search
USPC ........................................................ 705/27.2
See application file for complete search history.

(56) References Cited

U.S. PATENT DOCUMENTS

| | | |
|---|---|---|
| 9,477,980 B2 | 10/2016 | Zagel et al. |
| 9,827,714 B1 | 11/2017 | Ruxton et al. |
| 9,996,981 B1 | 6/2018 | Tran et al. |
| 10,152,829 B2 | 12/2018 | Jeong et al. |
| 10,204,448 B2 | 2/2019 | Hazeghi et al. |
| 10,210,544 B2 | 2/2019 | Zabaneh |
| 10,282,902 B1 | 5/2019 | Mishra et al. |
| 10,417,825 B2 | 9/2019 | Zagel et al. |
| 10,460,525 B1 | 10/2019 | Buuck et al. |
| 2001/0026272 A1 | 10/2001 | Feld et al. |
| 2008/0097975 A1 | 4/2008 | Guay et al. |
| 2009/0018926 A1 | 1/2009 | Buehlman |
| 2009/0089186 A1 | 4/2009 | Paolini |
| 2010/0026809 A1 | 2/2010 | Curry |
| 2011/0022965 A1 | 1/2011 | Lawrence et al. |
| 2011/0298897 A1 | 12/2011 | Sareen et al. |
| 2012/0095589 A1 | 4/2012 | Vapnik |
| 2012/0299912 A1 | 11/2012 | Kapur et al. |
| 2012/0306876 A1 | 12/2012 | Shotton et al. |
| 2012/0316985 A1 | 12/2012 | Wilkinson et al. |
| 2013/0060610 A1 | 3/2013 | McGurk |
| 2013/0179288 A1 | 7/2013 | Moses et al. |
| 2014/0063056 A1 | 3/2014 | Zhong |
| 2014/0176565 A1* | 6/2014 | Adeyoola ........... G06F 3/04817 345/473 |
| 2014/0180864 A1 | 6/2014 | Orlov et al. |
| 2014/0249961 A1 | 9/2014 | Zagel et al. |
| 2014/0282137 A1 | 9/2014 | Lin et al. |
| 2014/0316546 A1 | 10/2014 | Walsh et al. |
| 2015/0035820 A1 | 2/2015 | Le et al. |
| 2015/0055085 A1 | 2/2015 | Fonte et al. |
| 2015/0085184 A1* | 3/2015 | Vidal ................... H04N 5/2252 348/376 |
| 2015/0102526 A1 | 4/2015 | Ward et al. |
| 2015/0120496 A1 | 4/2015 | Watson |
| 2015/0123973 A1 | 5/2015 | Larsen |
| 2015/0154691 A1 | 6/2015 | Curry et al. |
| 2015/0248583 A1 | 9/2015 | Sugita et al. |
| 2015/0250420 A1 | 9/2015 | Longinotti-Buitoni et al. |
| 2015/0269282 A1 | 9/2015 | Nelatur et al. |
| 2015/0324103 A1 | 11/2015 | Tepmongkol et al. |
| 2015/0379623 A1 | 12/2015 | Gadre et al. |
| 2016/0021936 A1 | 1/2016 | Delano |
| 2016/0035061 A1 | 2/2016 | Gadre et al. |
| 2016/0063588 A1 | 3/2016 | Gadre et al. |
| 2016/0155186 A1 | 6/2016 | Su et al. |
| 2016/0180391 A1 | 6/2016 | Zabaneh |
| 2016/0180419 A1 | 6/2016 | Adeyoola et al. |
| 2016/0180449 A1 | 6/2016 | Naware et al. |
| 2016/0196687 A1 | 7/2016 | Alpert et al. |
| 2016/0210602 A1 | 7/2016 | Siddique et al. |
| 2017/0004568 A1 | 1/2017 | Radner |
| 2017/0004657 A1 | 1/2017 | Zagel et al. |
| 2017/0046868 A1 | 2/2017 | Chernov et al. |
| 2017/0124747 A1 | 5/2017 | Knowlton |
| 2017/0173262 A1 | 6/2017 | Veltz |
| 2017/0278272 A1 | 9/2017 | Ravindra |
| 2017/0285345 A1 | 10/2017 | Ferens et al. |
| 2017/0316617 A1 | 11/2017 | Jeong et al. |
| 2018/0130112 A1 | 5/2018 | Gerson |
| 2018/0173945 A1 | 6/2018 | Wang et al. |
| 2019/0272586 A1 | 9/2019 | Huang et al. |

OTHER PUBLICATIONS

Bogo et al., "FAUST: Dataset and Evaluation for 3D Mesh Registration", Proceedings at IEEE Conference on Computer Vision and Pattern Recognition; Jun. 2014.; extracted from Google.com on Sep. 16, 2019.

Dayrit, Fabian Lorenzo, et al. "Increasing Pose Comprehension Through Augmented Reality Reenactment"; Published online: Dec. 7, 2015 ; © Springer Science+Business Media New York 2015; extracted from Dialog Solutions on Feb. 4, 2020.

Li, J. et al. "Fitting 3D Garment Models onto Individual Human Models"; printed in Computer and Graphics issue Dec. 2010; extracted from Google.com on Sep. 16, 2019.

\* cited by examiner

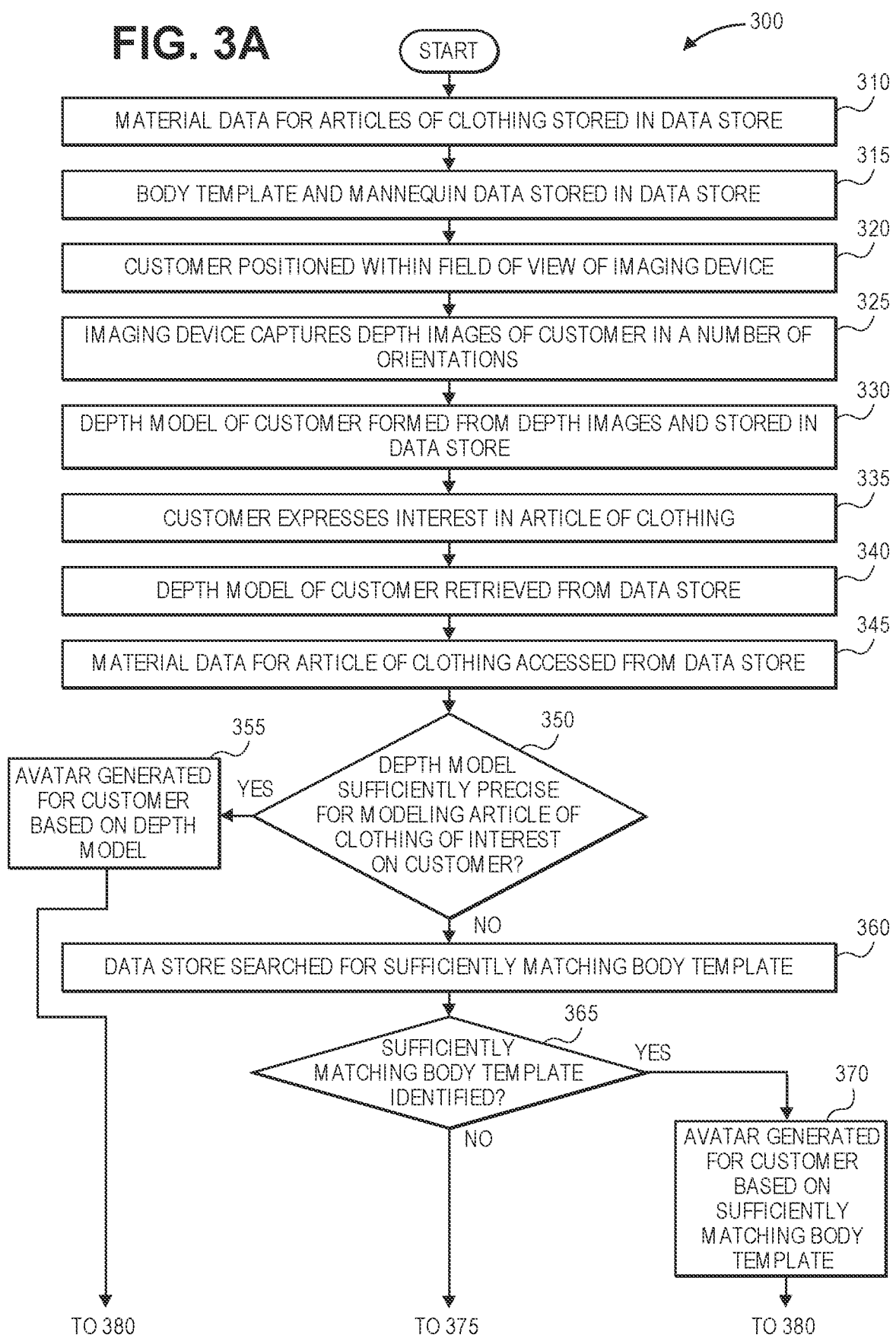

VIRTUALLY MODELING CLOTHING BASED ON 3D MODELS OF CUSTOMERS

CROSS-REFERENCE TO RELATED APPLICATIONS

This application is a continuation of U.S. patent application Ser. No. 15/608,902, filed May 30, 2017, which claims priority to U.S. Patent Application No. 62/491,169, filed Apr. 27, 2017. The contents of each of these applications are incorporated by reference herein in their entireties.

BACKGROUND

Electronic marketplaces enable customers to search for or browse information regarding items that are available for purchase from a variety of sources and in a variety of ways through one or more network pages or sites. For example, an electronic marketplace may offer items for sale that it owns and controls, as well as items that are owned by sellers, via one or more web pages or web sites. Electronic marketplaces typically provide information regarding such items to customers via network pages or sites that are accessible to networked computing devices of any type or form.

Over the last several decades, advancements in Internet programming and network connectivity have greatly enhanced the breadth and quality of information that an electronic marketplace may provide to customers regarding a seemingly endless variety of items, including both goods and services. Such marketplaces now provide electronic portals from which customers may review and compare information in the form of text, images, audio or video regarding such items from every corner of the globe. Once a customer has identified one or more items of interest, he or she may order the items directly from an electronic marketplace and designate the items for delivery to the customer or other intended recipient. Over time, as a customer visits an electronic marketplace to purchase more and more items, the electronic marketplace may accumulate a variety of data or attributes regarding the customer, including information regarding his or her shopping, style and sizing preferences.

Despite the breadth of their offerings and the relative ease with which vendors and manufacturers may post items for sale thereon, and customers may purchase items therefrom, electronic marketplaces are limited in their ability to describe items to customers, as electronic marketplaces are currently limited to presenting information that may be seen and heard, but not touched. Naturally, unlike bricks-and-mortar stores, electronic marketplaces are currently unable to permit customers to "try on" or "test drive" items prior to purchasing them, in order to determine which variation or model (e.g., size) of a particular item or product is a best fit for an individual customer. Instead, customers may merely view pictures or video, or read product details or comments from other customers, regarding products or variations thereof before choosing a product or a variation. At best, an item is typically depicted on a mannequin, or on models having fantastic or unrealistic sizes, shapes or dimensions (e.g., a bodybuilder, or a "size zero" model), or in a context that is typically chosen at random, to demonstrate or illustrate one or more various features of the item, or one or more uses or applications of the item. Moreover, the same image (or images) is typically shown to every customer who visits a page corresponding to that item, even though each individual customer may visit the page with different goals in mind, or from a different location. Therefore, images of items are typically displayed on a page with a sterile or non-descript background, and without any additional features or context.

The inability to try on a particular article of clothing, or to otherwise experiment with an item prior to purchasing it, places electronic marketplaces at a disadvantage to their bricks-and-mortar counterparts. Although sizes and other indicators assigned to particular variations of items are usually standardized based on words (e.g., "large," "toddler," "jumbo") or numbers (e.g., shoe sizes) across a variety of brands of items, each brand may use such words or numbers in different ways. For example, a shirt that is a size "large" in a first brand may be the same size as an "extra large" shirt in a second brand and a "medium" shirt in a third brand. Moreover, an article of clothing is typically described with words describing its content (e.g., canvas, cashmere, cotton, fur, flannel or fleece), or method of manufacture (e.g., cross-stitched, stone-washed, screen-printed), or in vague or subjective terms regarding the way that the article feels (e.g., soft, smooth, rough). Unfortunately, customers are typically unable to physically evaluate a look and feel of an item that is offered for sale at an electronic marketplace, unless and until the article or the item is ordered and received.

To overcome these inefficiencies and uncertainty, many customers may choose to order multiple variations or models (e.g., sizes) of a single product from an electronic marketplace, even though they intend to keep just one of the variations, and return the other products to the electronic marketplace after they have chosen one variation that has the best look or fit. For example, where a customer is interested in purchasing a tie to be worn with a particular shirt, the customer may order each of the ties in which he or she might be interested from an online marketplace. When the ties arrive, the customer may try on each of the ties with the shirt. After selecting one of the ties based on its look, the customer may return each of the other ties to the electronic marketplace. Similarly, where a customer is interested in purchasing a particular coat, and ordinarily wears coats in size 42 "Long,", the customer may order coats in not only size 42 "Long," but also in sizes 42 "Regular," 44 "Regular" or 40 "Long" from an online marketplace. When the four coats arrive, the customer may try on each of the coats in order to determine which of the coats is the best fit. After selecting one of the coats based on its fit, the customer may return each of the other three coats to the electronic marketplace. Such scenarios may create challenges for an electronic marketplace, which must deliver multiple ties or coats and then return all but one of the ties or coats to stock while only receiving payment for one tie and one coat. Such scenarios may result in a fluctuating account of available inventory at an electronic marketplace being provided to other customers, and increase the cost of doing business where the electronic marketplace offers incentives such as free shipping in order to lure customers from bricks-and-mortar stores. For example, where a customer orders three pairs of shoes and returns two, the electronic marketplace may ultimately pay the cost for shipping five pairs of shoes, but profit from a sale of just one pair.

BRIEF DESCRIPTION OF THE DRAWINGS

FIGS. 3A and 3B are a flow chart of one process in accordance with embodiments of the present disclosure.

DETAILED DESCRIPTION

As is set forth in greater detail below, the present disclosure is directed to virtually presenting articles of clothing to customers. More specifically, some embodiments of the present disclosure are directed to capturing imaging data (e.g., visual imaging data and depth imaging data) from customers through the use of imaging devices in their homes or other locations, and determining physical characteristics of such customers, such as one or more surface or skeletal features, based on the imaging data. Subsequently, an avatar representative of the physical characteristics of the customer may be generated based on the quality and extent of imaging data obtained from the customer. In some embodiments, an avatar may be generic in nature, such as a virtual equivalent of a mannequin, a stick figure or another artifact that mimics or corresponds to one of a plurality of attributes, dimensions or features of a customer, as determined based on the imaging data. In other embodiments, an avatar may correspond to one of a plurality of body templates that more closely mimics the actual body of the customer, as determined based on the imaging data. In still other embodiments, an avatar may be custom-generated for the customer based on the imaging data.

Additionally, using material data for each of a plurality of items, including data representative of not only their colors or textures but also their physical properties (e.g., strengths in tension, compression or shear, friction coefficients, Young's moduli, shear moduli, Poisson ratios, sizes, shapes or dimensions), virtual representations of clothing in specific models or sizes may be mapped to the avatars and displayed to a customer in a manner that predicts or replicates a look or a fit of the clothing in the specific models or sizes on the customer. The virtual representations of the clothing on the avatars may be depicted on a traditional two-dimensional display of a desktop, a laptop or a mobile device, or on a television or any other display, a three-dimensional display, in a virtual reality system (e.g., a headset), or even in print. The virtual representations may include static representations, or still images of specific articles of clothing on avatars, as well as dynamic representations, or moving images of one or more articles of clothing on avatars. By depicting clothing on avatars that are generated based on imaging data captured from customers, a more accurate representation of how a specific article of clothing will look or fit on a given customer may be obtained and shown to the customer, who is then able to make better and more well-informed decisions based on the representation. The representations may be shown with additional information or data and in any context, and may feature articles of clothing in which the customer is known or believed to be interested, as well as articles of clothing that the customer is known or believed to own.

Figure 1A:
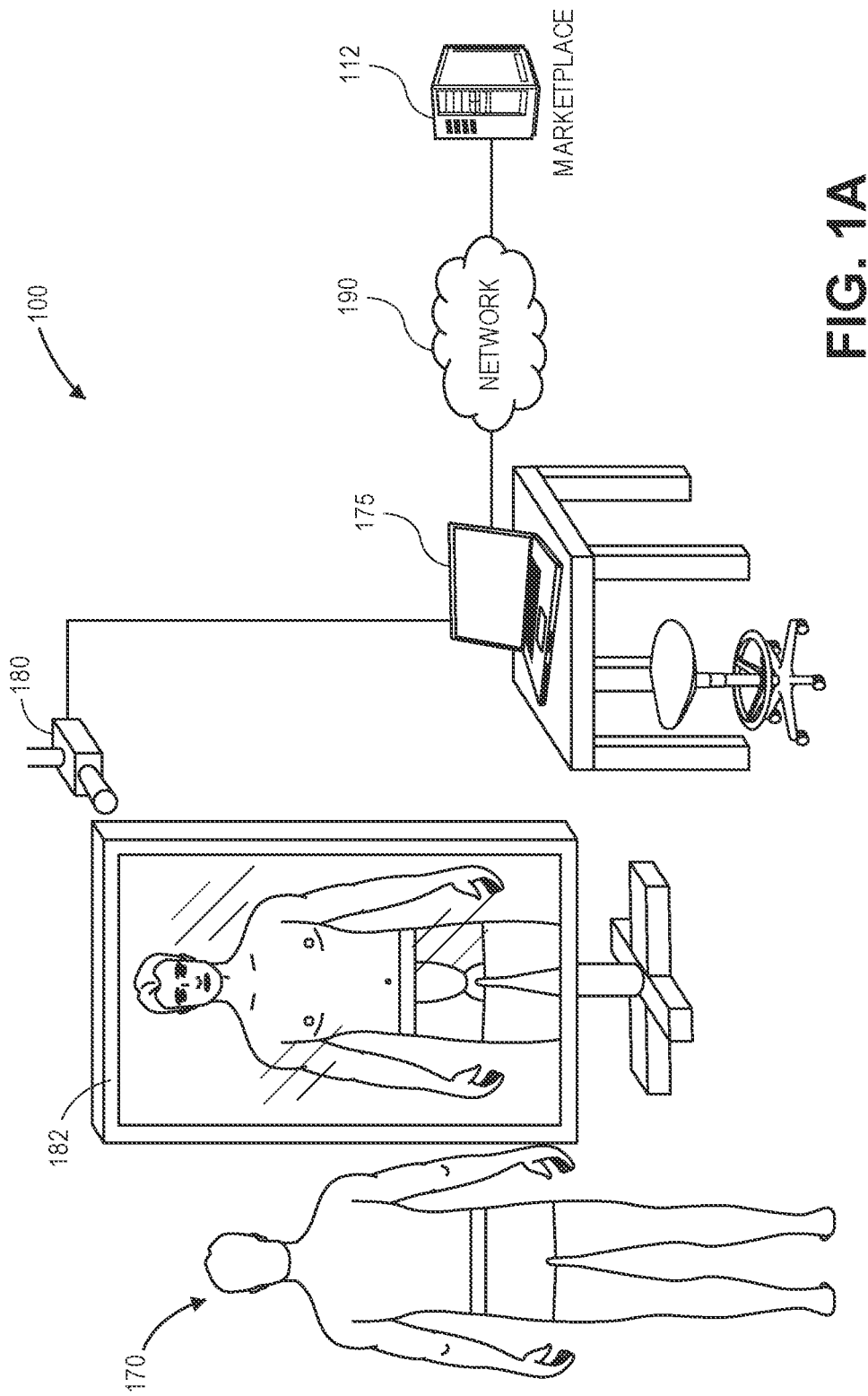
FIGS. 1A through 1H are views of aspects of a system in accordance with embodiments of the present disclosure.

Referring to FIGS. 1A through 1H, views of aspects of one system 100 in accordance with embodiments of the present disclosure are shown. The system 100 includes a marketplace server 112, a personal computer 175 and a depth sensing camera 180. The marketplace server 112 and the personal computer 175 are connected to one another by wired or wireless means over a network 190, which may include the Internet in whole or in part. The personal computer 175 may be a desktop computer, a laptop computer, a tablet computer or any other network-connected personal computing device having one or more processors. The depth sensing camera 180 is connected to the personal computer 175 by wired or wireless means, e.g., by a cable or according to one or more wireless protocols such as Bluetooth® or Wireless Fidelity ("Wi-Fi"). Alternatively, the depth sensing camera 180 may be configured with one or more processors or other components for connecting directly to the network 190 by wired or wireless means. The depth sensing camera 180 may be any imaging device configured to determine ranging information with respect to a lens or imaging sensor, such as any time-of-flight range sensor or other like device. As is shown in FIG. 1A, a customer 170 stands in front of a mirror 182, within a field of view of the depth sensing camera 180. The customer 170 is wearing an undergarment, e.g., a pair of boxer shorts or boxer briefs.

Figure 1B:
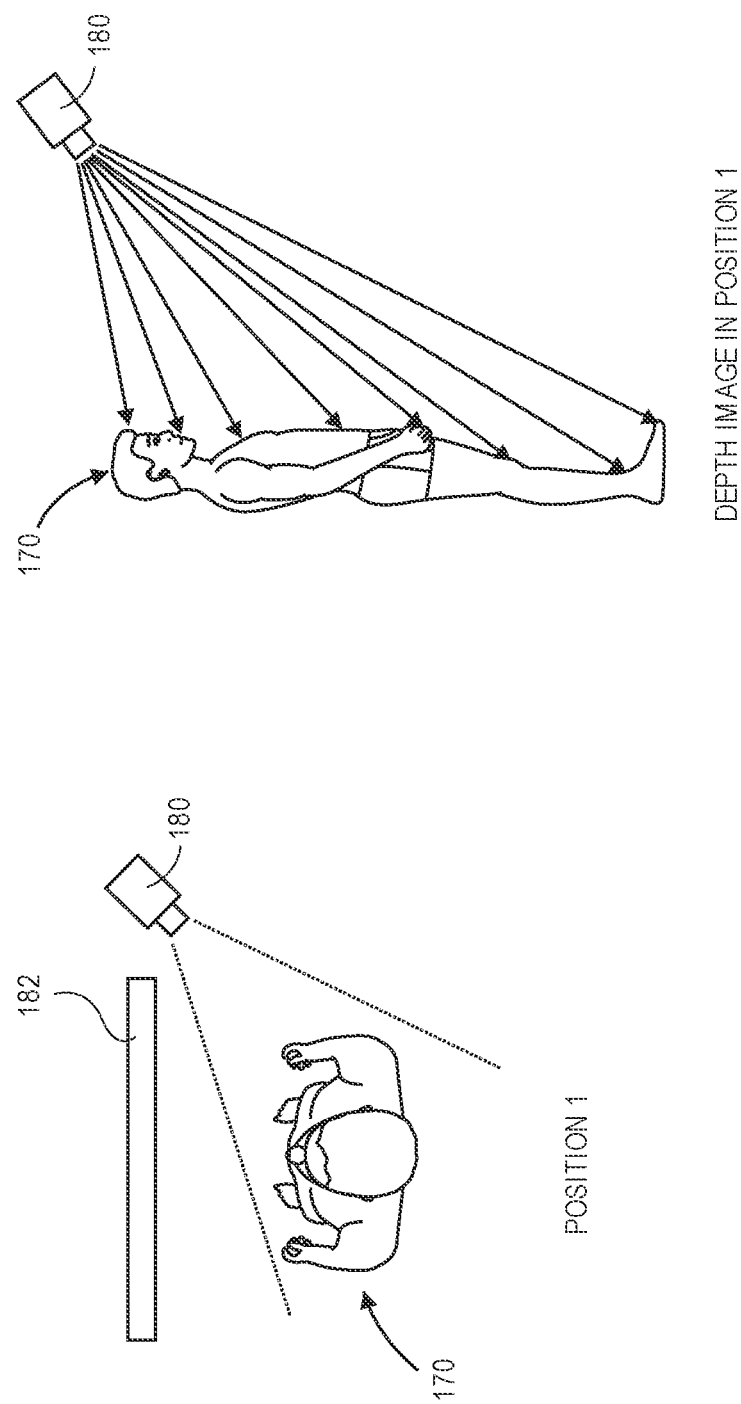
Figure 1C:
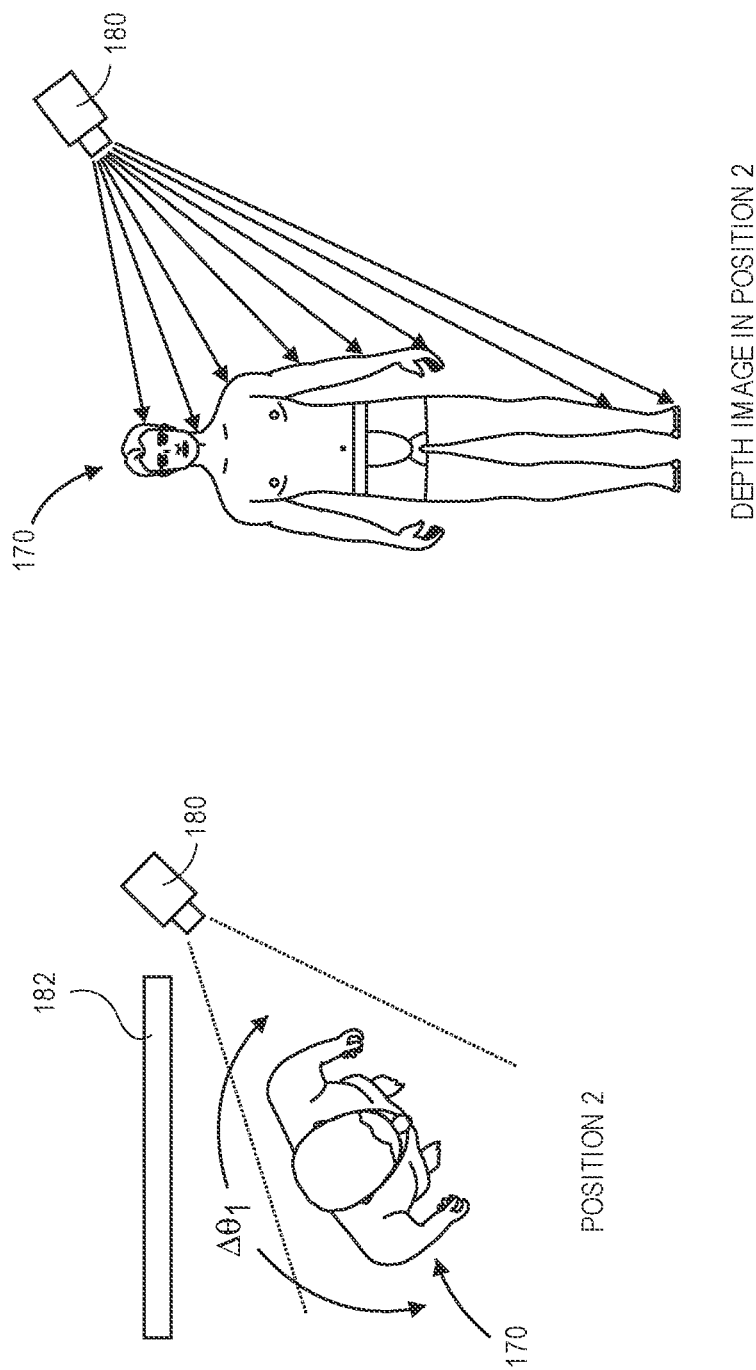
Figure 1D:
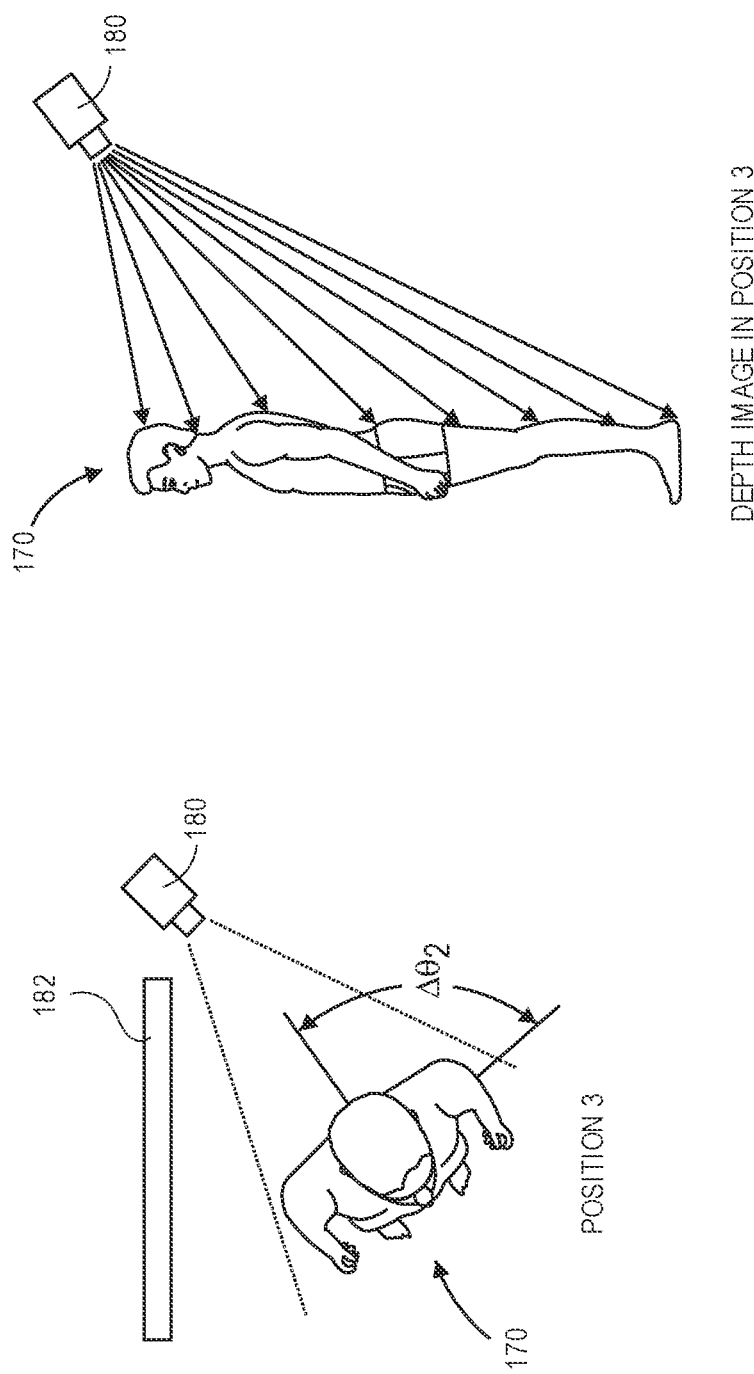

In accordance with the present disclosure, depth imaging data (e.g., one or more depth images, depth data or ranging data) and/or visual imaging data (e.g., one or more color images or other visual images) may be captured from a customer who stands in a number of poses, executes a number of gestures, or otherwise repositions himself or herself within a field of view of a depth sensing camera. The depth imaging data may then be used to determine information regarding surface features of the customer 170. For example, depth imaging data captured using the depth sensing camera 180 may be used to define a three-dimensional model of the customer 170. By wearing a limited amount of clothing, e.g., the undergarment shown in FIG. 1A, and by repositioning himself or herself within the field of view, such as with one or more gestures, motions, turns, pivots or twirls, the customer 170 may ensure that any depth or ranging information captured by the depth sensing camera 180 represents surface and/or skeletal features of the customer 170 to a sufficiently accurate degree. For example, as is shown in FIG. 1B, a first depth image is captured from the customer 170 in a first position. As is shown in FIG. 1C, a second depth image is captured from the customer 170 in a second position after rotating about an axis by an angle of $\Delta\theta_1$ within the field of view of the depth sensing camera 180. As is shown in FIG. 1D, a third depth image is captured from the customer 170 in a third position, after rotating about the axis by an angle of $\Delta\theta_2$.

Figure 1E:
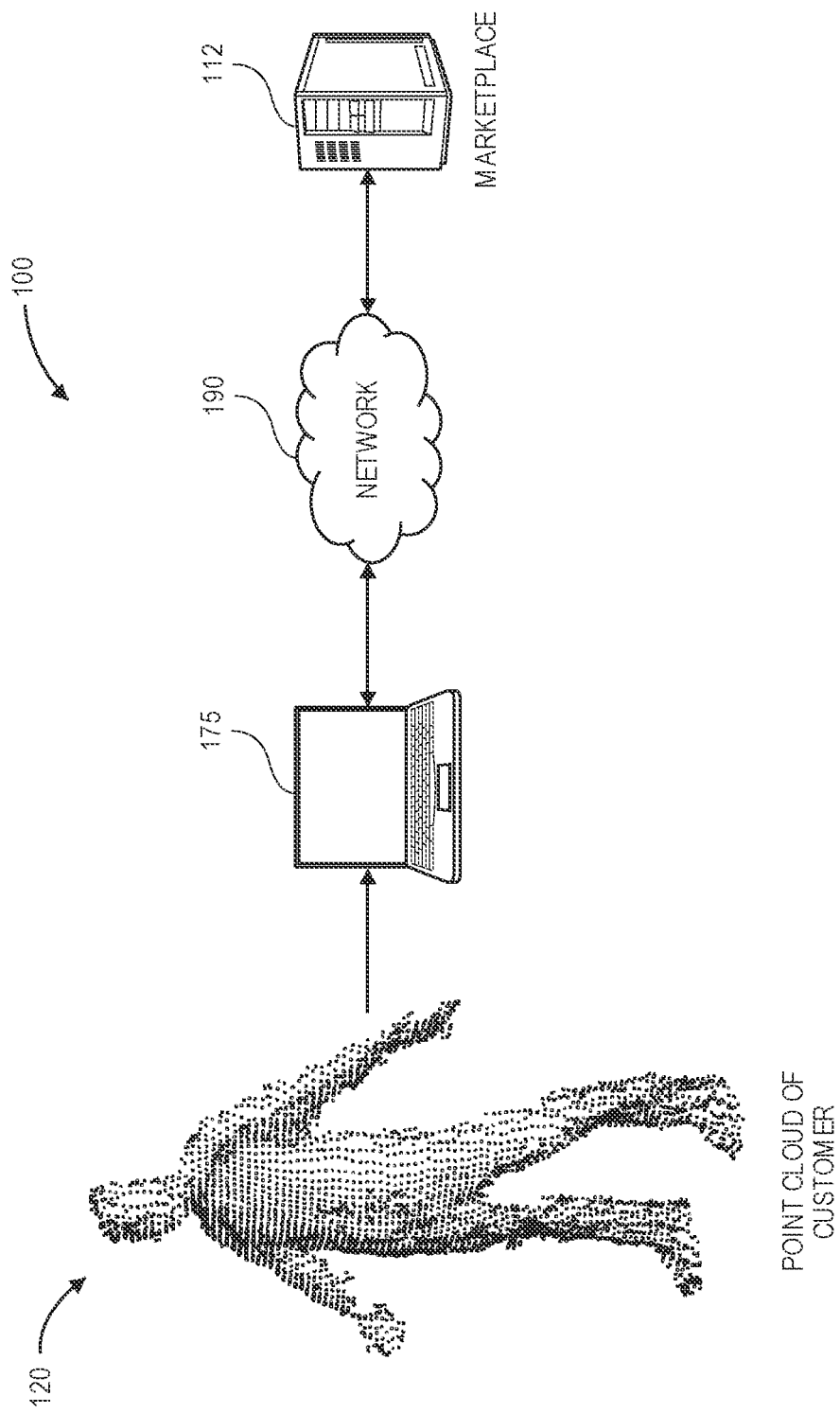

As is shown in FIG. 1E, after the depth sensing camera 180 has captured the depth images of the customer 170, a point cloud 120 or another model of the customer 170 may be generated by the personal computer 175 and transmitted to the marketplace server 112 over the network 190. The point cloud 120 may be stored on the marketplace server 112 or in one or more other data stores and associated with the customer 170, e.g., in a profile of data corresponding to the customer 170. In some embodiments, the point cloud 120 may be defined as an individual grouping of data points corresponding to external surfaces of the customer 170, with each point having a set of coordinates corresponding to a unique point on an external surface of the customer 170. Alternatively, the depth images may be transmitted to the marketplace server 112, e.g., over the network 190, and the point cloud 120 may be generated by the marketplace server 112 and stored thereon or in one or more other data stores.

Figure 1F:
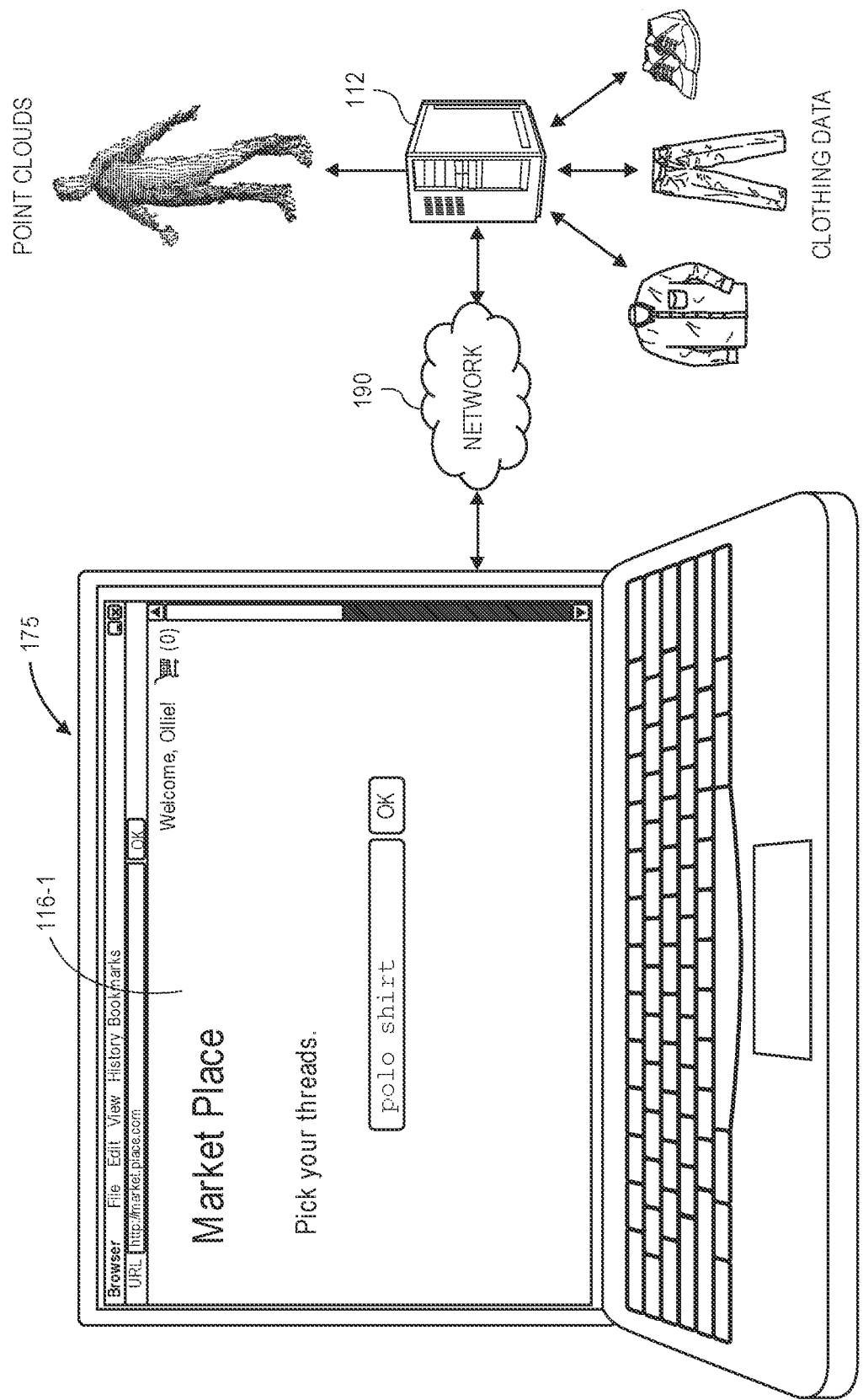

As is shown in FIG. 1F, after the point cloud 120 has been generated and associated with the customer 170, e.g., in real time, in near-real time, or at a later time, the customer 170 may access one or more network pages 116-1 hosted by the marketplace server 112 or otherwise associated with an electronic marketplace. The marketplace server 112 may have a variety of data regarding clothing or, alternatively, one or more other items stored thereon. Additionally, the marketplace server 112 may have a plurality of point clouds or other models of customers, including the customer 170, stored thereon. As is shown in FIG. 1F, the customer 170 may enter a keyword (viz., "polo shirt") into a text box at the network page 116-1 via the personal computer 175, or any other computer device that is configured to access the marketplace server 112 via the network 190 either directly or indirectly. Alternatively, the customer 170 may select or otherwise designate a category of items at a network page having icons, links or drop-down menus listing or representing such categories thereon. In some other embodiments, the customer 170 may enter the keyword or select a category at a page or interface provided by a dedicated application (e.g., a shopping application) operating on a computer device such as a smartphone or tablet computer, or verbally specify the keyword or the category with one or more audible commands, e.g., to a smart speaker or mobile device that is configured to access the Internet or one or more other networks and to interpret such commands accordingly.

Figure 1G:
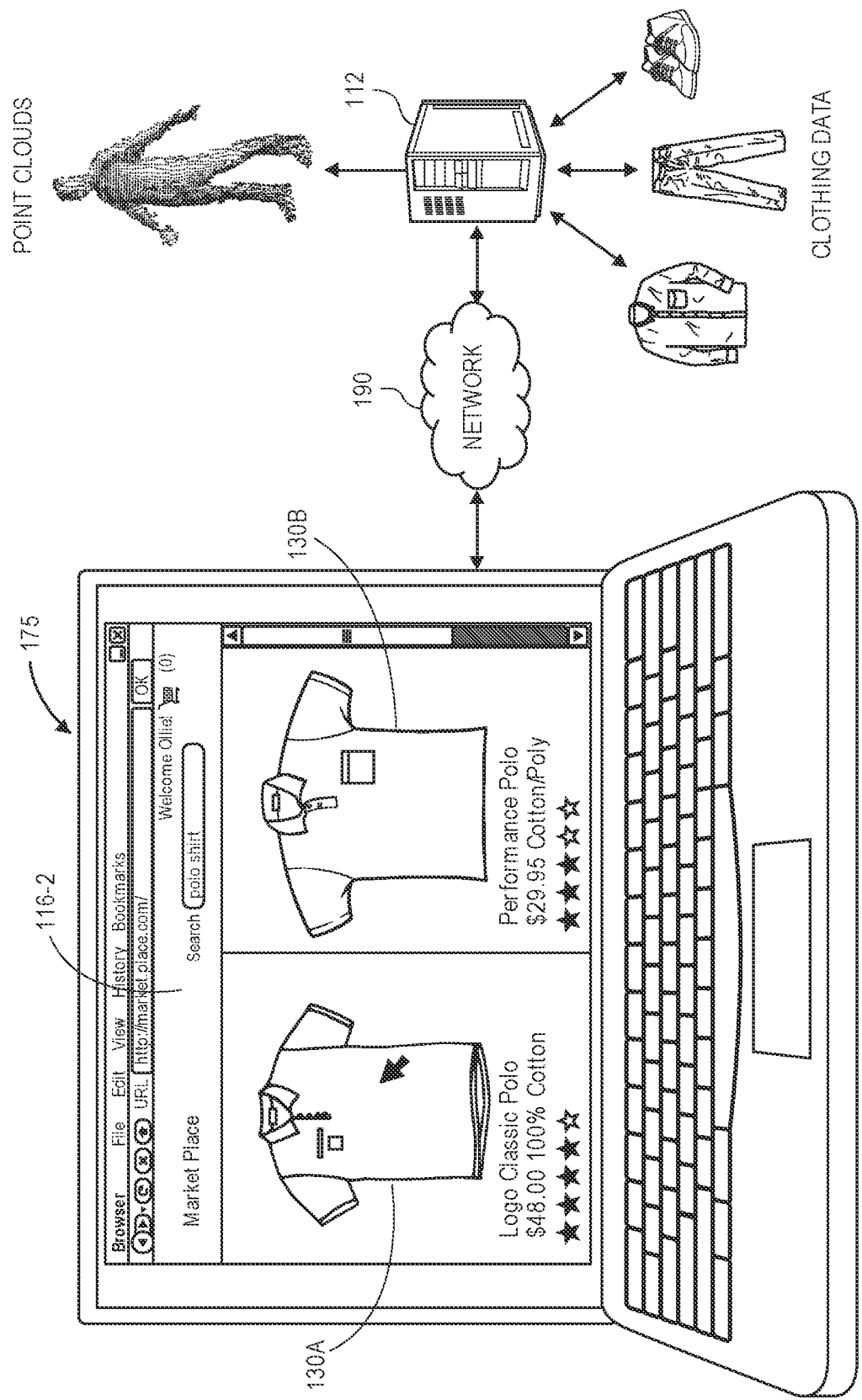
Figure 1H:
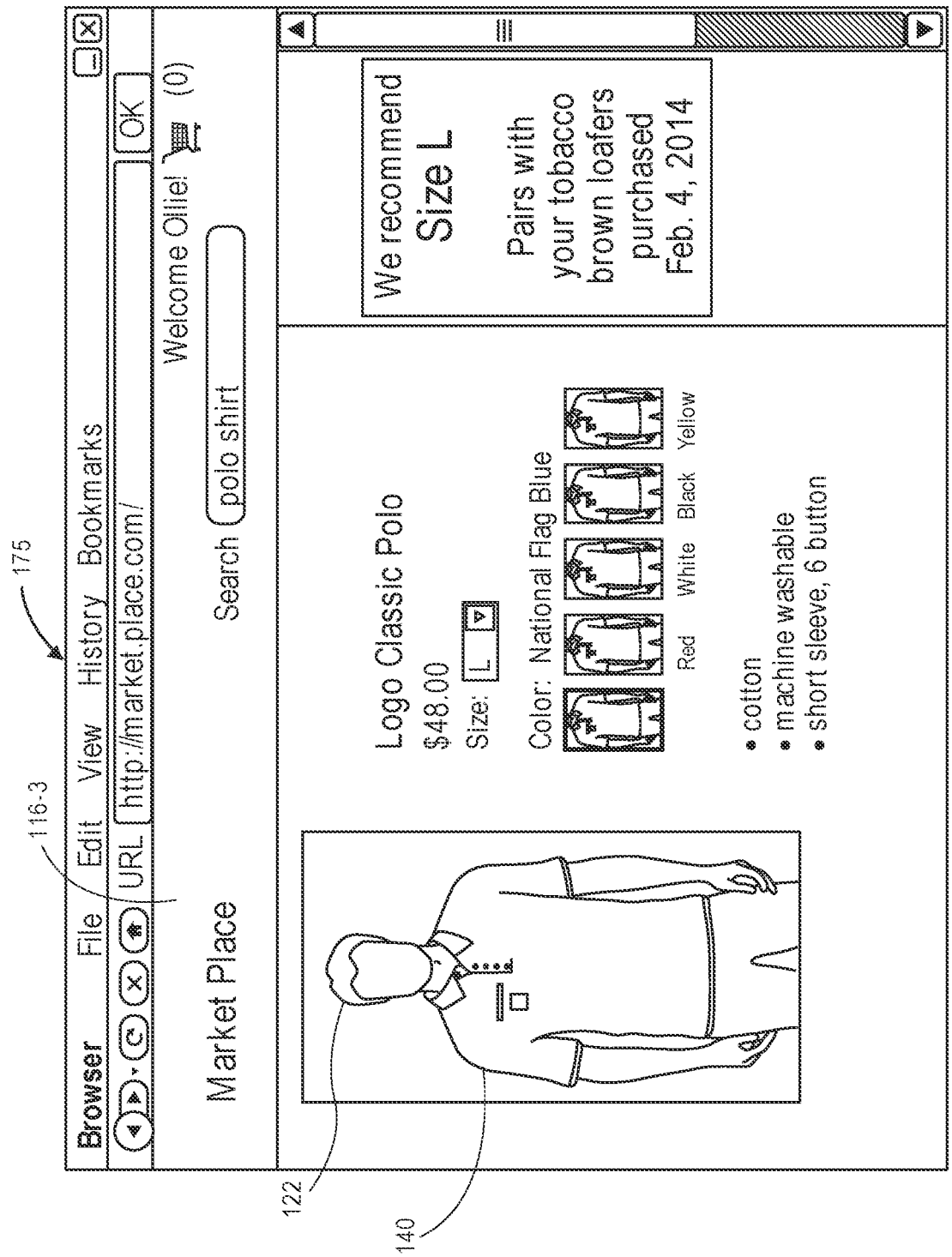

As is shown in FIG. 1G, the marketplace server 112 may identify a plurality of items 130A, 130B (e.g., polo shirts) in response to the entry of the keyword at the network page 116-1, and may display a network page 116-2 including information or data regarding such items 130A, 130B (e.g., names, images, prices, details, customer ratings and/or any number of other interactive features). After the customer 170 selects the item 130A shown on the network page 116-2, a network page 116-3 including a plurality of details regarding the item 130A is displayed, as is shown in FIG. 1H. The network page 116-3 further depicts a visual representation 140 of the item 130A on an avatar 122 of the customer 170 that is derived based on the point cloud 120. The visual representation 140 of the item 130A is determined based on material properties of the components of the item 130A, including but not limited to tensile, compression and shear properties of one or more aspects of the item 130A, such as stitches, cuts, slots, buttons or other fasteners, as well as colors of the item 130A, or any other properties that would impact how the item 130A appears when the item 130A is worn by the customer 170, including the extent to which the item 130A would hang or be stretched taut around one or more body parts of the customer 170. For example, the avatar 122 may be formed by generating a mesh of the customer 170 from the point cloud 120, and by superimposing a texture upon the mesh. In some embodiments, the texture may take the form of a standard color that masks out skin tone or omits facial features, but results in an approximation of a body type of the customer 170. Alternatively, a body template that is consistent with one or more physical properties of the customer 170 may be selected. Where sufficiently robust depth information is available, such as where the point cloud 120 includes a sufficiently large number of accurately placed points, the avatar 122 may represent the actual body of the customer 170 and, in some embodiments, visual imaging data corresponding to the customer 170 (e.g., visual images of skin, hair, or other surface features of the customer 170) may be mapped onto the avatar 122.

Accordingly, the systems and methods of the present disclosure may utilize depth imaging data and/or visual imaging data to generate three-dimensional models or avatars of customers, and to display recommended items, or items of interest, to the customer on one or more displays, including but not limited to displays of desktop computers, laptop computers, mobile devices (e.g., smartphones, tablet computers, wristwatches, wearable augmented reality glasses), televisions or any other two-dimensional displays, three-dimensional displays, in a virtual reality system (e.g., a headset), or in print. The systems and methods disclosed herein enable customers to virtually "try on" articles of clothing prior to purchasing them from an electronic marketplace, and to select from one or more models or sizes of clothing without having to set foot in a bricks-and-mortar retailer. The systems and methods disclosed herein further enable electronic marketplaces or bricks-and-mortar retailers to customize their electronic or print marketing materials by including images depicting articles of clothing being worn by avatars of models having sizes, shapes or dimensions that are consistent with those of a given customer, or on an avatar modeled after the customer himself or herself. The images may be further presented in a context that is unique to a customer, or to an intended use for an item, or in any other manner.

Electronic marketplaces (e.g., online marketplaces) offer a wide variety of advantages to customers. For example, customers may access an electronic marketplace from a browser or another application operating on any type or form of computing device, and may view and evaluate text or images regarding an item (e.g., details, specifications, reviews or other information) prior to ordering the item and designating where the item is to be delivered, from any location where networked access to the electronic marketplace may be available. Where an electronic marketplace is affiliated with a number of fulfillment centers, warehouses or other storage and distribution facilities in various locations, or specific merchants or retailers, the electronic marketplace may effectively distribute items to customers on short notice.

Purchasing articles of clothing is an inherently personal process, as each customer has a unique body size, shape and dimensions, and different styles or personal interests. Because articles of clothing come into contact with a person's body by design, the desirability of a given article of clothing for a given customer is a multivariable determination that depends not only on a customer's body composition but also his or her individual tastes and a context in which he or she intends to use the article of clothing, and typically may only be resolved with certainty by having the customer try an article on, e.g., in a fitting room, either separately or with one or more additional items, or with the in-person advice of friends, family members or other personnel (e.g., "personal shoppers"). While an electronic marketplace may connect with customers in any location on the planet, most electronic marketplaces currently do not provide a "fitting room" from which a customer may evaluate a look and a fit of a given article of clothing prior to purchasing it. Although some electronic marketplaces, like many bricks-and-mortar retailers, show images of articles of clothing being worn by mannequins or human models, the shapes, sizes and dimensions of the mannequins and the human models rarely match those of an average customer.

Those of ordinary skill in the pertinent arts will recognize that imaging data, e.g., visual imaging data, depth imaging data, infrared imaging data, or imaging data of any other type or form, may be captured using one or more imaging devices such as digital cameras, depth sensors, range cameras, infrared cameras or radiographic cameras. Such devices generally operate by capturing light that is reflected from objects, and by subsequently calculating or assigning one or more quantitative values to aspects of the reflected light, e.g., image pixels, then generating an output based on such values, and storing such values in one or more data stores. For example, a digital camera may include one or more image sensors (e.g., a photosensitive surface with a plurality of pixel sensors provided thereon), having one or more filters associated therewith. Such sensors may detect information regarding aspects of any number of image pixels of the reflected light corresponding to one or more base colors (e.g., red, green or blue) of the reflected light, or distances to objects from which the light was reflected. Such sensors may then generate data files including such information, and store such data files in one or more onboard or accessible data stores (e.g., a hard drive or other like component), or in one or more removable data stores (e.g., flash memory devices). Such data files may also be printed, displayed on one or more broadcast or closed-circuit television networks, or transmitted over a computer network as the Internet.

An imaging device that is configured to capture and store visual imaging data (e.g., visual images, or color images) is commonly called an RGB ("red-green-blue") imaging device (or camera), while an imaging device that is configured to capture both visual imaging data and depth imaging data (e.g., depth images, or ranges) is commonly referred to as an RGBD or RGBz imaging device (or camera). Imaging data files may be stored in any number of formats, including but not limited to JPEG or JPG files, or Graphics Interchange Format (or ".GIF"), Bitmap (or ".BMP"), Portable Network Graphics (or ".PNG"), Tagged Image File Format (or ".TIFF") files, Audio Video Interleave (or ".AVI"), QuickTime (or ".MOV"), Moving Picture Experts Group (or ".MPG," ".MPEG" or ".MP4") or Windows Media Video (or ".WMV") files. A visual image may be an image channel or file captured from a scene by an imaging device, with the visual image including a plurality of pixels, and each of the pixels representing one or more color values for visible light captured by an image sensor from a portion of the scene that corresponds to one of the pixels (e.g., black-and-white, grayscale, or color according to any standard or color model, such as RGB, CMYK or the like). A depth image may be an image channel or file captured from a scene by an imaging device, with the depth image including a plurality of pixels, and each of the pixels representing a range or distance from an image sensor to a portion of the scene that corresponds to one of the pixels. Alternatively, any other type of imaging data may be captured by imaging devices and utilized in accordance with one or more embodiments of the present disclosure, including but not limited to infrared images, radiographic images or any other representations of captured light.

A point cloud (or depth model) of an object may be defined based on one or more depth images. A point cloud may be a representation of depth data, or formed from depth data, corresponding to an object in which individual points in space that are associated with the object have coordinates defining their respective locations relative to an imaging system. A point cloud may be defined as a grouping of data points, with each point at a different location on a surface of an object. Each data point may have a set of coordinates according to a standard coordinate system (e.g., a rectangular or Cartesian coordinate system, a polar coordinate system). For example, in one embodiment, the coordinates may define a position within a Cartesian space having three orthogonal axes, e.g., an x-axis, ay-axis and a z-axis, and the coordinates may be expressed as (x, y, z) with respect to such axes. The coordinates may further include a distance value, such that for each pixel designated with an x-coordinate and a y-coordinate with respect to an imaging sensor, and the distance from the imaging sensor to an object represented by that pixel being designated with a z-coordinate.

A point cloud may be provided in an ordered form or an unordered form. Ordered point cloud data further includes a representation of a relationship between points. For example, ordered point cloud data may include a vector from one point to another, or may be expressed as a linked list of points. In some embodiments, ordered point cloud data may be uniform in spatial distribution, such as in a regularly gridded two-dimensional or three-dimensional array. Unordered point cloud data may include data points in which information about relationships between such points is not known or included. Additionally, unordered point cloud data need not be uniform in spatial distribution. For example, unordered point cloud data provided by a three-dimensional sensor may have data points which do not readily fit within a regularly gridded two-dimensional or three-dimensional array.

Reflected light may be captured or detected by an imaging device if the reflected light is within the device's field of view, which is defined as a function of a distance between a sensor and a lens within the device, viz., a focal length, as well as a location of the device and an angular orientation of the device's lens. Accordingly, where an object appears within a depth of field, or a distance within the field of view where the clarity and focus is sufficiently sharp, an imaging device may capture light that is reflected off objects of any kind to a sufficiently high degree of resolution using one or more sensors thereof, and store information regarding the reflected light in one or more data files.

Many imaging devices also include manual or automatic features for modifying their respective fields of view or orientations. For example, a digital camera may be configured in a fixed position, or with a fixed focal length (e.g., fixed-focus lenses) or angular orientation. Alternatively, an imaging device may include one or more actuated or motorized features for adjusting a position of the imaging device, or for adjusting either the focal length (e.g., a zoom level of the imaging device) or the angular orientation (e.g., the roll angle, the pitch angle or the yaw angle), by causing a change in the distance between the sensor and the lens (e.g., optical zoom lenses or digital zoom lenses), a change in the location of the imaging device, or a change in one or more of the angles defining the angular orientation.

For example, an imaging device may be hard-mounted to a support or mounting that maintains the device in a fixed configuration or angle with respect to one, two or three axes. Alternatively, however, an imaging device may be provided with one or more motors and/or controllers for manually or automatically operating one or more of the components, or for reorienting the axis or direction of the device, i.e., by panning or tilting the device. Panning an imaging device may cause a rotation within a horizontal plane or about a vertical axis (e.g., a yaw), while tilting an imaging device may cause a rotation within a vertical plane or about a horizontal axis (e.g., a pitch). Additionally, an imaging device may be rolled, or rotated about its axis of rotation, and within a plane that is perpendicular to the axis of rotation and substantially parallel to a field of view of the device.

Furthermore, some imaging devices may digitally or electronically adjust an image identified in a field of view, subject to one or more physical or operational constraints. For example, a digital camera may virtually stretch or condense the pixels of an image in order to focus or broaden the field of view of the digital camera, and also translate one or more portions of images within the field of view. Some imaging devices having optically adjustable focal lengths or axes of orientation are commonly referred to as pan-tilt-zoom (or "PTZ") imaging devices, while imaging devices having digitally or electronically adjustable zooming or translating features are commonly referred to as electronic PTZ (or "ePTZ") imaging devices.

Information and/or data regarding features or objects expressed in imaging data, including colors, textures, outlines or other aspects of the features or objects, may be extracted from the data in any number of ways. For example, colors of image pixels, or of groups of image pixels, in a digital image may be determined and quantified according to one or more standards, e.g., the RGB color model, in which the portions of red, green or blue in an image pixel are expressed in three corresponding numbers ranging from 0 to 255 in value, or a hexadecimal model, in which a color of an image pixel is expressed in a six-character code, wherein each of the characters may have a range of sixteen. Colors may also be expressed according to a six-character hexadecimal model, or #NNNNNN, where each of the characters N has a range of sixteen digits (i.e., the numbers 0 through 9 and letters A through F). The first two characters NN of the hexadecimal model refer to the portion of red contained in the color, while the second two characters NN refer to the portion of green contained in the color, and the third two characters NN refer to the portion of blue contained in the color. For example, the colors white and black are expressed according to the hexadecimal model as #FFFFFF and #000000, respectively, while the color National Flag Blue is expressed as #3C3B6E. Any means or model for quantifying a color or color schema within an image or photograph may be utilized in accordance with the present disclosure. Moreover, textures or features of objects expressed in a digital image may be identified using one or more computer-based methods, such as by identifying changes in intensities within regions or sectors of the image, or by defining areas of an image corresponding to specific surfaces.

Furthermore, edges, contours, outlines, colors, textures, silhouettes, shapes or other characteristics of objects, or portions of objects, expressed in still or moving digital images may be identified using one or more algorithms or machine-learning tools. The objects or portions of objects may be stationary or in motion, and may be identified at single, finite periods of time, or over one or more periods or durations. Such algorithms or tools may be directed to recognizing and marking transitions (e.g., the edges, contours, outlines, colors, textures, silhouettes, shapes or other characteristics of objects or portions thereof) within the digital images as closely as possible, and in a manner that minimizes noise and disruptions, and does not create false transitions. Some detection algorithms or techniques that may be utilized in order to recognize characteristics of objects or portions thereof in digital images in accordance with the present disclosure include, but are not limited to, Canny edge detectors or algorithms; Sobel operators, algorithms or filters; Kayyali operators; Roberts edge detection algorithms; Prewitt operators; Frei-Chen methods; or any other algorithms or techniques that may be known to those of ordinary skill in the pertinent arts. For example, objects or portions thereof expressed within imaging data may be associated with a label or labels according to one or more machine-learning classifiers, algorithms or techniques, including but not limited to nearest neighbor methods or analyses, artificial neural networks, factorization methods or techniques, K-means clustering analyses or techniques, similarity measures such as log likelihood similarities or cosine similarities, latent Dirichlet allocations or other topic models, or latent semantic analyses.

Virtual reality systems (or "virtual environment systems," or "virtual reality environments") provide an enhanced interface experience to users of computers, and effectively immerse the users within their respective computing environments. Virtual reality systems may include any number of monitors or other displays, as well as one or more motion sensors that may be used to track positions and/or motion of one or more limbs or other body parts. In some embodiments, virtual reality monitors, displays and/or sensors that may be worn on or about the human body. By rendering visual information in a three-dimensional orientation around a user, and tracking the user's movements or other responses to the rendered information, a virtual reality system may permit the user to physically interact with aspects of a simulated environment. Currently, virtual reality systems are used not only in graphical applications such as video games or movies but also in other computing environments or platforms such as for virtual training (e.g., for simulating the performance of expensive or complex tasks such as surgical procedures or military operations), virtual modeling (e.g., for describing planned physical structures, such as physical structures that are under construction) or like applications, with the goal of virtually simulating an actual environment to the maximum extent practicable.

Some virtual reality systems simulate a three-dimensional environment through the use of stereoscopic displays, including such displays that are provided for mounting about a human head (e.g., a headset or goggles) of an operator. For example, some virtual reality headsets include one or more display screens that may be configured to display stereoscopic imagery to each of the eyes, e.g., by displaying one image of an object to a left eye and another image of the object to a right eye. In this regard, head-mounted stereoscopic displays may enhance a virtual reality experience by defining a semblance of depth of an object based on such images, which may be independently and simultaneously captured using imaging devices having sufficiently different perspectives and subsequently displaying such images on the one or more displays.

In computer vision or graphics applications, three-dimensional objects or physical surfaces of such objects are typically described or represented using three-dimensional models that are sometimes referred to as meshes, textured meshes or polygon meshes which represent both shapes and textures of such objects. A three-dimensional model of an object typically comprises two parts: a three-dimensional representation of the object defined by vertices (e.g., points of a point cloud) and/or edges extending between such vertices, and polygonal shapes or faces that extend between such vertices and edges and represent a texture of the object. From a purely digital perspective, a textured mesh defines both a volume and an appearance of the object in a manner that may be readily utilized in connection with one or more graphical applications.

Forming a three-dimensional model of an object (such as a textured mesh) typically requires the use of imaging devices and computer-driven modeling techniques to capture digital imagery of the object and to generate a physical representation of the object. For example, the physical representation of the object may be defined by a set of points in three-dimensional space, which may be obtained from a depth image of the object or other ranging data, or from one or more two-dimensional images of the object, such as by modeling the object using stereo or structure-from-motion (or SFM) algorithms. Using such data, a depth model, such as a point cloud, of the object may be defined for the object, including a set of points that may be described with respect to Cartesian or other coordinates. Subsequently, a three-dimensional model such as a textured mesh may be generated for the object using a visual digital image and the depth model, such as by mapping or patching portions or sectors of the visual digital image to the polygonal shapes defined by the respective points of the depth model.

Presently, three-dimensional models of objects, such as textured meshes, are typically formed from point clouds generated from depth images or other data captured using depth sensing cameras, and from two-dimensional visual digital imagery (e.g., color digital images) captured using digital cameras or other imaging devices. Because a point cloud defines points of surfaces of an object in coordinate space, the point cloud forms a plurality of polygons (e.g., triangles) of varying sizes, subject to the depth resolution of the point cloud, with such polygons corresponding to aspects of the surfaces of the object. Digital images of such aspects may then be mapped or patched onto the polygons, in order to synthesize a computer-based representation of the object.

As is set forth in greater detail below, the present disclosure is directed to virtually presenting articles of clothing to customers using three-dimensional models that are rendered on various types of displays. Such three-dimensional models (e.g., avatars) may be generated based on imaging data captured from or associated with the customer, including a plurality of visual images and/or depth images captured from the customer. If the available imaging data regarding the customer is not sufficient to generate an accurate three-dimensional model of the customer therefrom, a generic three-dimensional model in the form of a virtual mannequin or stick figure may be selected based on one or more physical attributes of the customer as determined from the imaging data, and a visual representation of an article of clothing may be mapped onto the three-dimensional model and shown on one or more displays. Alternatively, if the available imaging data is sufficiently precise, a three-dimensional model may be generated based on one of a plurality of body templates that corresponds to the size, shape and dimensions of the customer, as determined from the imaging data, or based on the actual size, shape and dimensions of the customer. The three-dimensional models may be used for any purpose, including but not limited to displaying views of articles of clothing depicted thereon, thereby providing a more accurate representation of how a specific article of clothing will look or fit on a given customer, in any context, either alone or with one or more other articles of clothing.

After an avatar or other three-dimensional model of a customer has been generated, visual representations of articles of clothing having an appearance or a behavior of being worn by the customer may be defined and projected onto the avatar or other three-dimensional model. For example, a customer may stand before a depth sensing camera as depth images or other depth data are captured from the customer while he or she performs one or more poses or gestures, or changes his or her position accordingly (e.g., by rotating within the field of view of the camera), and an avatar or other three-dimensional model may be generated or selected based on the depth images. The customer may wear any type of clothing while the depth images or other depth data is captured. In some embodiments, the customer may wear tight-fitting articles of clothing that mimic external surfaces of his or her physique, or stand in the nude, as the depth images or other depth data is captured. Additionally, in some embodiments, an avatar or other three-dimensional model may be generated or selected for a customer based on a single depth image, or a single visual image in addition to or as an alternative to depth images, from which one or more dimensions of the customer may be estimated or determined.

In some embodiments, an avatar or other three-dimensional model may be a virtual mannequin, a virtual stick figure or another like artifact that corresponds to one or more dimensions of the customer, e.g., a height, a shoulder width, an arm or leg length, or any other dimension. In some embodiments, an avatar or other three-dimensional model may also be one of a plurality of predetermined body templates having an overall virtual appearance (e.g., size, shape, dimensions) that most closely corresponds to the overall actual appearance of the customer. In still other embodiments, an avatar or other three-dimensional model may also be modeled directly after the customer himself or herself, if the quality and richness of the depth data obtained from the customer is sufficient. Additionally, in some embodiments, visual imaging data (e.g., color and/or textures) may be mapped onto the avatar or other three-dimensional model, in order to give the avatar or other three-dimensional model the appearance of a standard, abstract skin tone or other feature, or, alternatively, the appearance of a desired skin tone or other feature, or the actual appearance of the customer. For example, an avatar or other three-dimensional model may be generated with a standard, abstract color or texture scheme or, alternatively, with a color or texture scheme that is selected by the customer or most closely corresponds to external features (e.g., skin, hair, eyes) of the customer.

An avatar or other three-dimensional model may be updated over time based on imaging data or other information that is subsequently obtained and associated with the customer, such that the quality of the avatar or other three-dimensional model is progressively enhanced as the quality of the available imaging data improves. For example, where a customer stands before an imaging device and changes poses or performs a number of gestures, an avatar or other three-dimensional model may be updated accordingly, based on the poses or gestures of the customer. Alternatively, the sizes, shapes or dimensions of the avatar or other three-dimensional model at one or more future times may be predicted based on actual information or data that may be known regarding a customer (e.g., age, height, weight, activities or dining habits), based on hypothetical information or data regarding the customer (e.g., a diet or an exercise regimen that the customer intends to commence or conclude), or based on a combination of actual and hypothetical information or data. For example, where a customer is interested in purchasing an article of clothing in a specific size, an avatar or other three-dimensional model may be used to determine whether the article of clothing will fit the customer, or to determine a quality of the fit, and offer information or data regarding caloric consumption and/or workouts that may be required in order to ensure that the article of clothing properly fits the customer in the future.

After an avatar or other three-dimensional model has been generated or selected for a customer, material data regarding an article of clothing (e.g., data regarding the geometric shapes or appearances of specific materials from which the article is formed, how the article may be expected to respond to static or dynamic effects such as tension, compression, shear resulting from external forces, as well as how the article of clothing will interact with the human body on contact) may be identified and used to map or project a visual representation of the article of clothing onto the avatar or other three-dimensional model, in a manner that would mimic an actual appearance of the article of clothing on the customer. The mapping or projection of the visual representation may consider any attributes of the article of clothing, or the customer, in simulating an appearance of the article of clothing on the customer, or the behavior of the article of clothing on the customer. For example, the visual representation may be based on known or predicted behavior or appearance of the article of clothing, or the materials from which it is formed, when the article of clothing is subjected to normal or expected use or wear-and-tear.

In accordance with the present disclosure, any properties or attributes of an article of clothing may be considered in determining or predicting the appearance or the behavior of the article of clothing when being worn by a customer. Some properties of clothing that may be considered include, but are not limited to, a tensile strength, a compression strength, a shear strength, a yield strength, a coefficient of friction, a Young's modulus (or a modulus of elasticity), a Poisson ratio, a shear modulus, a stress-strain curve, a hardness, a toughness, or any other intrinsic property of one or more materials from which the article of clothing was formed. Additionally, methods of manufacture by which the articles of clothing are formed may also be considered. For example, a "weave" of a fabric, or a manner in which threads of fibers known as a warp (e.g., a set of threads held in tension in a lengthwise manner within a frame or a loom) and a weft, or a "woof" (e.g., threads that are drawn through warp threads), are combined in order to create the fabric, may determine how the fabric appears or behaves while being worn by a customer, as a single fiber may be used to form multiple fabrics, each of which may be very different from one another. Determinations as to the compositions of cotton fibers, or other such materials, may be considered in predicting its appearance or behavior while being worn by a given customer. Additionally, a simulated velocity, an acceleration, a torque or other extrinsic property of the article of clothing, or of a customer on which the article of clothing is to be worn, may also be considered. Any other information or data regarding extrinsic factors that may affect the appearance or behavior of the article of clothing while being worn by the customer, including but not limited to simulated effects of weather (e.g., sunshine, rain, snow or wind) or performance (e.g., athletic activities) may also be considered.

In some embodiments, the systems and methods of the present disclosure enable customers to evaluate looks and fits of outfits, such as to match one aspect of an outfit with another aspect of the outfit (e.g., a shirt and a pair of pants) using virtual models constructed from depth imaging data. The virtual models may be selected based on any imaging data that may be obtained regarding a customer, as well as material data that may be obtained regarding one or more articles of clothing. For example, a customer may stand in front of an RGBD camera or other depth sensing device, and depth images captured by the RGBD camera or other sensor may be used to generate or select an avatar or a three-dimensional model of the customer, e.g., from a point cloud or other representation of the depths to or positions of points on an external surface of the customer.

In some embodiments, visual representations of an article of clothing on an avatar or other three-dimensional model of a customer may be presented to the customer, or to one or more other individuals, in any format. For example, such representations may be displayed on a standard monitor or display such as cathode ray tube ("CRT") displays, light-emitting diode ("LED") or organic light-emitting diode ("OLED") displays, liquid crystal displays ("LCD"), plasma displays or any other displays that may be free-standing or mounted to walls, ceilings or other structures or fixtures. Such representations may also be displayed via a virtual reality headset or other virtual reality system, which may also include one or more motion sensors, e.g., body sensors that may be attached to or worn on arms, legs or other body parts. In some embodiments, a customer may appear within a field of view of a depth sensing camera in one or more poses or while performing one or more gestures. The depth sensing camera and/or one or more motion sensors may track the customer's movements in reality, and a virtual representation of an avatar or other three-dimensional model wearing one or more articles of clothing may be shown on a display such as a flat-panel monitor or virtual reality headset. The display may thus act as a virtual mirror, thereby depicting how the customer would appear in the poses or while performing the gestures and wearing the articles of clothing, and enabling the customer to virtually "step outside" of himself or herself and view the avatar or three-dimensional model from one or more different angles or perspectives. Still or moving imaging data depicting the movements of the avatar or other three-dimensional model while wearing the articles of clothing may also be saved or shared with one or more other entities or individuals, e.g., by transmitting data files comprising the imaging data to one or more other computer devices over a network. Such other entities or individuals may provide commentary regarding the appearance of the article of clothing on the avatar or other three-dimensional model and, alternatively, propose additions or alterations to the appearance (e.g., additional or alternative articles of clothing).

Such embodiments are particularly useful to customers having sizes, shapes or dimensions that differ from the sizes, shapes or dimensions of common mannequins or human models that display articles of clothing to customers. For example, according to some estimates, nearly two-thirds of women wear dresses in sizes 14 or greater. Viewing a dress on an avatar having a size 14 or greater may be far more valuable or helpful to a customer of such sizes than viewing the same dress on a mannequin or a size zero model. A visual representation of the dress on an appropriately sized or shaped avatar enables the customer to visually determine how a given dress will fit, or to identify a size of the given dress that she requires, prior to completing a purchase. Additionally, in some embodiments, a plurality of avatars or other three-dimensional models of a customer wearing a given article of clothing may be displayed to the customer, and shown in a variety of poses, in order to visually depict how the article of clothing will look and fit the customer from a variety of perspectives or with different combinations of other articles of clothing (e.g., different angles in the same outfit, or different outfits). Furthermore, in some embodiments, an avatar or other three-dimensional model may be depicted while wearing an article of clothing in a variety of contexts. For example, where a customer shops for a ski parka in advance of a winter vacation, an avatar consistent with the customer's body size, shape or dimensions may be shown while wearing the ski parka, with one or more images of a mountain scene in a background. The avatar may be shown as stationary or in motion, such as while simulating the act of skiing while wearing the parka. Moreover, in some embodiments, a customer may visually evaluate articles of clothing such as bathing suits or intimate apparel in the privacy of his or her own home by viewing an avatar or other three-dimensional model wearing the articles of clothing on one or more displays (e.g., a two-dimensional monitor or a virtual reality headset).

Furthermore, once an avatar or other three-dimensional model has been generated for a given customer, the avatar or other three-dimensional model may be utilized for any purpose, including but not limited to the personalized marketing of items or categories of items to customers. For example, when an electronic marketplace is promoting a type or category of item to customers in general, or identifies an item that it intends to recommend to a customer, and a specific customer visits a network page of the electronic marketplace, the electronic marketplace may generate one or more customized electronic images including an avatar or other three-dimensional model of the customer modeling the item, and display the electronic images on the network page accessed by the customer. Alternatively, an electronic marketplace, a merchant or another retailer may include one or more of such images in a hard-copy print circular (e.g., a magazine), or another hard-copy document, and mail or otherwise distribute the hard-copy print circular to the customer.

In some embodiments, a recommendation of an item, or a specific size or style of the item, may be identified for a customer based on his or her avatar or other three-dimensional model. For example, rather than generally identifying items for customers by traditional techniques such as collaborative filtering, e.g., by identifying items based on prior purchases by a customer or another customer, some embodiments of the present disclosure may identify items, or sizes or styles of items, based on items that were previously purchased or worn by customers having similar body sizes, shapes or dimensions that are similar to those of the customer. Additionally, in some embodiments, a customer may be provided with contact information of one or more other customers having similar body sizes, shapes or dimensions (e.g., expressly or anonymously), and the customers may share information regarding articles of clothing that fit, or do not fit, their respective bodies.

In some embodiments, material data regarding clothing (e.g., tensile, compression or shear strengths; coefficients of friction; Young's modulus, shear modulus or Poisson ratios, or the like of materials from which the clothing is formed, as well as sizes, shapes or dimensions of the clothing or the materials) may be obtained from a manufacturer, a vendor or another source of the item. Alternatively, in some embodiments, material data regarding clothing may be determined from one or more visual images or depth images captured from the clothing. For example, in some embodiments, imaging data captured from a customer wearing an article of clothing may be processed in order to determine one or more properties of the article of clothing, and such properties may then be utilized in determining visual representations of the article of clothing to be displayed on avatars or other three-dimensional models of the customer, or of other customers. In some embodiments, imaging data may be captured from an article of clothing on a hanger or in other unworn or stored states. The article of clothing may be recognized from such images and compared to templates or other descriptors of other known items, including but not limited to other articles of clothing previously purchased by a customer, in order to identify and classify the article of clothing or to determine one or more properties thereof.

In some embodiments, an avatar or other three-dimensional model of a customer may be used for any purpose, including but not limited to enabling customers to view how combinations of articles of clothing might appear on their respective bodies. Such combinations of articles may include articles of clothing that the customer is considering for purchase and also articles of clothing that the customer already owns. For example, where a profile of a customer at an electronic marketplace indicates that the customer owns a pair of pants, the electronic marketplace may display a network pages that includes an avatar of the customer wearing the pair of pants, and enables the customer to virtually depict various combinations of shirts, ties, socks or shoes on the avatar in order to determine which of such shirts, ties, socks or shoes looks best with the pair of pants. Such a network page may include any number of interactive features that permit the customer to interchange combinations of articles on the avatar. Alternatively, network pages that depict an avatar of a customer and enable visual representations of items to be shown thereon may be displayed not only to the customer but to one or more other entities or individuals, including but not limited to friends, family members, or authorized personnel associated with an electronic marketplace or a bricks-and-mortar retailer (e.g., a "personal shopper") who may recommend one or more articles of clothing or combinations thereof to the customer based on the avatar.

In some embodiments, an avatar or other three-dimensional model may be used in an aspirational sense, along with diet or exercise information, to represent to a customer what effort will be required in order for the customer to fit into a given article of clothing on a particular date. Additionally, an avatar or three-dimensional model may be shown to a customer before the customer departs for a particular location (e.g., vacation or a business trip), in order to model the types or styles of clothing worn by other customers of similar sizes, shapes or dimensions at the location. In some embodiments, a personal shopper may use an avatar or other three-dimensional model to recommend clothing to a customer from afar, and to show the customer how the clothing will fit on his or her body. The personal shopper may be a human actor or, alternatively, an automated agent that selects articles of clothing according to one or more algorithms or machine-learning tools, e.g., a K-means clustering or other clustering technique, and presents views of the articles of clothing on avatars or other three-dimensional models corresponding to himself or herself.

Figure 2:
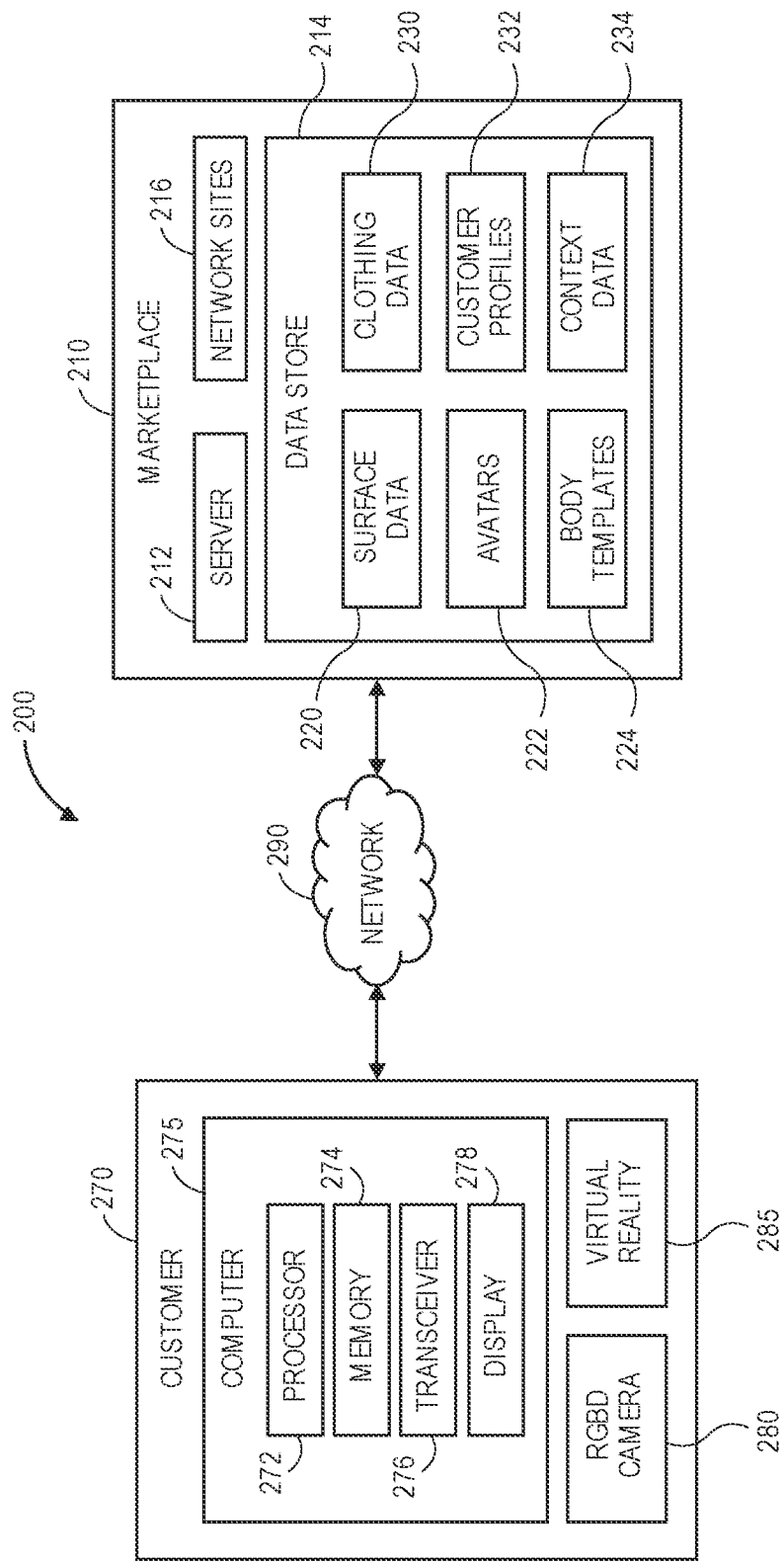
FIG. 2 is a block diagram of components of one system in accordance with embodiments of the present disclosure.

Referring to FIG. 2, a block diagram of components of one system 200 in accordance with embodiments of the present disclosure is shown. As is shown in FIG. 2, the system 200 includes a marketplace 210 and a customer 270 that are connected to one another across a network 290, which may include the Internet in whole or in part. The marketplace 210 includes a server 212, a data store 214 and one or more network sites 216. The customer 270 is associated with a computer 275, an RGBD camera 280 and a virtual reality system 285.

The marketplace 210 may be any entity or individual that wishes to make items from a variety of sources (e.g., vendors, manufacturers, merchants or sellers) available for download, purchase, rent, lease or borrowing by customers using a networked computer infrastructure, including one or more servers 212 and data stores 214 (e.g., databases) for hosting one or more network sites 216. The marketplace 210 may be physically or virtually associated with one or more fulfillment centers, warehouses or other storage and distribution facilities in various locations, or any number of vendors, manufacturers, merchants or sellers. The network site 216 may be implemented using the one or more servers 212, which connect or otherwise communicate with the one or more data stores 214 as well as other computer devices, such as the computer 275, over the network 290 through the sending and receiving of digital data.

The data stores 214 may include any type of information or data regarding items that have been made available for sale through the marketplace 210, or ordered by customers, such as the customer 270, from the marketplace 210, or any information or data regarding customers. For example, as is shown in FIG. 2, the data store 214 includes surface data 220, one or more avatars 222, one or more body templates 224, clothing data 230, one or more customer profiles 232 and context data 234. The surface data 220 may include any information or data such as depth images (e.g., information relating to distances of surfaces of objects such as customers or clothing within a scene from a perspective of an imaging device), point clouds (e.g., a grouping of data points corresponding to external surfaces of customers derived from depth data), visual images (e.g., black-and-white, grayscale, or color images) or any other representation of data corresponding to surfaces of an object, with individual points in space having coordinates defining their respective locations in absolute terms or relative to an imaging system according to a standard coordinate system (e.g., a rectangular or Cartesian coordinate system, a polar coordinate system). The surface data 220 may represent sizes, shapes or dimensions of any aspect of an object, and may include skeletal data representative of outlines of customers or other humans. Alternatively, surface data 220 may include or may have been generated at least in part based on one or more visual images.

The avatars 222 may include any collections of data in the form of three-dimensional models of customers, such as textured meshes corresponding to or representative of the customers. For example, one or more of the avatars 222 or other three-dimensional models may correspond to virtual mannequins or virtual stick figures having average or generic sizes, shapes or dimensions. Additionally, one or more of the avatars 222 or other three-dimensional models may correspond to one or more of the body templates 224, which may be selected based on surface data 220 corresponding to the customer 270. One or more of the avatars 222 or other three-dimensional models may also be generated based on surface data 220 corresponding to a specific customer, e.g., the customer 270. Additionally, the avatars 222 or other three-dimensional models may be updated in real time, in near-real time, or at any time based on additional surface data 220 that may be obtained regarding a customer, such as the customer 270, or, alternatively, based on any predicted changes in the sizes, shapes or dimensions of such a customer.

The body templates 224 may be any collections of information or data regarding one or more bodies having standard sizes, shapes or dimensions, any of which may be selected as a basis for generating an avatar 222 or other three-dimensional model, based on a comparison or proximity to surface data 220 of a customer. Each of the body templates 224 may include unique data points corresponding to lengths, circumferences, diameters or thicknesses of heads, necks, shoulders, backs, arms, waists, hips, seats, legs or feet. One of the body templates 224 may be selected based on a comparison of the respective data points to position data (e.g., skeletal data) of a customer, e.g., the customer 270, and used as a basis for generating an avatar 222 or other three-dimensional model for such a customer.

The clothing data 230 includes any information or data regarding one or more articles of clothing that may be used to determine an appearance or behavior of an article of clothing while the article of clothing is worn by a customer, including but not limited to data regarding colors or textures of such articles, as well as data regarding specific components from which each of the articles is formed, including sizes, shapes or dimensions of panels, sheets, stitches, seams or fasteners from which such articles are formed. The clothing data 230 may further include any material properties of the article of clothing, including but not limited to tensile, compression, shear or yield strengths, coefficients of friction, Young's moduli, shear moduli, Poisson ratios, stress-strain curves, hardnesses, toughnesses or any other intrinsic properties of materials from which the articles of clothing are formed. The clothing data 230 may further include information or data regarding methods or techniques by which the articles of clothing are manufactured, as well as known or predicted changes in the articles of clothing following expected or extraordinary wear-and-tear, or any other factor.

The customer profiles 232 may include any information or data regarding customers (e.g., the customer 270) and/or their activities at the marketplace 210. For example, the customer profiles 232 may include information regarding items that were previously purchased by the customer 270, as well as items in which the customer 270 is believed to be interested, based on his or her prior activity at the marketplace 210 (e.g., pages featuring information regarding items that were previously viewed by the customer 270), or based on the prior activity of other customers who may be similar to the customer 270. The customer profiles 232 may also include personal information regarding the customer 270, including his or her age, height, weight or other dimensions, which may be expressly stated by the customer 270, or implicitly deduced from information regarding items previously purchased by the customer 270, from the surface data 220 or from information or data of any other kind.

The context data 234 may include any information or data regarding contexts in which items that are available for purchase from the marketplace 210 are used, including locations, conditions or other factors regarding such use. For example, the context data 234 may include images (e.g., still or moving images) of locations or other environments in which an item is used, as well as names, numbers or other identifiers of items that may be commonly used with the item. The context data 234 may further include information or data regarding any conditions, instructions or restrictions associated with such use, or with contexts in which the items are to be used.

The marketplace 210 may be associated with one or more fulfillment centers, warehouses or other storage or distribution facilities (not shown), any of which may be adapted to receive, store, process and/or distribute items. Such facilities may include any number of servers, data stores and/or processors for operating one or more order processing and/or communication systems and/or software applications having one or more user interfaces, or communicate with one or more other computing devices or machines that may be connected to the network 290, for transmitting or receiving information in the form of digital or analog data, or for any other purpose. For example, such servers, data stores and/or processors may operate or provide access to one or more reporting systems for receiving or displaying information or data regarding orders for items received by the marketplace 210, or deliveries made to one or more customers, such as the customer 270, and may provide one or more interfaces for receiving interactions (e.g., text, numeric entries or selections) from one or more operators, users, workers or other persons in response to such information or data. Such servers, data stores and/or processors may be general-purpose devices or machines, or dedicated devices or machines that feature any form of input and/or output peripherals such as scanners, readers, keyboards, keypads, touchscreens or like devices, and may further operate or provide access to one or more engines for analyzing information or data regarding workflow operations, or interactions received from one or more operators, users, workers or persons.

Such facilities may also include one or more stations for receiving, storing and distributing items to customers. For example, a facility may include any apparatuses that may be required in order to receive shipments of items from one or more sources and/or through one or more channels, including but not limited to docks, lifts, cranes, jacks, belts or other conveying apparatuses for obtaining items and/or shipments of items from carriers such as cars, trucks, trailers, freight cars, container ships or cargo aircraft (e.g., manned aircraft or unmanned aircraft, such as drones), and preparing such items for storage or distribution to customers. A facility may also include one or more predefined two-dimensional or three-dimensional spaces for accommodating items and/or containers of such items, such as aisles, rows, bays, shelves, slots, bins, racks, tiers, bars, hooks, cubbies or other like storage means, or any other appropriate regions or stations. A facility may further include one or more regions or stations where items that have been retrieved from a designated storage area may be evaluated, prepared and packed for delivery from the facility to locations or destinations specified by customers, e.g., by way of vehicles of any type, e.g., cars, trucks, trailers, freight cars, container ships or cargo aircraft (e.g., manned aircraft or unmanned aircraft, such as drones). Such locations or destinations may include, but are not limited to, facilities having specific addresses or other geocoded identifiers (e.g., dwellings or businesses), as well as storage lockers or other temporary storage or receiving facilities. Those of ordinary skill in the pertinent art will recognize that shipments of items arriving at such facilities may be processed, and the items placed into storage within storage areas or, alternatively, transferred directly to a distribution station, or "cross-docked," for prompt delivery to one or more customers. A facility may also include one or more control systems that generate instructions for conducting operations therein, including but not limited to instructions associated with the receipt, the storage or the distribution of one or more items.

The customer 270 may be any entity or individual that wishes to download, purchase, rent, lease, borrow or otherwise obtain items (which may include goods, products, services or information of any type or form) from the marketplace 210. The customer 270 may utilize one or more computing devices 275 (e.g., a desktop computer, a laptop computer, a smartphone, a tablet computer, or computing devices provided in wristwatches, televisions, set-top boxes, automobiles or any other appliances or machines), or any other like machines, as well as the RGBD camera 280 and the virtual reality system 285.

The computer 275 may include one or more processors 272, memory components (e.g., databases) 274, transceivers 276 (e.g., transmitters and/or receivers) and displays 278, as well as any number of input/output devices (not shown), such as keyboards, keypads, mice, styluses, touchscreens, RFID readers, or other devices. The transceivers 276 may be configured to communicate with one or more computer devices over the network 290, and may also be utilized to transmit or receive cellular telephone signals to or from a cellular telephone network source (not shown) in the form of audio communications, network communications packets, SMS or MMS text messages, social network messages, or any other form of data that may be transmitted by or through such means. Any type of transmitting and/or receiving equipment that is configured to transmit and/or receive information of any type or form, and according to any protocol, e.g., Bluetooth®, Near-Field Communications (or "NFC") or radiofrequency identification (or "RFID"), may be utilized in connection with the computer devices disclosed herein, in accordance with the present disclosure. The displays 278 may comprise, for example, one or more devices or systems such as electronic ink (or "E-ink") systems, liquid crystal displays (or "LCD"), light-emitting diode (or "LED") or organic light-emitting diode (or "OLED") displays, cathode ray tubes (or "CRT"), plasma displays, electrophoretic displays, image projectors, or other display mechanisms including but not limited to microelectromechanical systems (or "MEMS"), spatial light modulators, electroluminescent displays, quantum dot displays, liquid crystal on silicon (or "LCOS") displays, cholesteric displays, interferometric displays or others.

The displays 278 may be in a common, integrated component or housing with the processors 272, the memory components 274 and/or the transceivers 276 or, alternatively, free-standing units provided in separate components or housings that are connected to one or more of the processors 272, the memory components 274 or the transceivers 276 via wired or wireless means, including but not limited to a Universal Serial Bus (or "USB") cable, such as a USB 2.0, USB 3.0, USB-C, mini-USB, micro-USB; a high-definition multimedia interface (or "HDMI") cable, such as a Standard or High Speed cable; an Ethernet cable, such as a Category 3, 5, 5e, 6, 6a or 7 cable; or any other connector. Additionally, the displays 278 may be interactive touchscreens that may not only display information or data but also receive interactions with the information or data by contact with a viewing surface. For example, in some embodiments, one or more of the displays 278 may be a capacitive touchscreen that operates by detecting bioelectricity from a user. In some embodiments, one or more of the displays 278 may be a resistive touchscreen including a touch-sensitive computer display composed of multiple flexible sheets that are coated with a resistive material and separated by an air gap, such that when a user contacts a surface of a resistive touchscreen, at least two flexible sheets are placed in contact with one another.

The computer 275 may be configured to operate any type or form of applications including but not limited to one or more browsers, or any client-side application that retrieves, processes and renders Internet or other network-based content in response to a request for such content. Such browsers may operate by receiving code from one or more servers and/or server-side applications according to a certain protocol, such as Hypertext Transfer Protocol (or "HTTP"), and assembling one or more objects based on or derived from the code into a network page, such as a web page, that is displayed on a user interface. Such browsers may usually include one or more engines for translating information received from servers into renderable content, interpreters for parsing and executing scripts, and caches or other data stores for storing information in the form of "cookies," or files that relate to a user's browsing activity, which may be retrieved by one or more sites in the future. The customer 270 may request one or more files associated with a URI, a URL or another file location, e.g., by entering a URI or URL into an address box or address bar; by selecting an image or set of text that may be hyperlinked to a URI or URL; or by selecting a bookmark, a home button or any other feature that may be linked to or otherwise associated with a URI or URL. In response to such a request, a server associated with the URI or URL (e.g., the server 212) handles the request by providing code expressed in one or more computer languages, such as Hypertext Markup Language (or "HTML") and a browser then uses one or more rendering engines (or layout engines) to display the code provided by the server into the page, which may include one or more files embedded within the code provided by the server.

The computer 275 may be further configured to operate a shopping application that is dedicated for accessing one or more network-based portals, e.g., the network site 216 or any other resource associated with the marketplace 210, and may, but need not, include or operate one or more components of a browser thereon. The computer 275 may also be configured to operate a mapping application, or any application that is configured to receive position signals, e.g., by way of a Global Positioning System sensor or, alternatively, the transceiver 276 or any other source, and to interpret such signals for any purpose. For example, such a mapping application may be configured to determine an optimal path or route between two locations on any basis. The computer 275 may further be configured to operate an E-mail client or any other application for generating, viewing, editing, transmitting, receiving and/or storing electronic messages, and may include any additional relevant or unrelated capacities or specifications. The computer 275 may also be configured to operate any number of other applications thereon, including but not limited to one or more applications for accessing social networks.

The RGBD camera 280 may be any form of optical recording device that may be used to photograph or otherwise record imaging data, along with any associated data, metadata and/or audio signals. The RGBD camera 280 may include one or more sensors, memory or storage components and processors, and such sensors, memory components or processors may further include one or more photosensitive surfaces, filters, chips, electrodes, clocks, boards, timers or any other relevant features (not shown). The RGBD camera 280 may capture imaging data in the form of one or more still or moving images of any kind or form, including depth imaging data, e.g., distances or ranges to objects within their respective fields of view, and visual imaging data, e.g., visual images or image frames in color, grayscale or black-and-white. In some embodiments, the customer 270 may access or operate an imaging device that is configured to capture visual imaging data, but not depth imaging data (e.g., an RGB camera) and/or an imaging device that is configured to capture depth imaging data, but not visual imaging data (e.g., a depth sensor or range camera). In still other embodiments, the RGBD camera 280 may be a thermographic or infrared (IR) camera. Additionally, in some implementations, the RGBD camera 280 may simply be camera modules that include a lens and an image sensor configured to convert an optical image obtained using the lens of the camera into a digital signal or digital representation of the image (generally referred to herein as imaging data). In some implementations, the RGBD camera 280 may be paired to provide stereo imagery and depth information, and may include a pair of camera modules.

The RGBD camera 280 may also include manual or automatic features for modifying their respective fields of view or orientations. For example, the RGBD camera 280 may be configured in a fixed position, or with a fixed focal length (e.g., fixed-focus lenses) or angular orientation. Alternatively, the RGBD camera 280 may include one or more motorized features for adjusting a position of the imaging device, or for adjusting either the focal length (e.g., zooming the imaging device) or the angular orientation (e.g., the roll angle, the pitch angle or the yaw angle), by causing changes in the distance between the sensor and the lens (e.g., optical zoom lenses or digital zoom lenses), changes in the location of the RGBD camera 280, or changes in one or more of the angles defining the angular orientation.

For example, the RGBD camera 280 may be hard-mounted to a support or mounting that maintains the device in a fixed configuration or angle with respect to one, two or three axes. Alternatively, however, the RGBD camera 280 may be provided with one or more motors and/or controllers for manually or automatically operating one or more of the components, or for reorienting the axis or direction of the device, i.e., by panning or tilting the device. Panning the RGBD camera 280 may cause a rotation within a horizontal axis or about a vertical axis (e.g., a yaw), while tilting the RGBD camera 280 may cause a rotation within a vertical plane or about a horizontal axis (e.g., a pitch). Additionally, the RGBD camera 280 may be rolled, or rotated about its axis of rotation, and within a plane that is perpendicular to the axis of rotation and substantially parallel to a field of view of the device.

In some embodiments, the RGBD camera 280 may digitally or electronically adjust an image identified in a field of view, subject to one or more physical and operational constraints. For example, a digital camera may virtually stretch or condense the pixels of an image in order to focus or broaden the field of view of the digital camera, and also translate one or more portions of images within the field of view. Once the characteristics of stationary or moving objects or portions thereof have been recognized in one or more digital images, such characteristics of the objects or portions thereof may be matched against information regarding edges, contours, outlines, colors, textures, silhouettes, shapes or other characteristics of known objects, which may be stored in one or more data stores. In this regard, stationary or moving objects may be classified based at least in part on the extent to which the characteristics identified in one or more digital images correspond to one or more of the characteristics of the known objects. In some embodiments, the RGBD camera 280 may also include transceivers for functionally joining one or more of the displays or the imaging devices with one another, or may functionally join the RGBD camera 280 with one or more systems, devices or components, including but not limited to the computer 275, the displays 278, or one or more other external computer systems, devices or components over the network 290, through the sending and receiving of digital data. Such transceivers may be configured to enable the RGBD camera 280 to communicate through one or more wired or wireless means, e.g., wired technologies such as USB or fiber optic cable, or standard wireless protocols such as Bluetooth® or Wi-Fi, to the computer 275 and/or to one or more other computer devices over the network 290. The RGBD camera 280 may further include one or more memory or storage components, one or more computer processors for analyzing, modifying and/or storing any imaging data that may be captured or displayed.

The virtual reality system 285 is any device or component configured to provide the customer 270 with an illusion of participation in a synthetic environment, rather than merely observing the environment. Some virtual reality systems 285 rely on two-dimensional and/or three-dimensional stereoscopic head-mounted displays, body tracking sensors and binaural sound to create an immersive, multi-sensory experience for the customer 270. For example, the virtual reality system 285 may comprise displays for each of a left eye and a right eye of the customer 270, as well as imaging devices for each of the left eye and the right eye of the customer 270, and one or more motion sensors that may be mounted to body parts of the customer 270. The displays provided in the virtual reality system 285 may be mounted in alignment with the left eye and the right eye, respectively, e.g., by a pair of glasses or goggles, or within a cavity defined by a headset, and may incorporate any number of active or passive display technologies or systems. For example, the displays may include or comprise one or more E-ink systems, LCD displays, LED displays, OLED displays, CRT displays, electrophoretic displays, image projectors, or other display mechanisms including but not limited to MEMS, spatial light modulators, electroluminescent displays, quantum dot displays, liquid crystal on silicon (or "LCOS") displays, cholesteric displays, interferometric displays or others. Such displays may be configured to emit light, to modulate incident light emitted from another source, or both.

The imaging devices provided in the virtual reality system 285 may include or comprise any form of optical recording sensor or device that may be used to photograph or otherwise record information or data regarding the position, movement, alignment or orientation of the left eye and the right eye, respectively, or any other relevant information or data regarding the left eye and the right eye. For example, the imaging devices may be any type or form of digital camera configured to capture color-based information or data regarding the left eye and the right eye, including but not limited to the positions and orientations of the cornea, pupil, lens and retina of each of the left eye and the right eye. Alternatively, the imaging devices may be any type or form of depth sensor or range camera configured to capture depth-based or range-based information regarding the positions and orientations of the cornea, pupil, lens and retina of each of the left eye and the right eye, e.g., based on visible or invisible light (e.g., infrared light) reflected from the left eye or the right eye. The imaging devices may also include any number of sensors, memory or storage components, processors or other features for capturing, analyzing or storing imaging data captured by such imaging devices.

The virtual reality system 285 may also include transceivers for functionally joining one or more of the displays or the imaging devices with one another, or may functionally join the virtual reality system 285 with one or more systems, devices or components, including but not limited to the computer 275, the displays 278, or one or more other external computer systems, devices or components over the network 290, through the sending and receiving of digital data. Such transceivers may be configured to enable the virtual reality system 285 to communicate through one or more wired or wireless means, e.g., wired technologies such as USB or fiber optic cable, or standard wireless protocols such as Bluetooth® or Wi-Fi, to the computer 275 and/or to one or more other computer devices over the network 290. The virtual reality system 285 may further include one or more memory or storage components, one or more computer processors for analyzing, modifying and/or storing any imaging data that may be captured using the imaging devices or displayed upon the displays.

In some embodiments, the virtual reality system 285 may include or comprise a head-mounted system having a frame and a strap for mounting the frame about a head and/or face of the customer 270 or another user. The frame may be formed of any type or form of material such as one or more rubbers, woven or non-woven fabrics, plastics, composites, leathers, papers (e.g., cardboards) or the like that may be molded or shaped and configured for contact or alignment with left and right eyes of the user, respectively. The strap may be formed from any suitable material that may flexibly mate the frame with the head or face of the user, including but not limited to rubbers, woven or non-woven fabrics, plastics (e.g., polyesters, nylons), composites, leathers, papers (e.g., cardboards) or the like. Alternatively, where the strap is not provided, the frame may be manually pressed against or aligned with the head or face of the user. The frame may define a cavity having openings associated with the eyes of the customer 270 or another user, as well as displays provided for rendering information to the left and right eyes of the user, respectively. Additionally, imaging devices may also be provided within the frame, and aligned to capture imaging data (e.g., colors, textures, outlines or depth information or data) regarding the left and right eyes, respectively, based on visible light or invisible light (e.g., infrared light) reflected therefrom.

The network 290 may be any wired network, wireless network, or combination thereof, and may comprise the Internet in whole or in part. In addition, the network 290 may be a personal area network, local area network, wide area network, cable network, satellite network, cellular telephone network, or combination thereof. The network 290 may also be a publicly accessible network of linked networks, possibly operated by various distinct parties, such as the Internet. In some embodiments, the network 290 may be a private or semi-private network, such as a corporate or university intranet. The network 290 may include one or more wireless networks, such as a Global System for Mobile Communications (GSM) network, a Code Division Multiple Access (CDMA) network, a Long Term Evolution (LTE) network, or some other type of wireless network. Protocols and components for communicating via the Internet or any of the other aforementioned types of communication networks are well known to those skilled in the art of computer communications and thus, need not be described in more detail herein.

The computers, servers, devices and the like described herein have the necessary electronics, software, memory, storage, databases, firmware, logic/state machines, microprocessors, communication links, displays or other visual or audio user interfaces, printing devices, and any other input/output interfaces to provide any of the functions or services described herein and/or achieve the results described herein. Also, those of ordinary skill in the pertinent art will recognize that users of such computers, servers, devices and the like may operate a keyboard, keypad, mouse, stylus, touch screen, or other device (not shown) or method to interact with the computers, servers, devices and the like, or to "select" an item, link, node, hub or any other aspect of the present disclosure.

Those of ordinary skill in the pertinent arts will understand that process steps described herein as being performed by a "marketplace," a "customer," or like terms, may be automated steps performed by their respective computer systems, or implemented within software modules (or computer programs) executed by one or more general purpose computers. Moreover, process steps described as being performed by a "marketplace," a "customer," or like terms, may be typically performed by a human operator, but could, alternatively, be performed by an automated agent.

The marketplace 210 or the customer 270 may use any web-enabled or Internet applications or features, or any other client-server applications or features including electronic mail (or E-mail), or other messaging techniques, to connect to the network 290 or to communicate with one another, such as through short or multimedia messaging service (SMS or MMS) text messages, social network messages or the like, which may be identified based on one or more account identifiers. For example, the marketplace 210 and/or the server 212 may be configured to transmit information or data in the form of synchronous or asynchronous messages to the customer 270, the computer 275, the RGBD camera 280 or the virtual reality system 285, or to any other computer device in real time or in near-real time, or in one or more offline processes, via the network 290. Those of ordinary skill in the pertinent art would recognize that the marketplace 210, the customer 270 may operate any of a number of computing devices that are capable of communicating over the network 290, including but not limited to set-top boxes, personal digital assistants, digital media players, web pads, laptop computers, desktop computers, electronic book readers, and the like. The protocols and components for providing communication between such devices are well known to those skilled in the art of computer communications and need not be described in more detail herein.

The data and/or computer executable instructions, programs, firmware, software and the like (also referred to herein as "computer executable" components) described herein may be stored on a computer-readable medium that is within or accessible by computers or computer components such as the server 212, the computer 275, the RGBD camera 280, the virtual reality system 285, or any other computers or control systems utilized by the marketplace 210 or the customer 270 and having sequences of instructions which, when executed by a processor (e.g., a central processing unit, or "CPU"), cause the processor to perform all or a portion of the functions, services and/or methods described herein. Such computer executable instructions, programs, software and the like may be loaded into the memory of one or more computers using a drive mechanism associated with the computer readable medium, such as a floppy drive, CD-ROM drive, DVD-ROM drive, network interface, or the like, or via external connections.

Some embodiments of the systems and methods of the present disclosure may also be provided as a computer executable program product including a non-transitory machine-readable storage medium having stored thereon instructions (in compressed or uncompressed form) that may be used to program a computer (or other electronic device) to perform processes or methods described herein. The machine-readable storage medium may include, but is not limited to, hard drives, floppy diskettes, optical disks, CD-ROMs, DVDs, ROMs, RAMs, erasable programmable ROMs ("EPROM"), electrically erasable programmable ROMs ("EEPROM"), flash memory, magnetic or optical cards, solid-state memory devices, or other types of media/machine-readable medium that may be suitable for storing electronic instructions. Further, embodiments may also be provided as a computer executable program product that includes a transitory machine-readable signal (in compressed or uncompressed form). Examples of machine-readable signals, whether modulated using a carrier or not, may include, but are not limited to, signals that a computer system or machine hosting or running a computer program can be configured to access, or including signals that may be downloaded through the Internet or other networks.

Figure 3B:
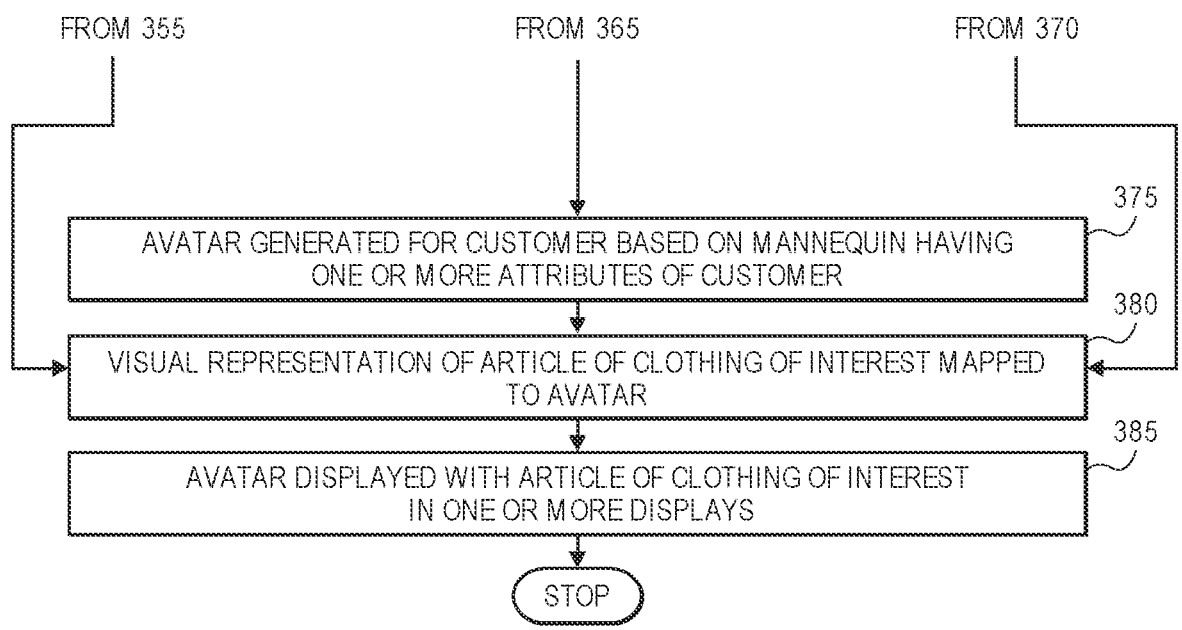

As is discussed above, some embodiments of the systems and methods of the present disclosure are directed to generating avatars (or other three-dimensional models) based on physical characteristics of a customer, as determined from imaging data or other information or data, and mapping visual representations of articles of clothing onto such avatars in a manner that reflects their appearance or behavior while being worn by the customer. Referring to FIGS. 3A and 3B, a flow chart 300 of one process in accordance with embodiments of the present disclosure is shown. At box 310, material data for a plurality of articles of clothing is stored in a data store. For example, the material data may include, but is not limited to, information or data regarding the articles including colors and textures; sizes, shapes or dimensions; material properties such as tensile, compression, shear or yield strengths, coefficients of friction, Young's moduli, shear moduli, Poisson ratios, stress-strain curves, hardnesses, toughnesses or any other properties of materials from which the articles of clothing are formed; or any information or data regarding methods or techniques by which the articles of clothing were formed.

At box 315, body template and mannequin data are stored in a data store. For example, the data may include information or data regarding one or more bodies having specific sizes, shapes or dimensions, e.g., data points corresponding to lengths, circumferences, diameters or thicknesses of body parts or other skeletal data. The data may also include information or data regarding virtual mannequins having standard or non-specific sizes, shapes or dimensions, including but not limited to average heights, shoulder widths, arm or leg lengths, waist widths or the like, and having no association with any particular gender.

At box 320, a customer positions himself or herself within a field of view of an imaging device. For example, referring again to FIG. 1A, an imaging device such as the depth sensing camera 180 may be mounted within the customer's home, or within a bricks-and-mortar retail establishment or other publicly accessible location, and aligned to enable a customer to freely stand in any pose or execute any gesture within its field of view. At box 325, the imaging device captures a plurality of depth images of the customer in a number of orientations. For example, referring again to FIGS. 1B through 1D, a customer may spin, walk, jump, lean or take any other action as the imaging device captures depth data from the customer. At box 330, a depth model of the customer is formed from the depth images and stored in a data store. For example, a point cloud or other set of position data representing the shape and external surfaces of the customer may be generated based on the depth images captured at box 325, and may include coordinates of individual points in space corresponding to different locations on external surfaces of the customer. In some embodiments, the depth model may be formed from a single depth image.

At box 335, the customer expresses interest in an article of clothing. For example, the customer may enter a keyword corresponding to the article of clothing (e.g., a category, a brand name, a text-based or numeric identifier) into a text box, select a hyperlink image, icon or set of text associated with the article of clothing in a network page or electronic message, or take any other action signifying interest in the article of clothing. The expression of interest in the article of clothing may precede the capture of the depth images at box 325, follow the capture of the depth images, or, alternatively, occur simultaneously or nearly simultaneously with the capture of the depth images. Additionally, the capture of depth images at box 325 may occur on a single occasion, or on multiple occasions over time, thereby resulting in more robust and/or accurate collections of data regarding the external surfaces of the customer. At box 340, a depth model associated with the customer is retrieved from the data store, and at box 345, material data associated with the article of clothing in which the customer expressed interest at box 335 is accessed from the data store.

At box 350, whether the depth model of the customer retrieved from the data store is sufficiently precise for modeling the article of clothing on the customer is determined. A determination of precision or accuracy of the depth model may be determined with regard to a body of the customer as a whole or, alternatively, with regard to a specific body part onto which the article of clothing is to be used or worn. For example, where the article of clothing is a hat, the sufficiency of the depth model may be determined with respect to the customer as a whole, or with respect to his or her head and/or neck. Where the article of clothing is a shirt, the sufficiency of the depth model may be determined with regard to the customer as a whole, or with respect to his or her neck, torso, arms and/or waist.

If the depth model is sufficiently precise for modeling the article of interest on the customer, then the process advances to box 355, where an avatar is generated for the customer based on the depth model, and to box 380, where a visual representation of the article of clothing of interest is mapped to the avatar. The visual representation may be generated based on material data regarding the article of clothing, and one or more dimensions of relevant body parts of the customer, and may represent a prediction of the appearance or behavior of the article of clothing while being worn by the customer. For example, an avatar or other three-dimensional model in the form of a textured mesh or other visual representation may be generated based on the depth model, and the visual representation of the article of clothing may be mapped onto the avatar, along with any visual imaging data regarding external surfaces of the customer (e.g., exposed portions of the customer's skin or other external features, as well as one or more other articles of clothing that may be worn with the article of clothing of interest). At box 385, the avatar is displayed with the article of clothing of interest mapped thereon, and the process ends. The avatar may be displayed in a network page associated with an electronic marketplace, e.g., in an item details page, or in any other electronic or print format, and on any type of display device or print medium.

If the depth model is determined to be insufficiently precise at box 350, then the process advances to box 360, where a data store is searched for a body template that sufficiently matches the depth model of the customer. For example, where the depth model of the customer indicates that the customer is approximately six feet tall, and has bicep diameters of eighteen inches, arm lengths of thirty-five inches, a shoulder width of twenty inches, a waist of thirty-two inches and a leg length of thirty-eight inches, a body template that is at least partly consistent with one or more of the dimensions of the customer may be selected. At box 365, whether a sufficiently matching body template is identified is determined. If a sufficiently matching body template is identified, then the process advances to box 370, where an avatar is generated for the customer based on the matching body template, and to box 380, where a visual representation of the article of clothing of interest is mapped to the avatar. At box 385, the avatar is displayed with the visual representation of the article of clothing mapped thereon, and the process ends.

If a sufficiently matching body template is not identified at box 365, then the process advances to box 375, where an avatar is generated for the customer based on a virtual mannequin having one or more attributes of the customer, such as a mannequin having the height, the shoulder width, the leg lengths or arm lengths of the customer. At box 380, a visual representation of the article of clothing of interest is mapped to the avatar. At box 385, the avatar is displayed with the visual representation of the article of clothing mapped thereon, and the process ends.

Figure 4:
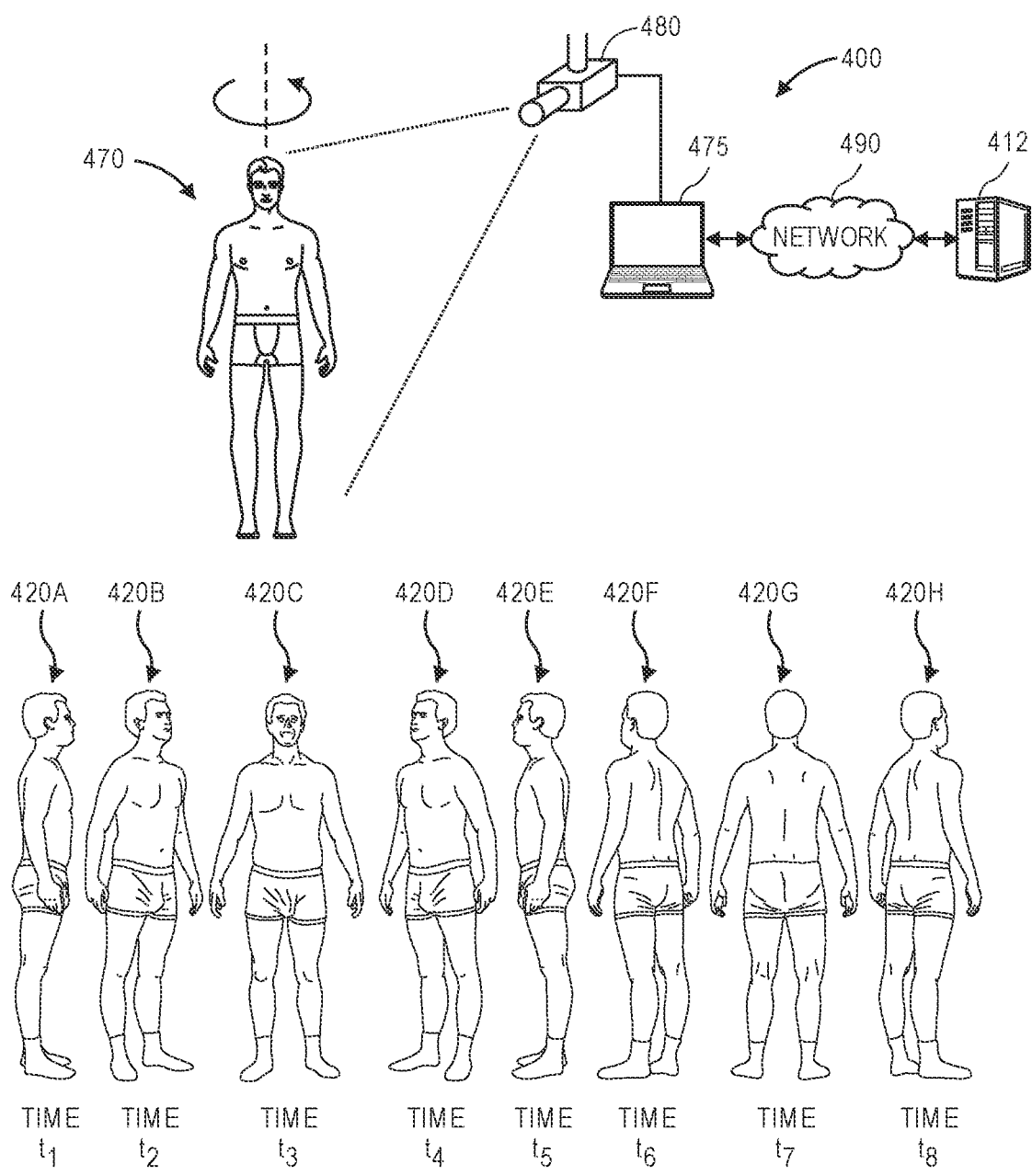
FIG. 4 is a view of aspects of one system in accordance with embodiments of the present disclosure.

As is discussed above, a point cloud or other depth model of a customer may be captured using an imaging device, e.g., an RGBD camera, as the customer stands in one or more poses or executes one or more gestures within a field of view thereof. Referring to FIG. 4, a view of aspects of one system 400 in accordance with embodiments of the present disclosure is shown. The system 400 includes a server 412 (e.g., a server associated with a marketplace, a retail establishment or any other entity or individual), a computer 475, an imaging device 480 connected to one another over a network 490, which may include the Internet in whole or in part. A customer 470 wearing an undergarment rotates or executes any number of other gestures while standing within a field of view of the imaging device 480, which captures a plurality of depth images 420A, 420B, 420C, 420D, 420E, 420F, 420G, 420H of the customer 470. The depth images 420A, 420B, 420C, 420D, 420E, 420F, 420G, 420H may be processed to subtract background or other stationary features from the depth images to recognize only the moving customer 470 therein, and a point cloud or other depth model may be generated based on the resulting imaging data. The point cloud or other depth model may be used to generate an avatar or other three-dimensional model of a customer, and visual representations of clothing and/or other surface features of the customer may be mapped thereon and displayed to a customer.

Alternatively, a single depth image, e.g., any one of the depth images 420A, 420B, 420C, 420D, 420E, 420F, 420G, 420H, or a single visual image may be used to generate an avatar or other three-dimensional model of a customer. For example, in some embodiments, where a single depth image or a single visual image is captured or otherwise obtained from the customer (e.g., uploaded by the customer), one or more dimensions or other physical properties of the customer may be determined based on the single depth image or the single visual image and used to select a corresponding virtual mannequin or a virtual body template of a customer from which an avatar or three-dimensional model may be generated.

Figure 5:
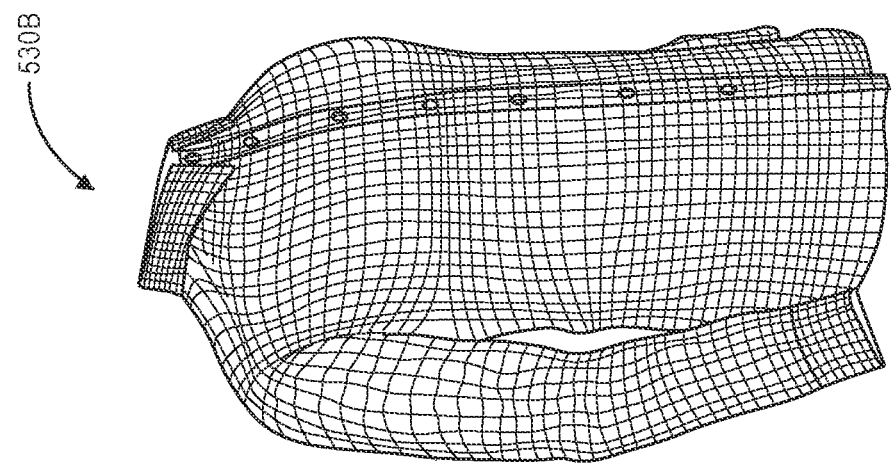
FIG. 5 is a view of data in accordance with embodiments of the present disclosure.
Figure 5:
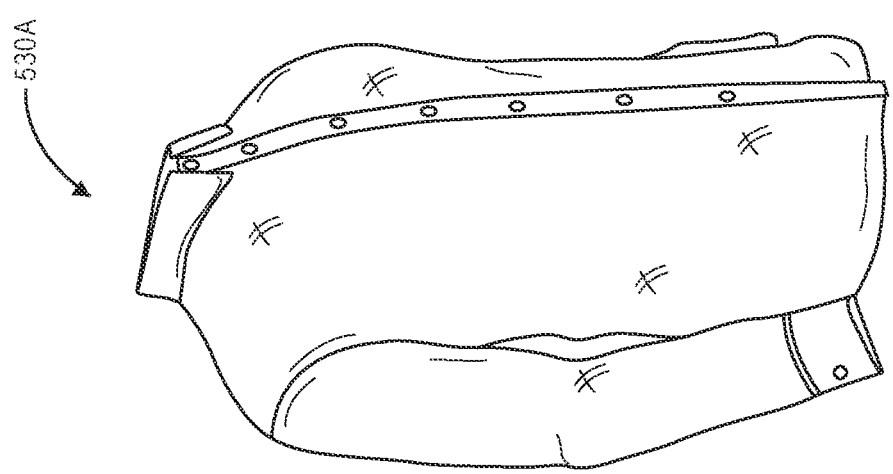

Material data regarding an article of clothing may be obtained from a manufacturer of the article of clothing, e.g., from experimental analyses of one or more component parts of the article of clothing, from which a three-dimensional model of the appearance and the behavior of the article of clothing may be generated, or from any other source. Referring to FIG. 5, an article of clothing 530A (viz., a long-sleeved collared shirt) is shown. The article of clothing 530A may be formed from any suitable fabrics, e.g., woven fabrics such as those formed from cotton or linens, knitted fabrics, or non-woven fabrics. The appearance and behavior of the article of clothing 530A may be determined or predicted by any experimental techniques performed on one or more samples of the fabric from which the article of clothing 530A is formed. For example, metrics such as a bending stiffness or rigidity, a bending elastic potential, a bending curvature or an elastic bending moment of the article of clothing 530A may be determined according to one or more bending tests. Additionally, metrics such as tensile stress or tensile strains, or energy absorbed or resilience, of the article of clothing 530A may be determined by applying loads to the article of clothing 530A in tension, and measuring deflections or other reactions of the article of clothing 530A in response to such loads.

As another example, metrics representative of surface friction of the article of clothing 530A may be determined by applying a normal (i.e., perpendicular) force to the article of clothing 530A, and measuring a lateral force required to cause the article of clothing 530A to move in response to the normal force. Similarly, metrics representative of a roughness of the article of clothing 530A may be determined by observing surface variations within the article of clothing 530A in response to internal or external forces. Metrics representative of shear of the article of clothing 530A may be determined by applying forces in parallel to edges of the article of clothing 530A, and observing a response of the article of clothing 530A. Likewise, metrics representative of compression or compressibility of the article of clothing 530A may be determined by compressing the article of clothing 530A, e.g., by normal forces, and observing a response of the article of clothing 530A.

The various properties of the article of clothing 530A may be used to define a three-dimensional model 530B of the article of clothing 530A. For example, the three-dimensional model 530B of the article of clothing 530A may represent an appearance or a behavior of the article of clothing 530A, or of various individual faces, panels, sheets, threads, stitches, fasteners or other aspects of the article of clothing 530A, in response to being worn. Subsequently, when surface data regarding a given customer is determined, the three-dimensional model 530B may be used to predict the appearance or the behavior of the article of clothing 530A on the given customer. A visual representation of the three-dimensional model 530B may be generated and mapped onto an avatar corresponding to the customer.

Figure 6A:
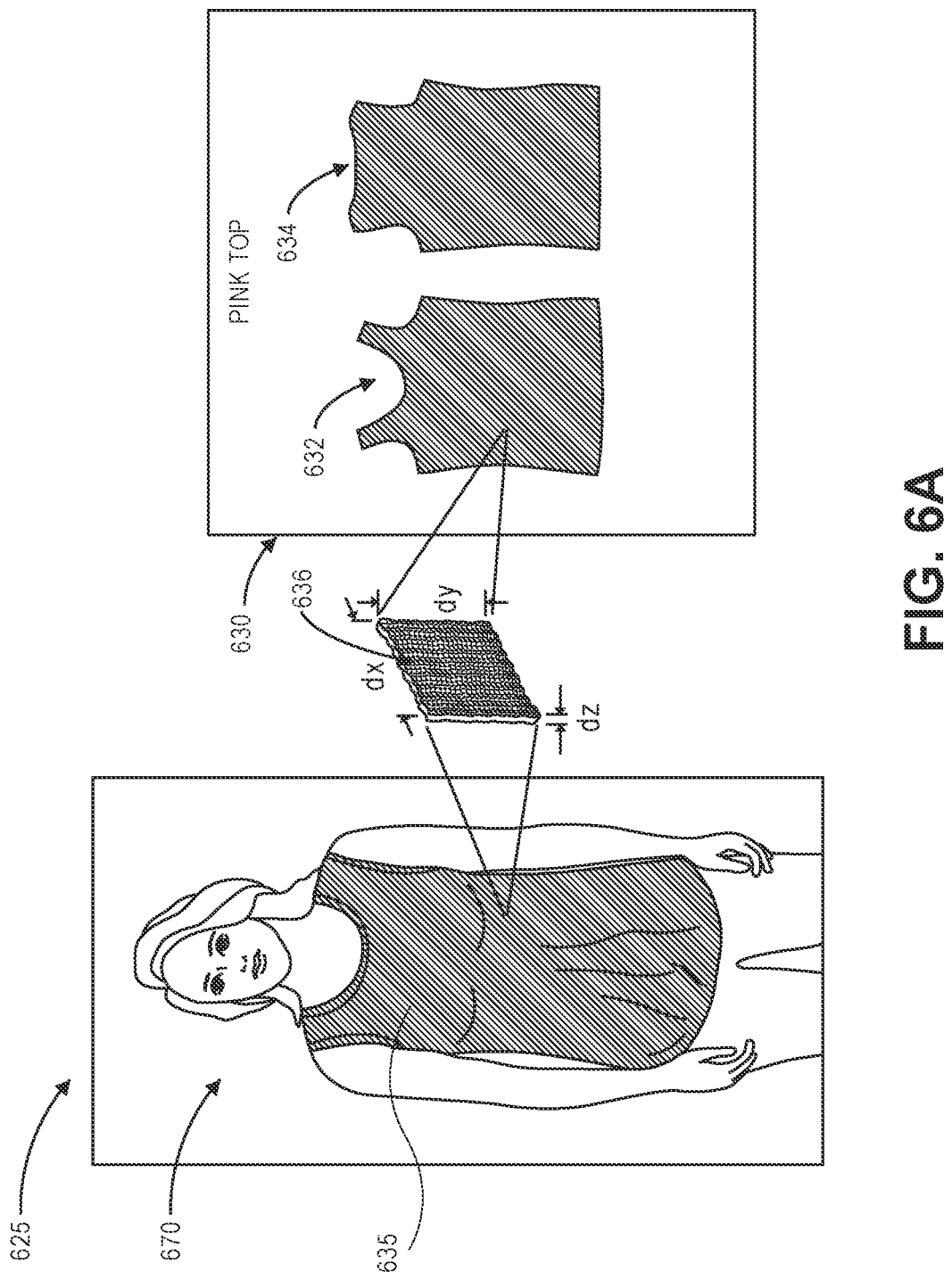
FIGS. 6A and 6B are views of aspects of one system in accordance with embodiments of the present disclosure.
Figure 6B:
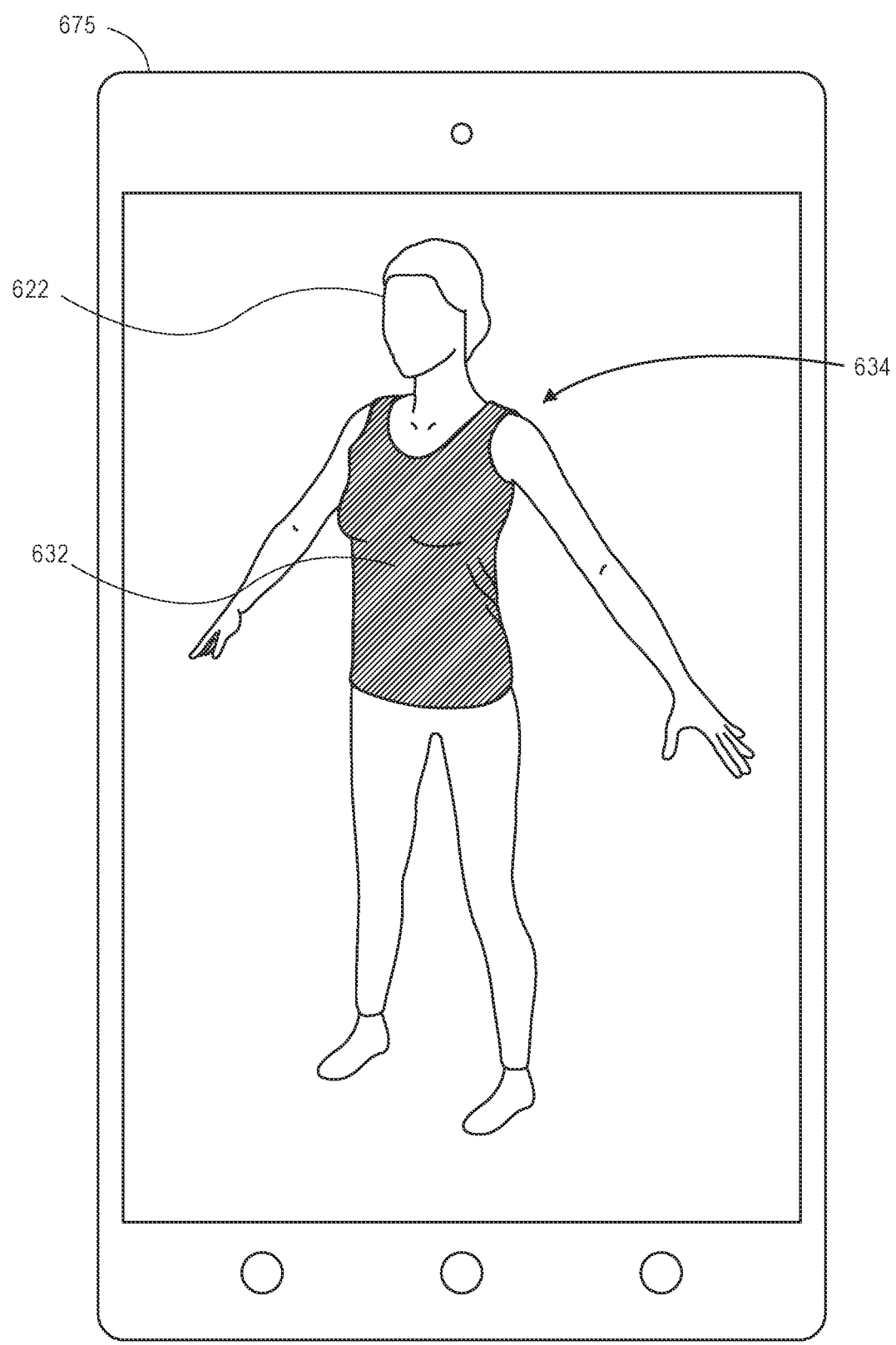

Material data regarding an article of clothing may also be determined based on imaging data captured from the article of clothing. Referring to FIGS. 6A and 6B, an image 625 of a customer 670 wearing an article of clothing 635 (e.g., a tank top) is shown. Based on the image 625, one or more elements of material data 630 regarding the article of clothing 635 may be determined. For example, as is shown in FIG. 6A, shapes, dimensions and/or contours of two or more panels 632, 634 of the article of clothing 635 may be identified by one or more image processing techniques. Additionally, a representative sample 636 or portion of the article of clothing 635 having a length dx, a width dy and a thickness dz may be recognized in the image 625, and one or more vision-based analyses may be conducted to determine a density of the sample 636, as well as weave patterns (where appropriate), colors, responses of the sample 636 to bending, shear, tension, or compression, or other attributes of the sample 636 may also be determined. Information or data gathered by an analysis of the image 625 may be used in any manner to determine or predict an appearance or a behavior of the article of clothing 635 when the article of clothing 635 is worn by a customer. As is shown in FIG. 6B, a mobile device 675 of the customer 670 displays a visual representation of the article of clothing 635 as mapped upon an avatar 622 corresponding to the customer 670.

In accordance with some embodiments of the present disclosure, material data in the form of avatars or other three-dimensional models of articles of clothing may be determined or generated on any basis, including according to one or more methods or processes from which three-dimensional models of customers may be generated, such as the process described above with regard to the flow chart 300 of FIG. 3. For example, a three-dimensional model of an article of clothing may be generated by capturing imaging data (e.g., visual images and/or depth images) of the article of clothing and classifying the article of clothing as one of a particular category or type (e.g., a tank top, such as the article of clothing 635 of FIGS. 6A and 6B) based on the imaging data.

Material data such as three-dimensional models of the article of clothing may also be generated based on information or data corresponding to articles of clothing of the type, including information or data regarding dimensions, seams, cuts, stitches, fasteners or other attributes commonly associated with articles of clothing of the type, such as according to a template of information regarding articles of clothing of the type. Additionally, or alternatively, a three-dimensional model or other material data regarding the article of clothing may be generated based on any information or data regarding a customer who was wearing the article of clothing when one or more depth images or visual images of the article of clothing were captured. For example, sizes, shapes or dimensions of features of an article of clothing may be predicted or determined from sizes, shapes or dimensions of customers, which may be determined from visual images or depth images captured from such customers, or based on information or data already known regarding the customers.

Material data such as three-dimensional models of articles of clothing may also be determined or generated based on one or more combinations of information or data that may be acquired or obtained from any source. For example, where a visual image is captured of a customer wearing a pink tank top, such as the customer 670 of FIG. 6A, a purchasing history of the customer may be searched for information or data regarding pink tank tops previously purchased by the customer, and material data regarding the pink tank top may be identified or generated based on any information or data that may be known regarding pink tank tops previously purchased by the customer.

Figure 7C:
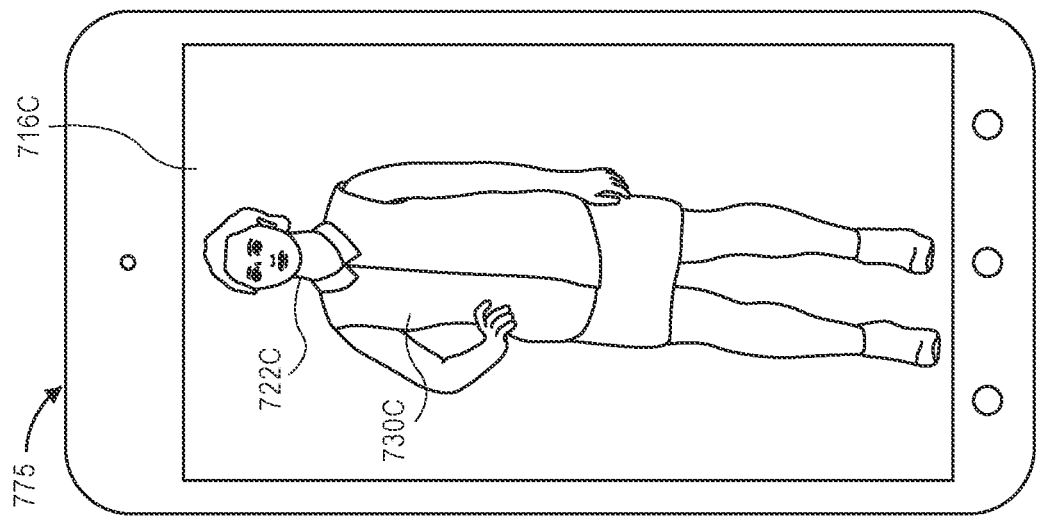
FIGS. 7A through 7C are views of aspects of one system in accordance with embodiments of the present disclosure.
Figure 7B:
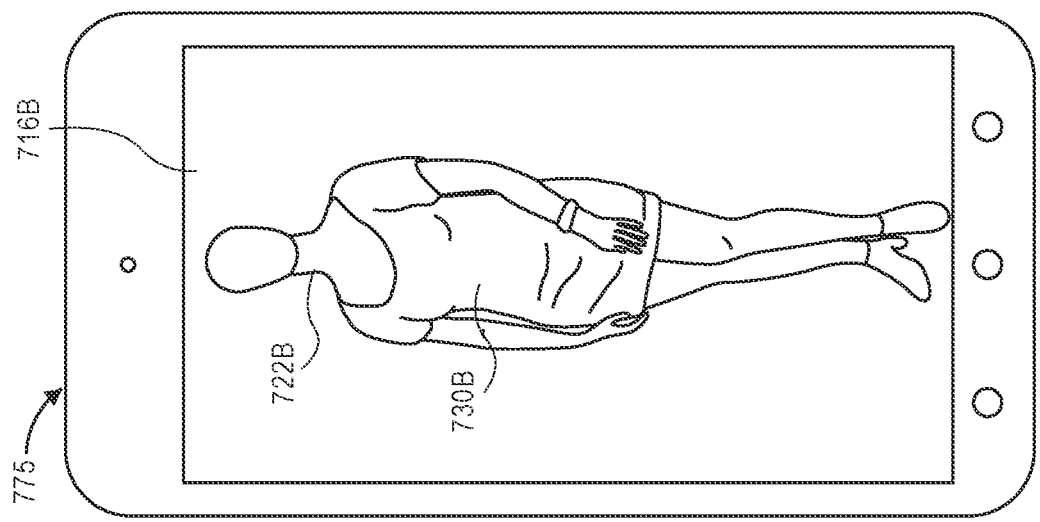
Figure 7A:
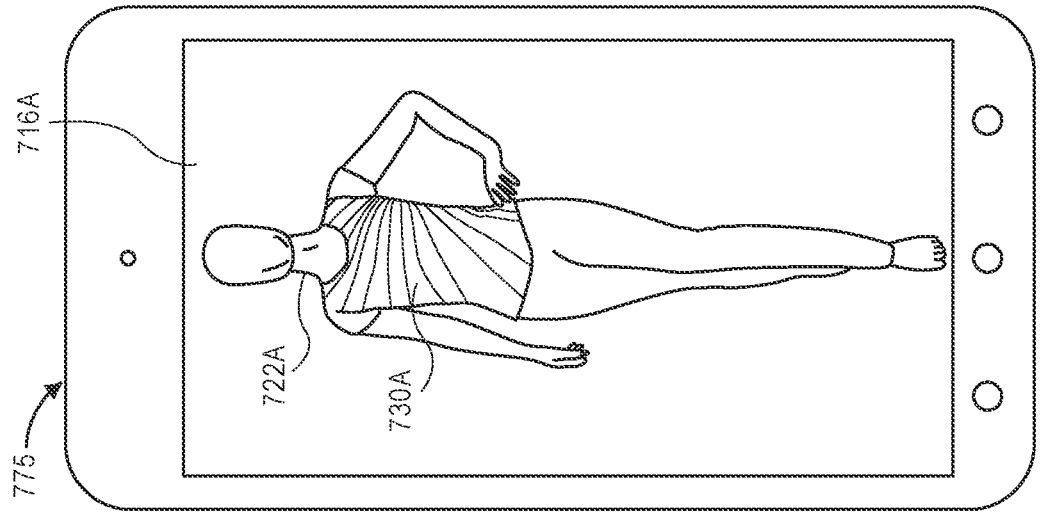

An avatar or other three-dimensional model of a customer may be generated based on any available information or data regarding the customer, including but not limited to visual images and/or depth images captured from the customer by an imaging device (e.g., an RGBD camera) in real time, in near-real time, or at any prior time. The level of resolution or quality of the avatar or other three-dimensional model may be selected or determined based on the extent or quality of available imaging data. Referring to FIGS. 7A through 7C, views of aspects of one system in accordance with embodiments of the present disclosure are shown.

As is shown in FIG. 7A, a mobile device 775 includes a network page 716A rendered or displayed thereon. The network page 716A depicts a visual representation of an article of clothing 730A on an avatar 722A. The avatar 722A is an abstract, plastic structure having generic features for supporting articles of clothing, such as the article of clothing 730A, thereon. The avatar 722A may be selected for depicting the wearing of one or more articles of clothing by a customer where the resolution of the depth imaging data and/or visual imaging data for the customer is insufficient to model the customer with an acceptable degree of resolution. For example, where a customer's height, shoulder width, hip width or leg length may be calculated or predicted from one or more depth images, or from one or more visual images, a virtual mannequin or stick figure having dimensions corresponding to the height, the shoulder width, the hip width or the leg length may be selected, and the avatar 722A may be generated based on the virtual mannequin or stick figure.

As is shown in FIG. 7B, the mobile device 775 includes a network page 716B rendered or displayed thereon. The network page 716B depicts a visual representation of an article of clothing 730B on an avatar 722B. The avatar 722B is generated based on actual imaging data captured from a customer, which may be sufficiently precise to recognize sizes, shapes or dimensions of the customer, but insufficient to recognize such sizes, shapes or dimensions with clarity, or over extended periods of time. Therefore, a body template having similar sizes, shapes or dimensions to the customer, as recognized in imaging data, may be identified and used as a basis for generating the avatar 722B. The body template may be one of a plurality of templates, each having discrete sizes, shapes or dimensions, and may be selected according to any algorithm or analysis that identifies sizes, shapes or dimensions of the customer and compares such sizes, shapes or dimensions to the sizes, shapes or dimensions of the plurality of templates, e.g., a clustering algorithm.

As is shown in FIG. 7C, the mobile device 775 includes a network page 716C rendered or displayed thereon. The network page 716C depicts a visual representation of an article of clothing 730C on an avatar 722C. The avatar 722C is generated based on actual imaging data captured from a customer, which is sufficiently precise to recognize sizes, shapes or dimensions of the customer with clarity, or over extended periods of time. The avatar 722C may be generated based directly on a point cloud or other depth model of the customer, and any visual imaging data corresponding to the customer may be identified and mapped thereon, along with one or more images corresponding to the article of clothing 730C being worn by the customer.

Figure 8A:
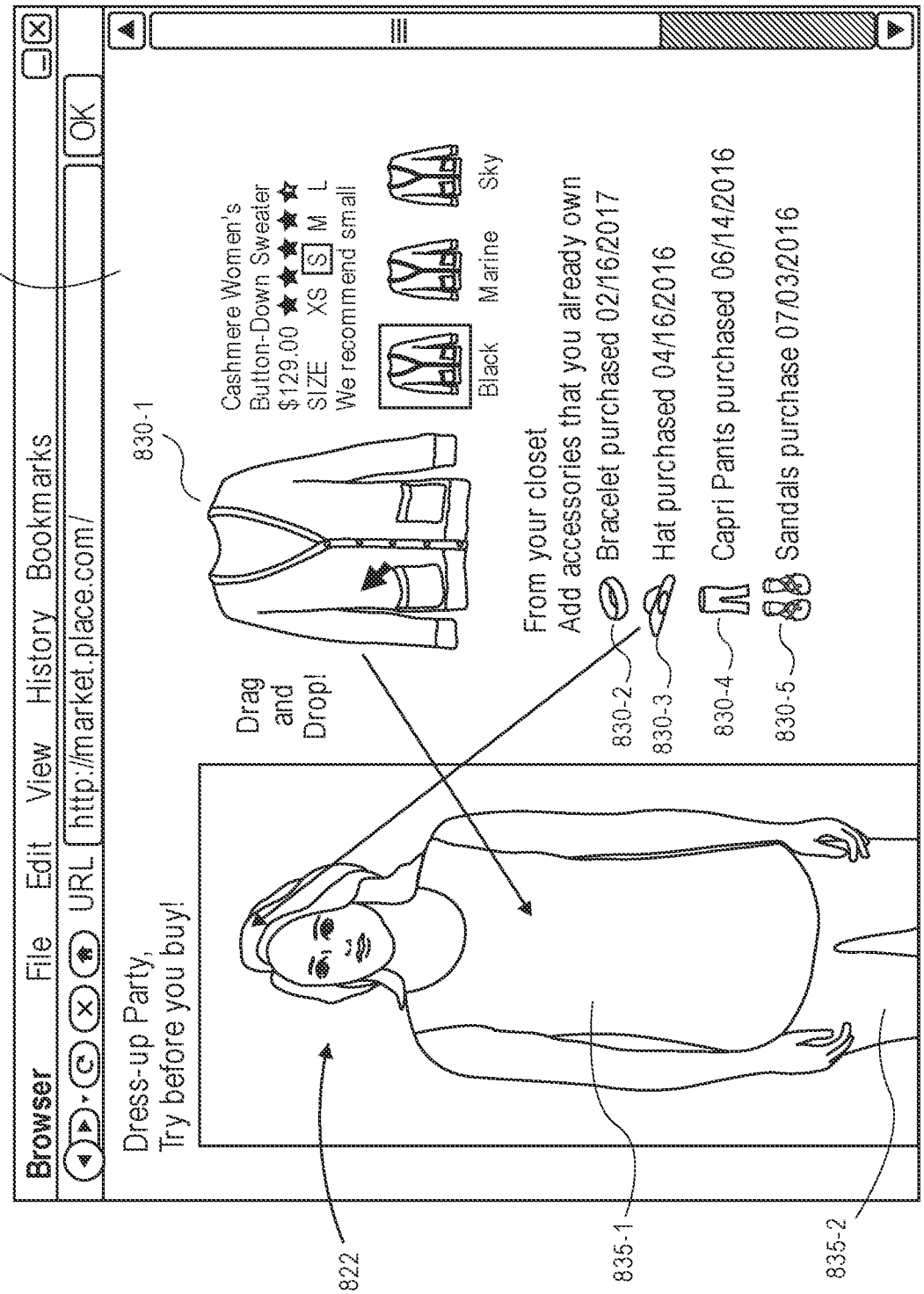
FIGS. 8A and 8B are views of aspects of one system in accordance with embodiments of the present disclosure.
Figure 8B:
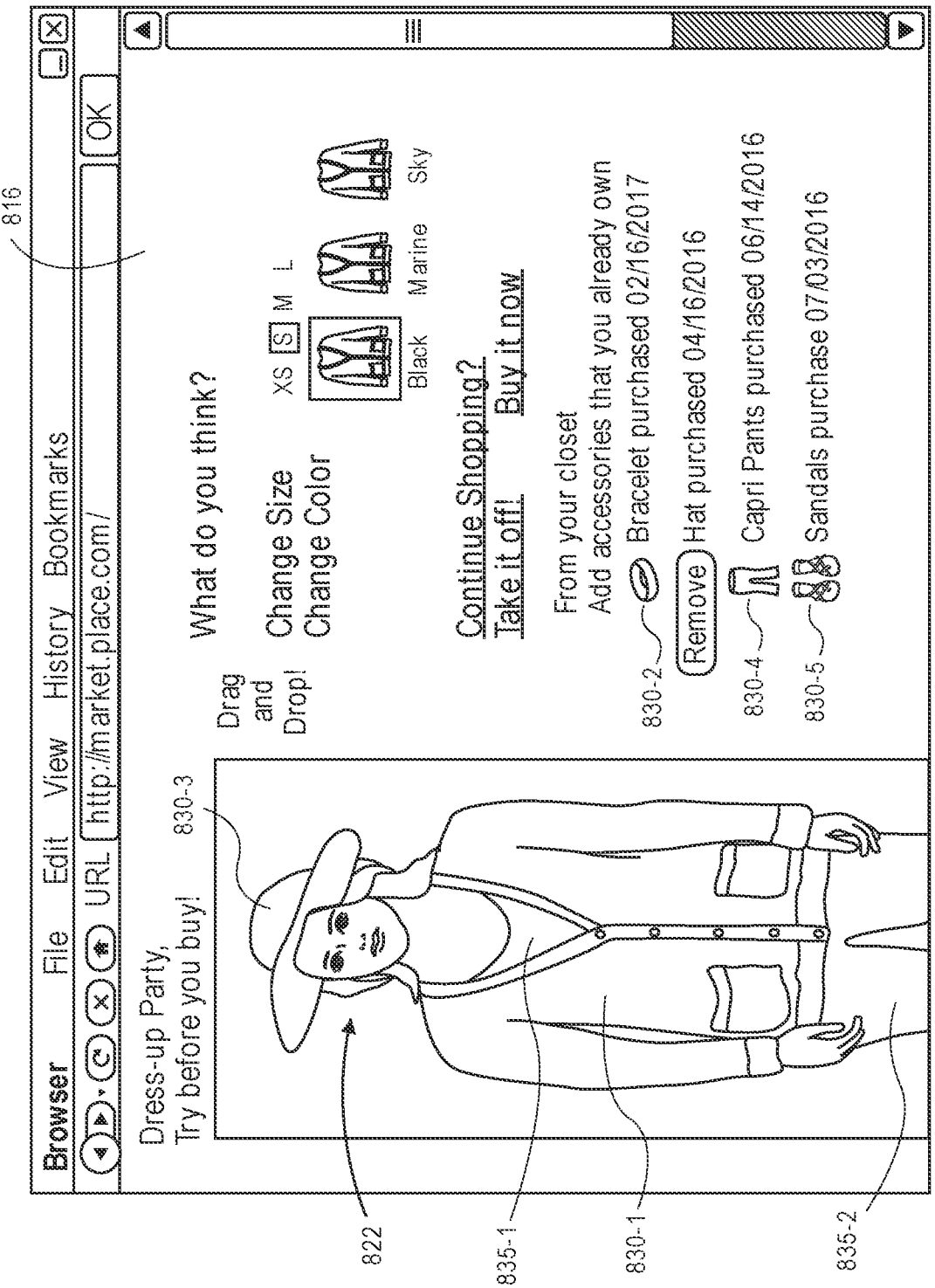

In accordance with the present disclosure, avatars or other three-dimensional models of a customer may be displayed on a user interface, and the customer or one or more other entities or individuals may select images of articles of clothing, icons corresponding to the articles of clothing, or other identifiers of the articles of clothing, and may cause the articles of clothing to be displayed on the avatars or other three-dimensional models. The articles of clothing displayed on the avatars or other three-dimensional models may be articles that the customer is considering purchasing, e.g., articles of clothing available for purchase from an electronic marketplace, or articles that the customer is known or determined to already own, e.g., based on a purchasing history maintained in a profile of the customer at an electronic marketplace. Referring to FIGS. 8A and 8B, views of aspects of one system in accordance with embodiments of the present disclosure are shown.

As is shown in FIG. 8A, a network page 816 associated with an electronic marketplace includes an image of an avatar 822 corresponding to a customer. The avatar 822 includes a visual representation of paired articles of clothing 835-1, 835-2 (e.g., a top and a pair of pants). The network page 816 further includes a number of details corresponding to an article of clothing 830-1 (viz., a sweater) that the customer is considering for purchase, such as a name or another identifier of the article of clothing 830-1, a price of the article of clothing 830-1, and a rating of the article of clothing 830-1 (e.g., according to a star-based system). The network page 816 further includes selectable options or features for selecting a size or a color of the article of clothing 830-1. Additionally, the network page 816 specifies a recommended size of the article of clothing 830-1 for the customer, which may be identified based on the customer's known or determined sizes, shapes or dimensions, as well as the customer's purchasing history. The network page 816 also includes images or icons corresponding to articles of clothing 830-2, 830-3, 830-4, 830-5 that the customer has previously purchased from the electronic marketplace. For example, the network page 816 includes an icon corresponding to a bracelet 830-2 that was previously purchased by the customer, as well as icons corresponding to a hat 830-3, a pair of pants 830-4 and a pair of sandals 830-5 previously purchased by the customer.

In some embodiments, the article of clothing 830-1 may be selected on any basis, including but not limited to an entry of a keyword corresponding to the article of clothing 830-1 into a search box or other feature of an electronic marketplace, a selection of a hyperlinked element (e.g., text, images or other features) corresponding to the article of clothing 830-1, or a category of the article of clothing 830-1, or on any other basis. In some embodiments, the articles of clothing 830-2, 830-3, 830-4, 830-5 may be selected for display on the network page 816 with the article of clothing 830-1, including but not limited to attributes or other features of the articles (e.g., colors, sizes, shapes, dimensions), as well as conditions, instructions or restrictions on their use. For example, each of the articles of clothing 830-2, 830-3, 830-4, 830-5 may be readily worn with the article of clothing 830-1, or the articles of clothing 835-1, 835-2, and may be selected on that basis, whereas any cold-weather gear or sporting goods may be omitted from consideration.

In accordance with the present disclosure, images, icons or other identifiers of the articles of clothing 830-1, 830-2, 830-3, 830-4, 830-5 may be selected and caused to be displayed on the avatar 822, e.g., by a drag-and-drop gesture or other interaction. For example, as is shown in FIG. 8A, images or icons corresponding to the article of clothing 830-1 and the article of clothing 830-3 may be dragged onto the avatar 822.

As is shown in FIG. 8B, the network page 816 is shown with the avatar 822 having the articles of clothing 835-1, 835-2, and the articles of clothing 830-1, 830-3, viz., the sweater that the customer is considering for purchase and the hat that the customer has already purchased, projected thereon. The network page 816 of FIG. 8B also includes options for changing a size or a color of the article of clothing 830-1 on the avatar 822, as well as options for purchasing the article of clothing 830-1, or for removing the articles of clothing 830-1, 830-3 from the avatar 822. The network page 816 of FIG. 8B also includes options for adding the articles of clothing 830-2, 830-4, 830-5 to the avatar 822.

In some embodiments, a customer may be positioned within a field of view of an imaging device, and imaging data in the form of visual images and/or depth images may be continuously captured from the customer. Still or moving avatars may be generated based on the visual images and/or the depth images, and visual representations of the appearance and/or behavior of one or more items of interest may be projected upon the avatars and displayed to the customer, either on a display such as a computer screen or television, or by a virtual reality system (e.g., a virtual reality headset). In some embodiments, the customer may pick and choose the articles of clothing to be depicted on the avatar, including articles of clothing that the customer does not own but is considering for purchase, or articles of clothing that the customer already owns.

Figure 9A:
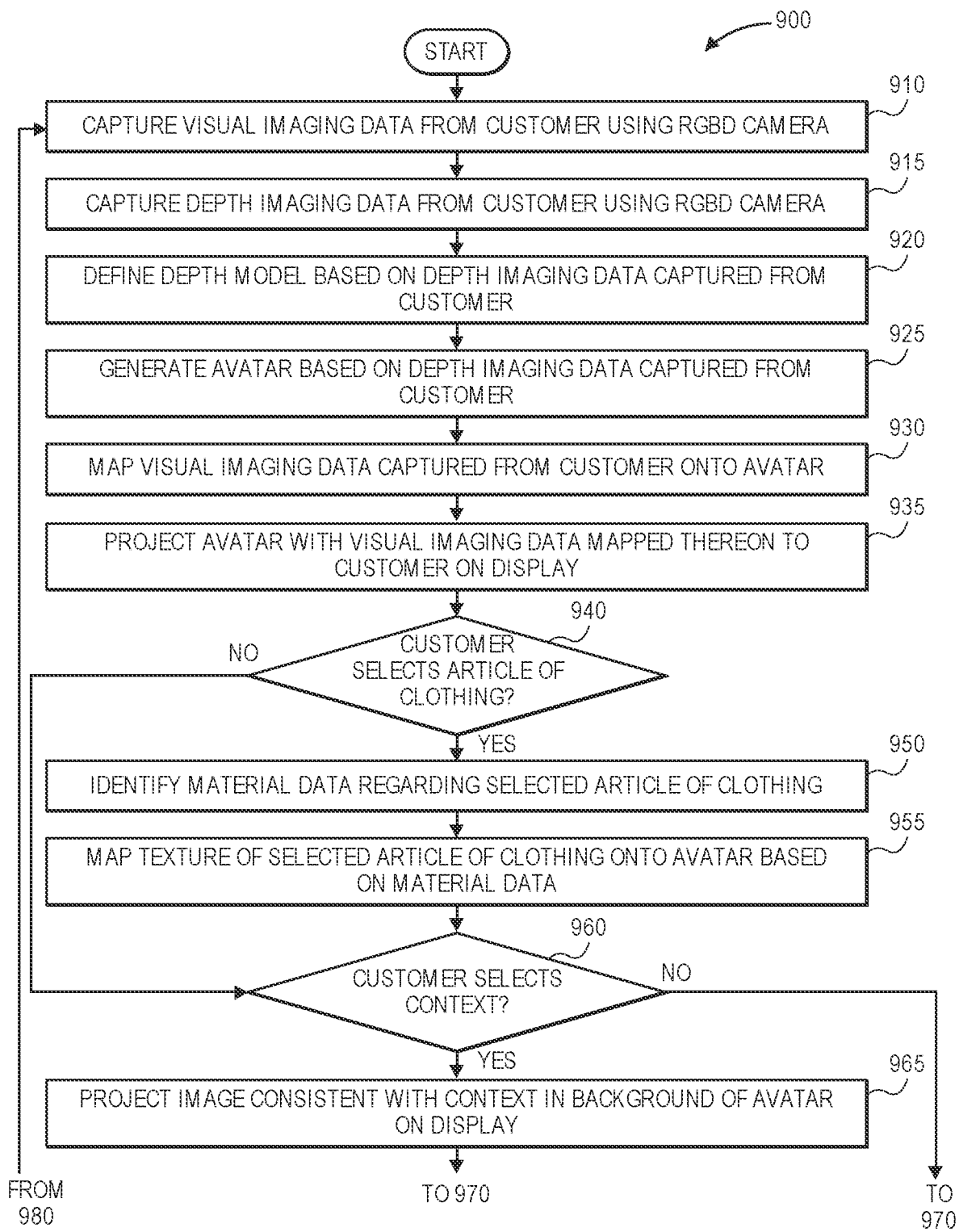
FIGS. 9A and 9B are a flow chart of one process in accordance with embodiments of the present disclosure.
Figure 9B:
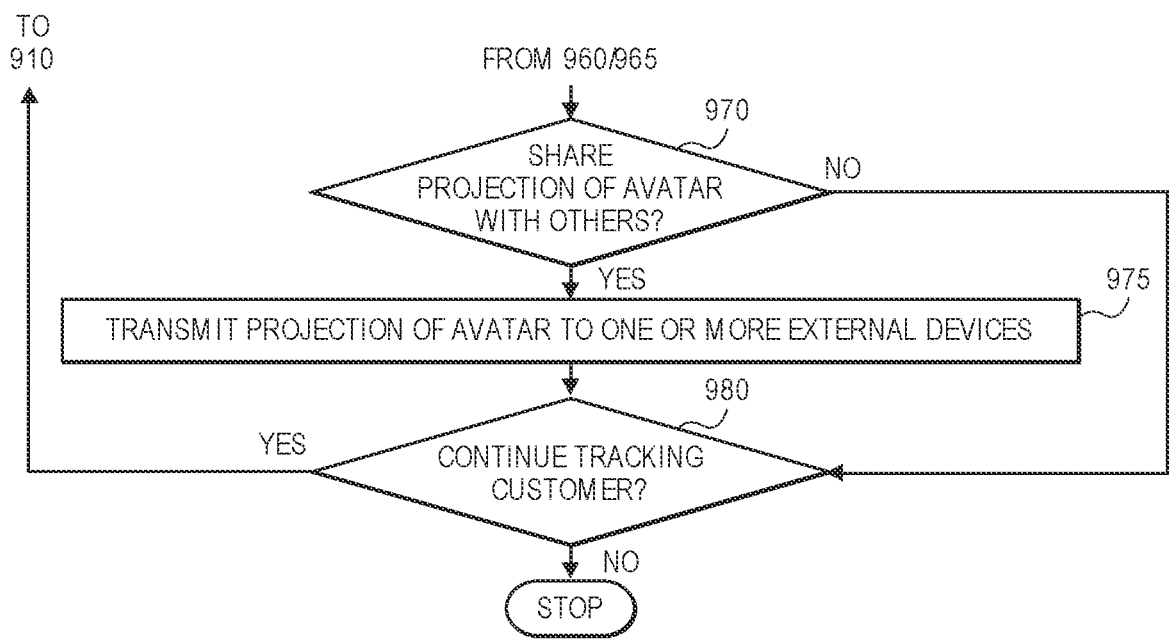

Referring to FIGS. 9A and 9B, a flow chart of one process in accordance with embodiments of the present disclosure is shown. At box 910, visual imaging data is captured from a customer using an RGBD camera, and at box 915, depth imaging data is captured from the customer using the RGBD camera. The visual imaging data may include color images, grayscale images, black-and-white images or other images, while the depth imaging data may include one or more depth images or other representations of distances to external surfaces of the customer). At box 920, a depth model is defined based on the depth imaging data captured from the customer, e.g., by subtracting background or other stationary features from the depth images, or by any other method or technique, and at box 925, an avatar or other three-dimensional model is generated based on the depth imaging data captured from the customer (e.g., a textured mesh). At box 930, at least some of the visual imaging data is mapped onto the avatar, for example, to give the avatar the appearance of the customer's skin or other exposed features.

At box 935, the avatar is projected with the visual imaging data corresponding to the customer mapped thereon on a computer display or, alternatively, on one or more other monitors, televisions or screens, or by a virtual reality system (e.g., a virtual reality headset). For example, the avatar may be displayed to the customer on a network page associated with an electronic marketplace, a retail establishment or any other entity or individual, or on a page rendered by a dedicated shopping application. Alternatively, or additionally, the avatar may be displayed to one or more of the customer's friends, family or staff associated with the electronic marketplace or retail establishment (e.g., a "personal shopper") on one or more pages. At box 940, whether a customer selects an article of clothing is determined. For example, where the avatar is displayed with the visual imaging data mapped thereon on a network page associated with an electronic marketplace, the network page may also include images, icons or other features that may be selected for display on the avatar, e.g., by a drag-and-drop or like procedure. The article of clothing may be an article that is offered for sale by an electronic marketplace or retail establishment or, alternatively, an article that the customer is known or believed to already own, such as based on a purchasing history maintained in a customer profile.

If the customer selects an article of clothing, the process advances to box 950, where material data regarding the selected article of clothing is identified, such as in one or more data stores, and to box 955, where a texture of the selected article of clothing is mapped onto the avatar based on the material data.

If the customer did not select an article of clothing at box 940, or after the selected article of clothing has been mapped onto the avatar at box 955, the process advances to box 960, where whether the customer has selected a context is determined. For example, the customer may identify a place where the customer intends to wear an article of clothing, an activity during which the customer intends to wear the article of clothing, or any other context that may be associated with the article of clothing, such as by entering one or more keywords into a search box, selecting an option in a drop-down menu, or in any other manner. If the customer has selected a context, then the process advances to box 965, where one or more images consistent with the context is projected on a background behind the avatar on the display. For example, where the customer has selected a context corresponding to a beach, images of sand, waves, umbrellas or the like may be projected behind the avatar, to simulate an environment in which the customer, represented by the avatar, is located. The context may be selected with any level of generality or specificity, and an image corresponding to the level of generality or specificity may be selected accordingly. For example, a customer may select a context of "urban setting," "New York City," or "200 East 82nd Street," and an image of any urban skyline, an image of any New York building or park, or an image of a specific building located at 200 East 82nd Street, respectively, may be projected behind the avatar.

If the customer did not select a context, or after an image corresponding to a selected context has been projected as a background of the avatar, then the process advances to box 970, where the customer is prompted to share the projection of the avatar with others, e.g., friends, family members or other entities or individuals. If the customer opts to share the projection of the avatar, e.g., by providing one or more telephone numbers, electronic addresses, social network addresses, or any other account identifiers of other entities or individuals, the process advances to box 975, where the projection of the avatar is transmitted to one or more external devices over a network. In some embodiments, where the customer views and/or interacts with a projection of the avatar using a virtual reality system, the projection of the avatar may be shared with another user of another virtual reality system, who may then interact with the avatar or other data accordingly. At box 980, whether the continued tracking of the customer is desired is determined. If the continued tracking is desired, then the process returns to box 910, where visual imaging data is captured from the customer using the RGBD camera, and to box 915, where depth imaging data is captured from the customer using the RGBD camera. If the continued tracking of the customer is no longer desired, however, the process ends.

Figure 10:
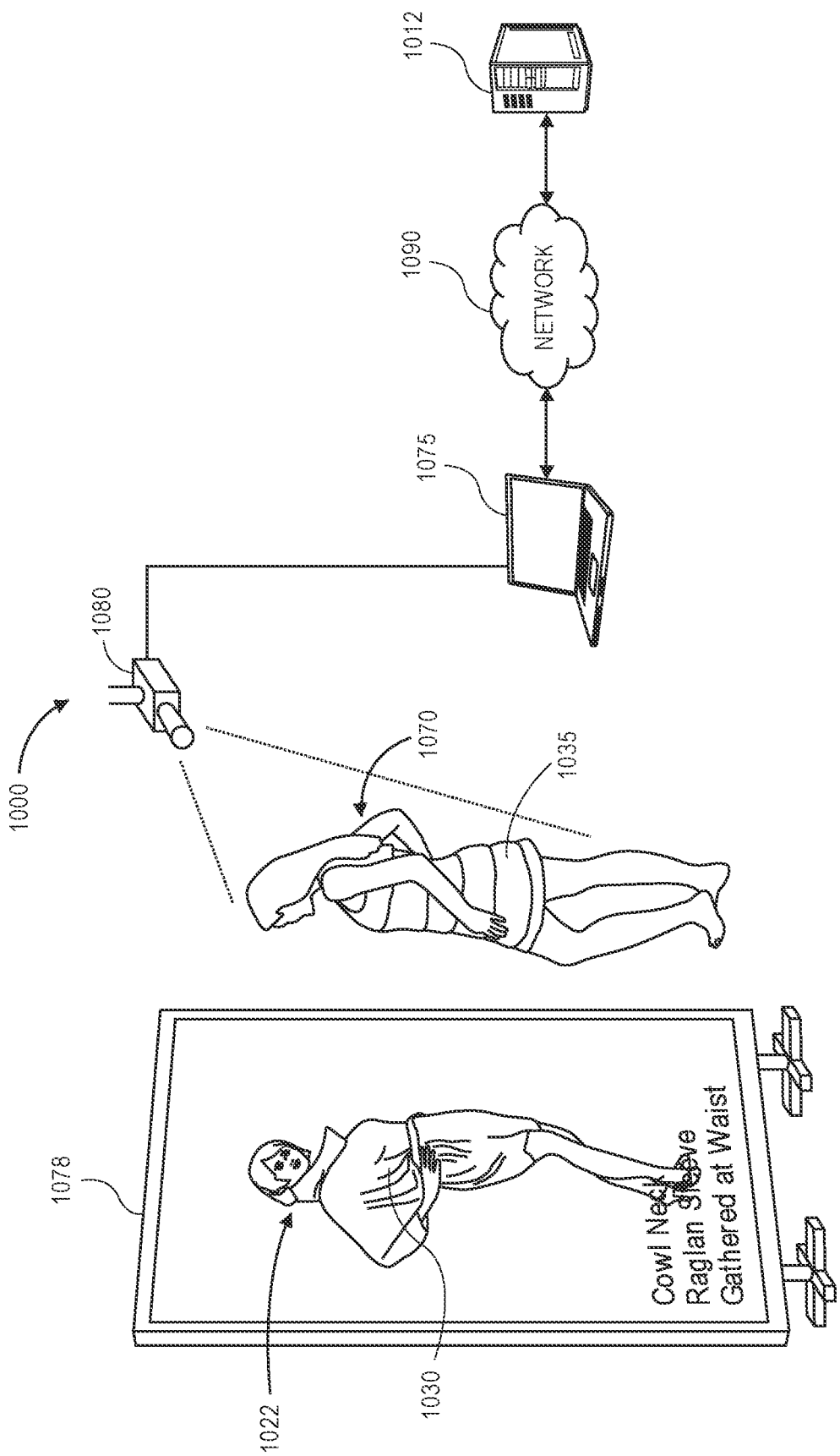
FIG. 10 is a view of aspects of one system in accordance with embodiments of the present disclosure.

Some embodiments of the present disclosure may act as "virtual mirrors" in which a customer may view articles of clothing on an avatar corresponding to his or her size, shape or dimensions. Referring to FIG. 10, a view of aspects of one system 1000 in accordance with embodiments of the present disclosure is shown. The system 1000 includes a marketplace server 1012 and a computer device 1075 (e.g., a laptop computer) connected to one another over a network 1090, which may include the Internet in whole or in part. The system 1000 further includes a display 1078 and an RGBD camera 1080 connected to the computer device 1075 by wired or wireless means. The system 1000 may be provided in a home of the customer 1070, or in one or more alternate locations, such as a bricks-and-mortar retail establishment, or in one or more kiosks or stations.

As is shown in FIG. 10, a customer 1070 stands in front of the RGBD camera 1080 while wearing a first article of clothing 1035. Depth imaging data and visual imaging data may be captured from the customer 1070 as the customer 1070 stands in one or more poses, or executes one or more gestures. Based on the depth imaging data and visual imaging data captured by the RGBD camera 1080, an avatar 1022 corresponding to the customer 1070 may be generated accordingly. The avatar 1022 may be shown in a series of still or moving images as the customer 1070 stands in the one or more poses, or executes the one or more gestures.

In accordance with the present disclosure, a visual representation of a second article of clothing 1030, which may be available for purchase via an electronic marketplace associated with the marketplace server 1012, may be projected onto the avatar 1022 and displayed to the customer 1070 on the display 1078 as the customer 1070 stands in the one or more poses or executes the one or more gestures. The display 1078 thus acts as a virtual mirror for the customer 1070, and depicts how the second article of clothing 1030 will appear or behave while being worn by the avatar 1022, which is generated based on imaging data captured from the customer 1070, even as the customer 1070 wears the first article of clothing 1035. Additionally, the display 1078 may further render other information or data (e.g., metadata) regarding the second article of clothing 1030, including any identifiers of the second article of clothing 1030 or the materials from which it was formed, or, alternatively, information regarding a context in which the second article of clothing 1030 is intended to be used.

Thus, the customer 1070 may virtually "try on" the second article of clothing 1030 without having to travel to a retail establishment, locate a dressing room or other area, disrobe and remove the first article of clothing 1035, or even physically handle the second article of clothing 1030. Depending on the quality and richness of the depth imaging data or the visual imaging data captured by the RGBD camera 1080, the avatar 1022 may accurately depict the appearance and behavior of the second article of clothing 1030 while being worn by the customer 1070.

Figure 11A:
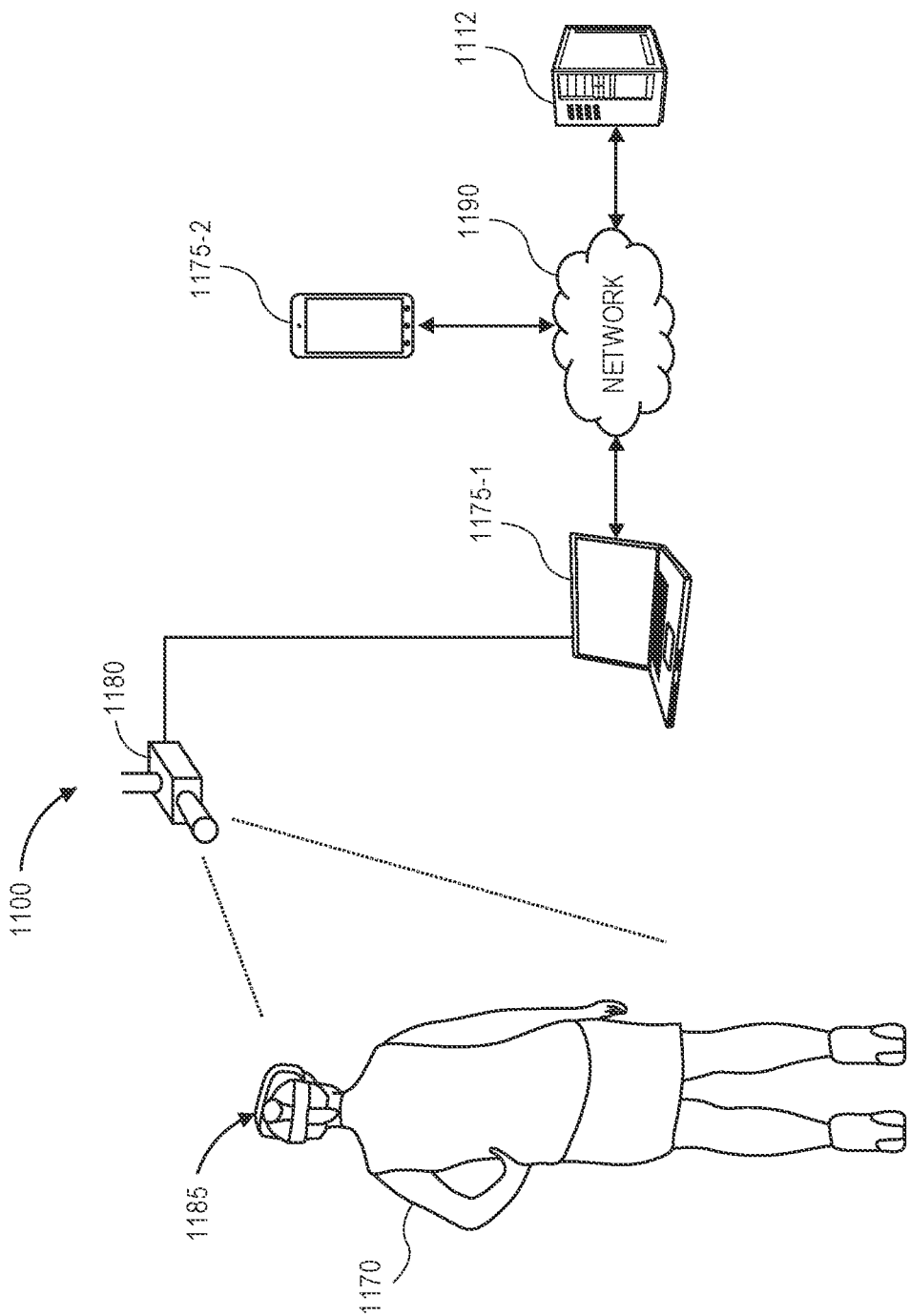
FIGS. 11A through 11C are views of aspects of one system in accordance with embodiments of the present disclosure.
Figure 11C:
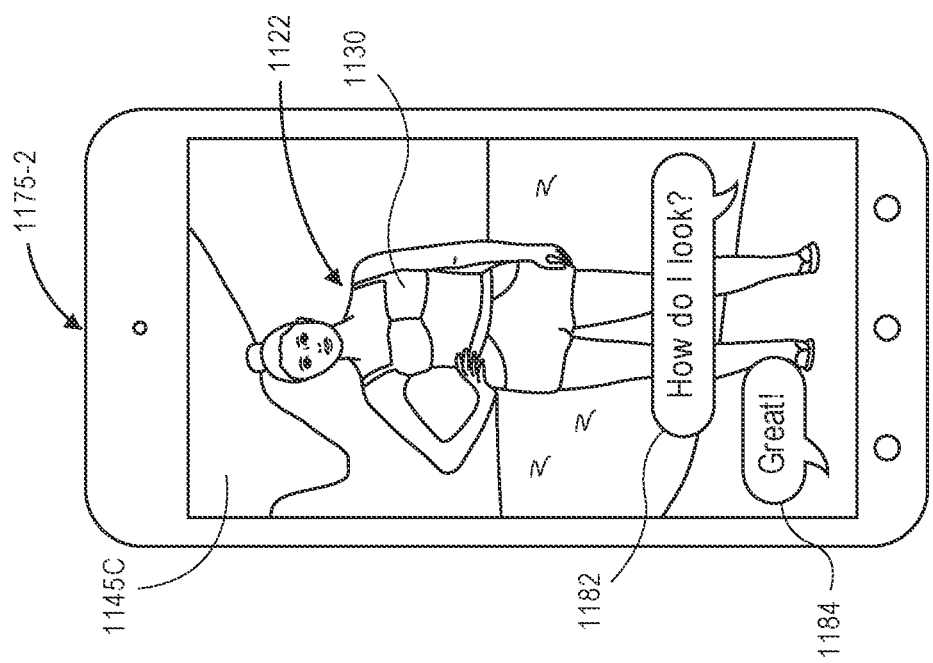
Figure 11B:
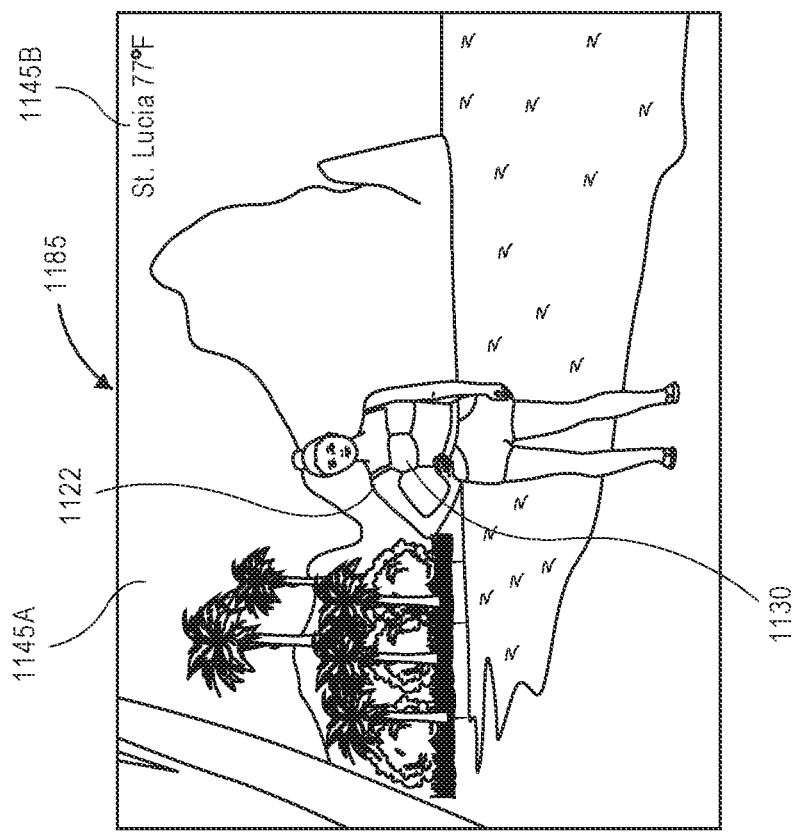

The "virtual mirrors" of the present disclosure may be rendered on traditional displays, such as is shown in FIG. 10, or in a virtual reality system, and may be shared with one or more other entities or individuals, such as friends, family members, "personal shoppers" or the like. Referring to FIGS. 11A through 11C, views of aspects of one system 1100 in accordance with embodiments of the present disclosure are shown. As is shown in FIG. 11A, the system 1100 includes a marketplace server 1112, a first computer device 1175-1 (e.g., a laptop computer or any other computer device) and a second computer device 1175-2 (e.g., a smartphone or any other computer device), that are connected to one another over a network 1190, which may include the Internet in whole or in part, via wired or wireless means. An RGBD camera 1180 and a virtual reality headset 1185 may be connected to the first computer device 1175-1 via wired or wireless means, e.g. a Bluetooth® piconet. In some embodiments, the first computer device 1175-1 is associated with the customer 1170, while the second computer device 1175-2 is associated with another entity or individual and is accessible over the network 1190.

As is shown in FIG. 11A, a customer 1170 wearing the virtual reality headset 1185 is within a field of view of the RGBD camera 1180. Depth imaging data and visual imaging data may be captured from the customer 1170 as the customer 1170 stands in one or more poses, or executes one or more gestures. Additionally, the customer 1170 may further wear one or more motion sensors (not shown) on his or her body.

As is shown in FIG. 11B, based on the depth imaging data and visual imaging data captured by the RGBD camera 1180, an avatar 1122 corresponding to the customer 1170 may be generated accordingly, and displayed to the customer 1170 on one or more displays within the virtual reality headset 1185. The avatar 1122 may be shown in a series of still or moving images as the customer 1170 stands in the one or more poses, or executes the one or more gestures within the field of view. Thus, like the display 1078 of FIG. 10, the virtual reality headset 1185 of FIG. 11B. acts as a virtual mirror for the customer 1170, and depicts how an article of clothing 1130 will appear or behave while being worn by the avatar 1122, even as the customer 1170 stands in different poses or executes different gestures.

Additionally, the virtual reality headset 1185 may further render other information or data (e.g., metadata) regarding the article of clothing 1130, including a context in which the article of clothing 1130 is intended to be worn. For example, as is shown in FIG. 11B, where the article of clothing 1130 is a bathing suit, an image 1145A of a beach environment may be rendered in a background of the avatar 1122 within the virtual reality headset 1185, while information 1145B regarding a specific location (e.g., a name and a current temperature) is also displayed within the virtual reality headset 1185.

Visual representations of articles of clothing on avatars or other three-dimensional models of customers may be shared with other entities or individuals. As is shown in FIG. 11C, the avatar 1122 may be shown with the article of clothing 1030 thereon on the second computer device 1175-2, along with an image 1145C of a beach environment or any other information or data regarding a context in which the article of clothing is intended to be worn. Additionally, as is also shown in FIG. 11C, messages 1182, 1184 may be transmitted to or from the customer 1170 regarding the article of clothing 1130. For example, the customer 1170 may type, dictate or otherwise generate the message 1182 to a friend, a family member or a personal shopper regarding the appearance of the article of clothing 1130 on the avatar 1122, and the message 1182 may be transmitted from the first computer device 1175-1 and/or the virtual reality headset 1185 to the second computer device 1175-2. An individual or entity associated with the second computer device 1175-2 may then respond in kind with the message 1184, which may be transmitted from the second computer device 1175-2 to the first computer device 1175-1 or, alternatively, to the virtual reality headset 1185.

Figure 12:
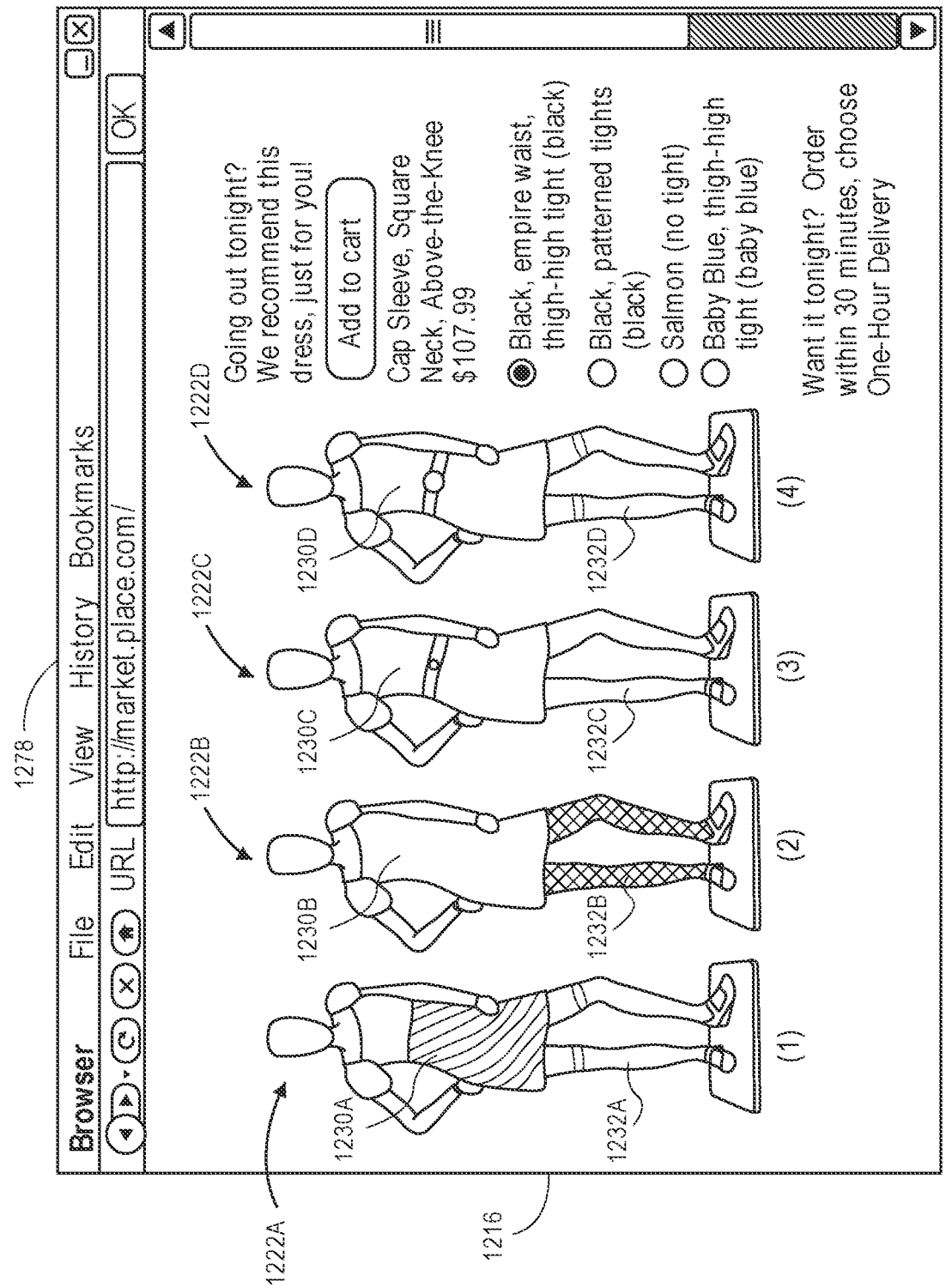
FIG. 12 is a view of one user interface in accordance with embodiments of the present disclosure.

According to some embodiments of the present disclosure, two or more avatars or other three-dimensional models of a customer may be displayed on a common user interface, either to depict the appearance and behavior of two or more articles of clothing being worn by the customer, or to show the appearance and behavior of the same article of clothing being worn by the customer from different perspectives. Referring to FIG. 12, a view of one user interface 1278 in accordance with embodiments of the present disclosure is shown. The user interface 1278 includes a network page 1216 displayed thereon. The network page 1216 shows a plurality of avatars 1222A, 1222B, 1222C, 1222D each having one or more articles of clothing shown thereon. The avatars 1222A, 1222B, 1222C, 1222D are in the form of virtual mannequins or stick figures, each of which may be generated based on any visual imaging data and/or depth imaging data that may be available regarding the customer. For example, the customer may upload a visual image of himself or herself to an electronic marketplace, and one or more dimensions of the customer (e.g., a height, shoulder width, hip width or leg length of the customer) may be determined or estimated based on the visual image. Alternatively, one or more depth images may be captured from the customer and processed to determine such dimensions. Such dimensions may be used to select a virtual mannequin or stick figure having a standard size, shape or dimensions consistent with the customer.

Additionally, each of the avatars 1222A, 1222B, 1222C, 1222D shown in FIG. 12 is depicted as having a common pose, and as wearing a different article of clothing or combination of articles. For example, the avatar 1222A is depicted as wearing a black dress with an empire waist 1230A and thigh-high black tights 1232A. The avatar 1222B is depicted as wearing a black dress 1230B with black patterned tights 1232B. The avatar 1222C is depicted as wearing a salmon-colored dress 1230C, without tights. The avatar 1222D is depicted as wearing a baby blue dress 1230D with thigh-high baby blue tights 1232D. The articles of clothing 1230A, 1232A, 1230B, 1232B, 1230C, 1230D, 1232D shown on the avatars 1222A, 1222B, 1222C, 1222D in FIG. 12 may be selected on any basis, e.g., recommendations identified generally based on seasonal or local events or occurrences, or recommendations that are specifically targeted to the customer. Additionally, the sizes of the articles of clothing 1230A, 1232A, 1230B, 1232B, 1230C, 1230D, 1232D shown on the avatars 1222A, 1222B, 1222C, 1222D may also be selected on any basis. For example, the sizes of the articles may be selected based on a purchasing history of the customer, or predicted based on any depth imaging data or visual imaging data that may be available regarding the customer, or on any other basis.

By displaying a plurality of avatars 1222A, 1222B, 1222C, 1222D corresponding to the customer, each wearing a different outfit, the network page 1216 enables the customer to view a visual representation of how each of the articles of clothing 1230A, 1232A, 1230B, 1232B, 1230C, 1230D, 1232D would appear or behave while being worn. Additionally, the network page 1216 is configured to receive interactions or selections from the customer, including one or more instructions to add one of the articles of clothing or combinations thereof to a virtual shopping cart. Alternatively, the network page 1216 may be configured to include one or more features that would enable the customer to change the articles of clothing worn by any of the avatars 1222A, 1222B, 1222C, 1222D, such as one or more of the features shown in FIGS. 8A and 8B, which would permit the customer to drag-and-drop or otherwise select one or more articles of clothing or combinations of articles for viewing on one or more of the avatars 1222A, 1222B, 1222C, 1222D accordingly.

Figure 13:
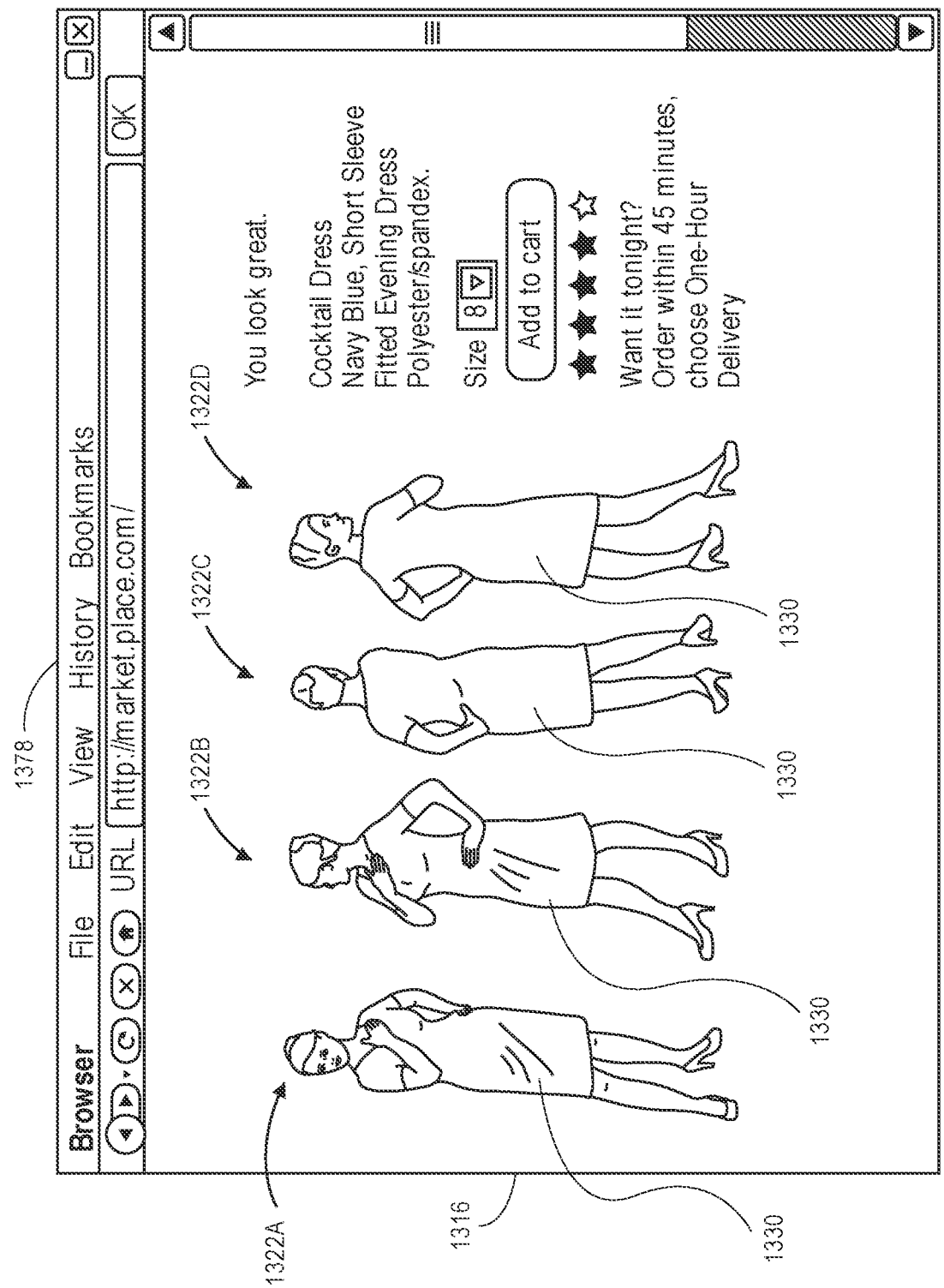
FIG. 13 is a view of one user interface in accordance with embodiments of the present disclosure.

Referring to FIG. 13, a view of one user interface 1378 in accordance with embodiments of the present disclosure is shown. The user interface 1378 includes a network page 1316 displayed thereon. The network page 1316 shows a plurality of avatars 1322A, 1322B, 1322C, 1322D of a customer, and each of the avatars 1322A, 1322B, 1322C, 1322D is shown as wearing the same dress 1330, from different perspectives. The avatars 1322A, 1322B, 1322C, 1322D may be generated based on depth imaging data and/or visual imaging data captured from the customer, and visual imaging data corresponding to external surfaces of the customer may be mapped thereon, along with visual representations of the appearance or behavior of the dress 1330 on the avatars 1322A, 1322B, 1322C, 1322D in the different perspectives. Additionally, the network page 1316 is configured to receive interactions or selections from the customer, including one or more instructions to add one of the articles of clothing or combinations thereof to a virtual shopping cart. Alternatively, the network page 1316 may be configured to include one or more features that would enable the customer to change the articles of clothing worn by any of the avatars 1322A, 1222B, 1322C, 1322D.

Figure 14:
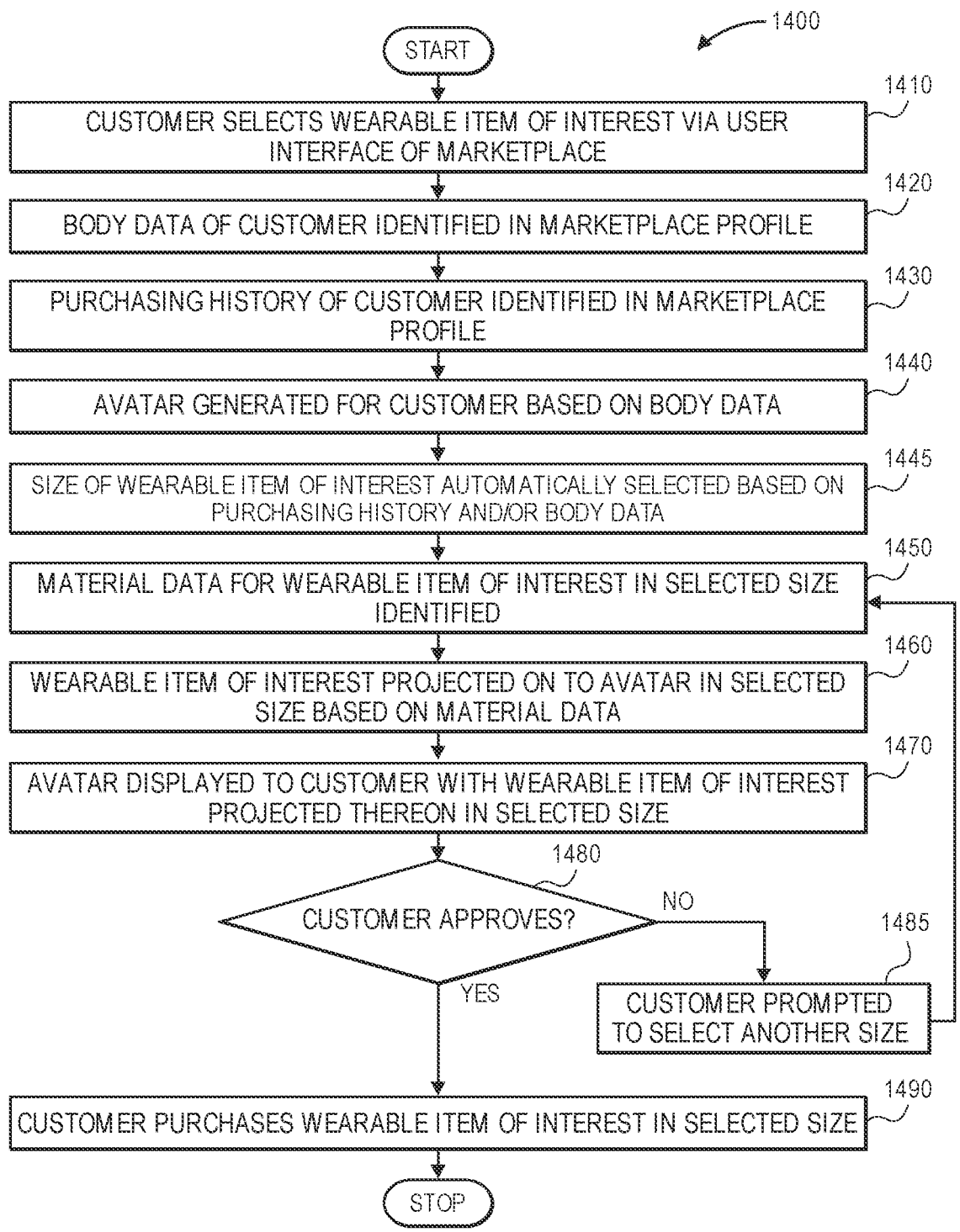
FIG. 14 is a flow chart of one process in accordance with embodiments of the present disclosure.

In some embodiments, articles of clothing may be shown to a customer in predicted sizes on avatars corresponding to the customer, thereby enabling the customer to view how the articles fit on his or her body either alone or in combination with one or more other items prior to making a purchase. Sizes of the articles may be predicted for the customer based on a depth model or any other information or data regarding the customer. Referring to FIG. 14, a flow chart 1400 of one process in accordance with embodiments of the present disclosure is shown. At box 1410, a customer selects a wearable item of interest via a user interface of a marketplace. For example, the item may be a bathing suit, a bathrobe, a belt, a bracelet, a pair of glasses, a hat, a jacket, a necklace, a necktie, a pair of pants, a parka, a scarf, a shirt, a pair of shoes, a pair of socks, a suit, a pair of suspenders, underwear, a wristwatch, or any other type or form of wearable item from a network page of the marketplace rendered by a browser operating on a computer device of the customer or, alternatively, on a page rendered by a dedicated shopping application operating on the computer device.

At box 1420, body data of the customer is identified in a profile at the marketplace, and at box 1430, a purchasing history of the customer is identified in the profile. For example, the body data may include one or more depth images or visual images previously captured from the customer or at or near a time of the selection of the wearable item of interest at box 1410. Alternatively, the profile may include a plurality of surface data generated from such depth images and/or visual images, or from any other data or source. The profile may also include information or data regarding purchases of items previously made by the customer or, alternatively or additionally, items previously considered for purchase by the customer. At box 1440, an avatar is generated for the customer based on the body data.

At 1445, a size of the wearable item of interest is automatically selected based on the body data of the customer and/or the purchasing history of the customer. For example, where a customer has an established history of purchasing pants with thirty-four inch (34") waists and thirty-two inch (32") inseams, and the customer is interested in a pair of pants in various sizes, a size of 34" 32" may be selected for the customer if the pants in which he is interested are sized by waists and inseams or, alternatively, a size of large may be recommended to the customer if the pants have nominal sizes. The size may be selected based on sizes previously purchased by the customer, trends in purchasing, or any other information or data that may be identified regarding the customer from his or her purchasing history, or from any other source.

At box 1450, material data for the wearable item of interest in the selected size is identified. For example, the material data may include sizes, shapes or dimensions of panels, sheets, stitches, seams or fasteners from which the wearable item of interest is formed, as well as any material properties of the item (e.g., tensile, compression, shear or yield strengths, coefficients of friction, Young's moduli, shear moduli, Poisson ratios, stress-strain curves, hardnesses, toughnesses), or any other information or data regarding the methods or techniques by which the item was manufactured, or known or predicted changes in the item following expected or extraordinary wear-and-tear.

At box 1460, the wearable item of interest is projected onto the avatar generated for the customer in the selected size. A visual representation of the wearable item of interest depicting its appearance and behavior during wearing and use by the customer may be mapped onto the avatar in any manner, and may be shown subject to any conditions, instructions or restrictions on the use, or any personal preferences of the customer, including but not limited to how the customer wears or uses items in a type or category of the wearable item of interest. Additionally, the avatar with the wearable item of interest mapped thereon may be shown with any lighting or other effects, and in any context. At box 1470, the avatar is displayed to the customer with the wearable item of interest projected thereon in the selected size, e.g., on a computer display, monitor, television or screen, or by a virtual reality system (e.g., a virtual reality headset).

At box 1480, whether the customer approves of the wearable item in the selected size is determined. For example, the customer may be prompted to visually evaluate the appearance of the item on the avatar and indicate whether the customer approves of the wearable item in the selected size. If the customer does not approve, the process advances to box 1485, where the customer is prompted to select another size, before returning to box 1450, where material data for the wearable item of interest in the newly selected size is identified. At box 1490, if the customer approves of the item in the selected size, the customer purchases the wearable item of interest in the selected size, and the process ends.

Figure 15:
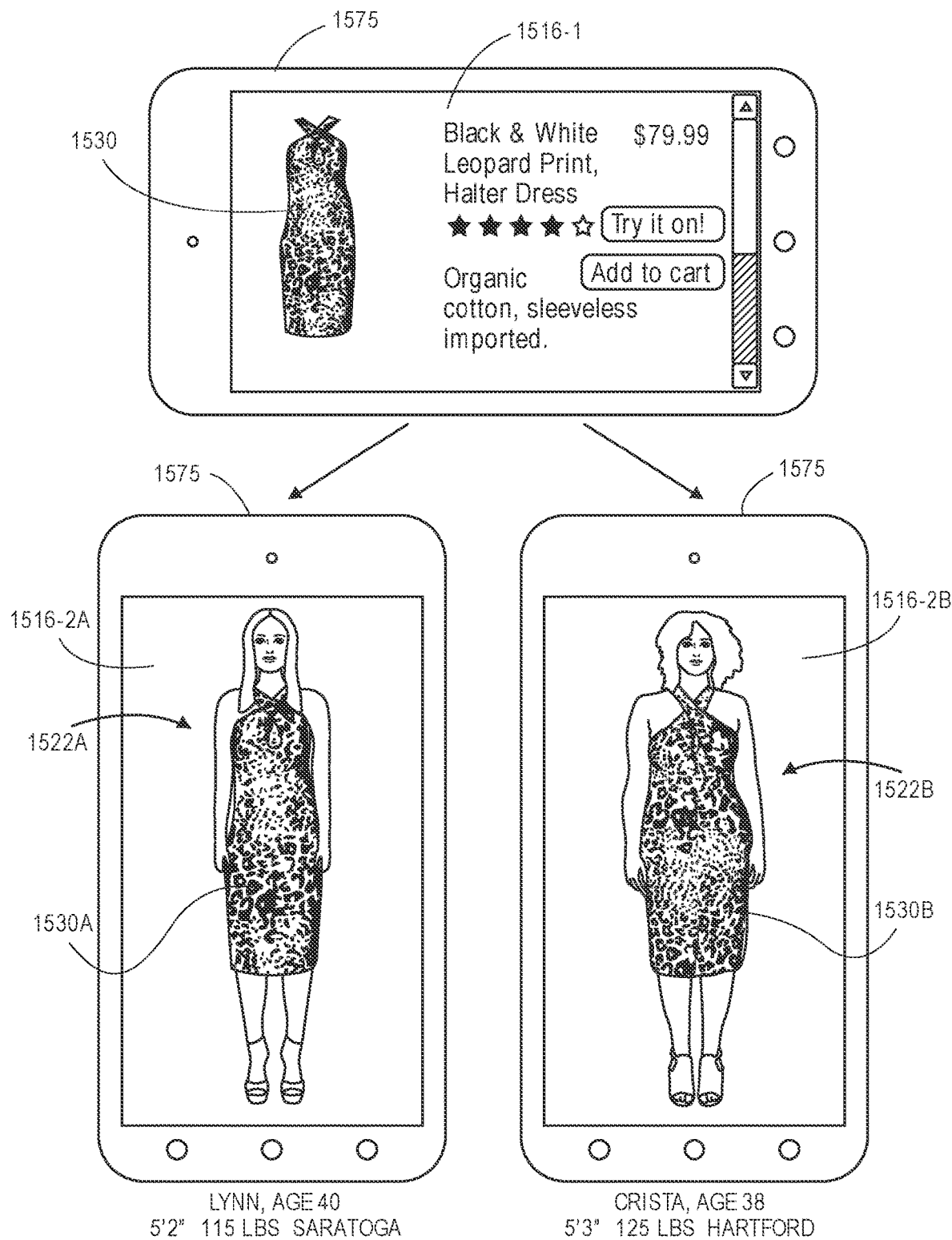
FIG. 15 is a view of aspects of one system in accordance with embodiments of the present disclosure.

One or more embodiments of the present disclosure may be configured to predict a most appropriate size of a selected article of clothing based on depth imaging data and/or visual imaging data captured from a customer, based on a purchasing history of the customer maintained in a customer profile, or on any other basis, and to display the selected article of clothing in the predicted size on an avatar or other three-dimensional model corresponding to the customer. Thus, the selection of the same item by two different customers will cause the same item to appear differently to each of the customers, depending on differences in their respective appearances. Referring to FIG. 15, a view of aspects of one system in accordance with embodiments of the present disclosure is shown.

As is shown in FIG. 15, a network page 1516-1 displayed on a mobile device 1575 features details regarding an article of clothing 1530 (e.g., a halter dress), including a name, an image, a price and a rating of the article of clothing 1530, as well as an interactive feature for adding the article of clothing 1530 to a virtual shopping cart, and an interactive feature for virtually "trying on" the article of clothing 1530, e.g., displaying a visual representation of the article of clothing 1530 on an avatar specifically generated for a given customer. The article of clothing 1530 shown in the network page 1516-1 may be shown in a generic, standard or random size or, alternatively, in a size that is selected for a given customer who is determined to be viewing the network page 1516-1, e.g., based on information or data in his or her customer profile.

For example, after a first customer requests to virtually "try on" the article of clothing 1530, an avatar 1522A is generated based on any imaging data that may be available regarding the first customer, and a virtual representation 1530A of the article of clothing 1530 in a size selected for the first customer based on his or her size, shape and dimensions is mapped onto the avatar 1522A in a manner that mimics the appearance or behavior of the article of clothing 1530 on the first customer, and displayed in a network page 1516-2A. Likewise, after a second customer requests to virtually "try on" the article of clothing 1530, an avatar 1522B is generated based on any imaging data that may be available regarding the second customer, and a virtual representation 1530B of the article of clothing 1530 in a size selected for the second customer based on his or her size, shape and dimensions is mapped onto the avatar 1522B in a manner that mimics the appearance or behavior of the article of clothing 1530 on the second customer, and displayed in a network page 1516-2B.

Figure 16A:
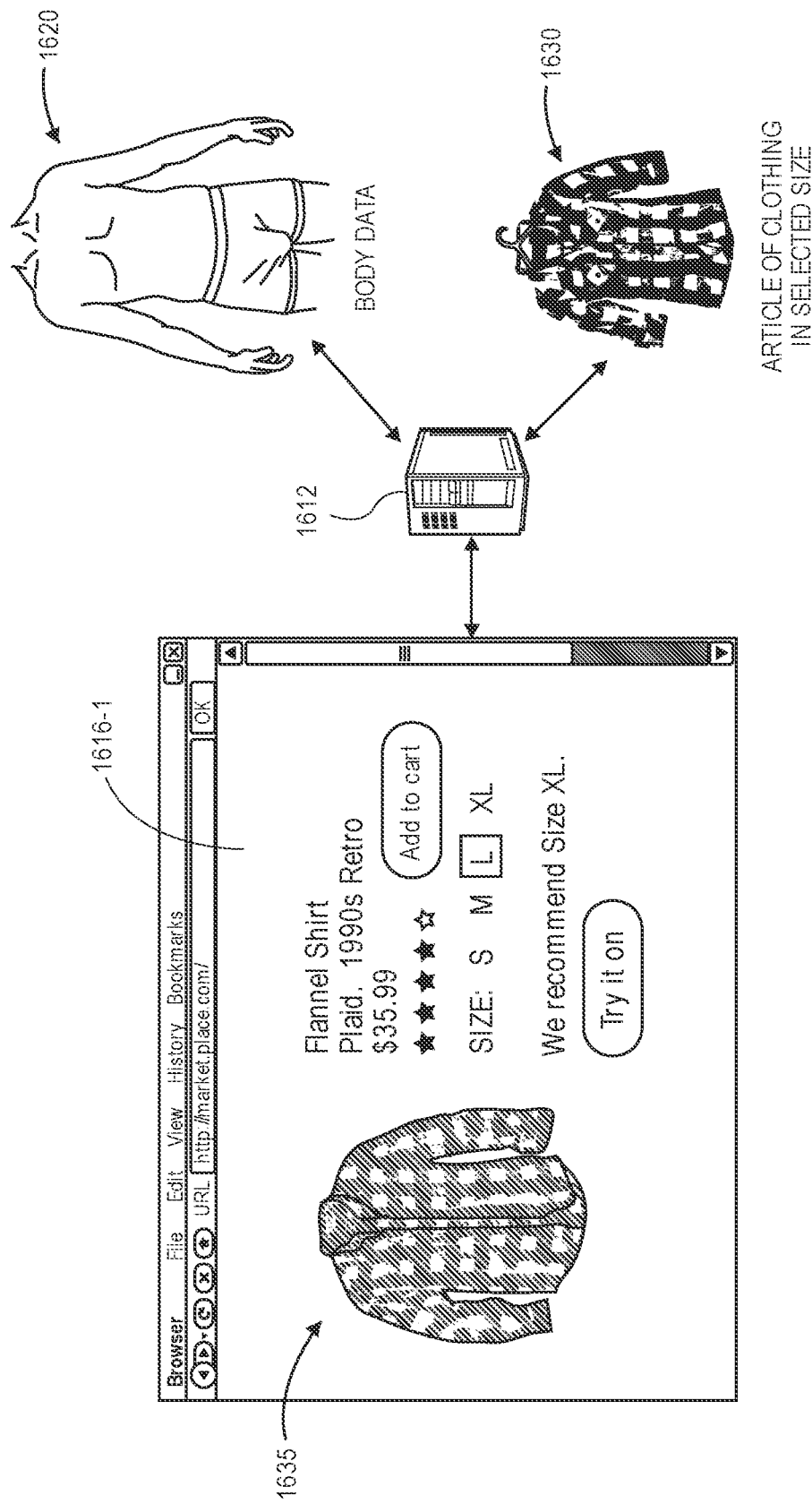
FIGS. 16A and 16B are views of aspects of one system in accordance with embodiments of the present disclosure.
Figure 16B:
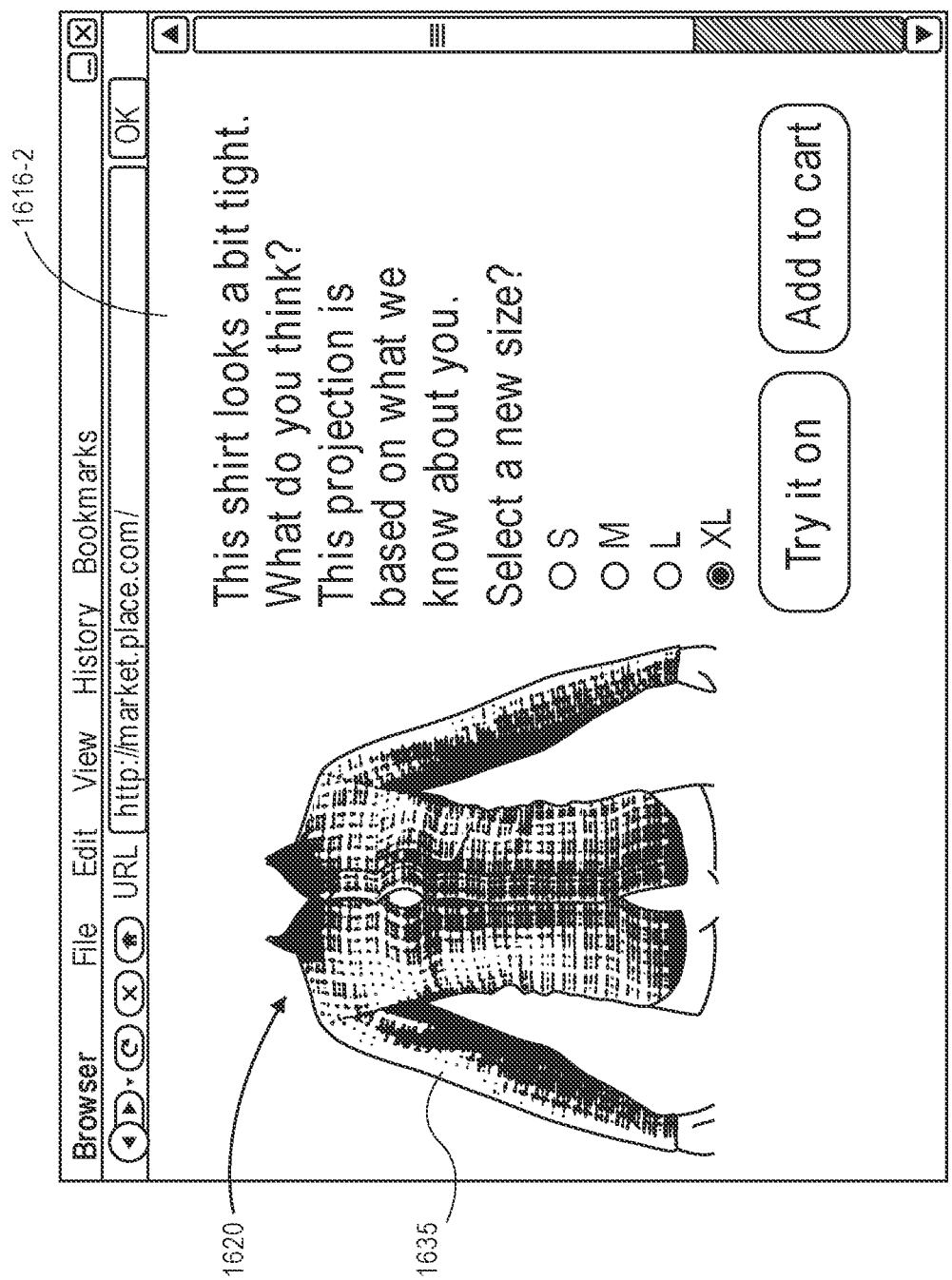

Some other embodiments of the present disclosure may be used to determine how a specific article of clothing, in a specific size, will look and fit on a given customer using an avatar or other three-dimensional model generated based on imaging data captured from the customer. Referring to FIGS. 16A and 16B, views of aspects of one system in accordance with embodiments of the present disclosure are shown. As is shown in FIG. 16A, a network page 1616-1 hosted by a marketplace server 1612 is shown. The network page 1616-1 includes a plurality of details regarding an article of clothing 1635 (e.g., a flannel shirt), including a name, an image, a price, a rating of the article of clothing 1635, along with interactive features for selecting a size of the article of clothing 1635, and for virtually "trying on" the article of clothing 1635. The network page 1616-1 further includes a recommended size of the article of clothing 1635 for a customer 1670. Additionally, the marketplace server 1612 includes body data 1620 (e.g., surface data, depth imaging data, visual imaging data, point clouds) regarding a plurality of customers, including the customer 1670, as well as material data 1630 regarding the article of clothing 1635 in one or more sizes.

As is shown in FIG. 16A, the marketplace server 1612 recommended the article of clothing 1635 in a size of extra large (or "XL") for the customer 1670, yet the customer 1670 selected a size of large (or "L"). As is shown in FIG. 16B, when the customer 1670 requests to virtually "try on" the article of clothing 1635 in the selected size, an avatar 1622 is generated for the customer 1670 based on the body data 1620, and a visual representation of the article of clothing 1635 is mapped onto the avatar 1622. A network page 1616-2 including the visual representation of the article of clothing 1635 mapped onto the avatar 1622 is displayed to the customer 1670, thereby enabling the customer 1670 to confirm that the look and fit of the article of clothing 1635 on his or her body is acceptable prior to completing a purchase of the article of clothing 1635. The network page 1616-2 also includes an indicator of the quality of fit of the article of clothing 1635 in the selected size (e.g., "This shirt looks a bit tight. What do you think?"). The quality of fit of the article of clothing 1635 in the selected size may be determined on any information or data that may be known regarding the article of clothing, including but not limited to strengths in tension, compression or shear of one or more materials from which the article of clothing 1635 was formed, as well as friction coefficients, Young's moduli, shear moduli, Poisson ratios, sizes, shapes or dimensions of such materials, which may be used to determine a likelihood that the article of clothing may be damaged by wearing or other use. As is shown in FIG. 16B, the network page 1616-2 further includes interactive features for selecting and viewing the article of clothing 1635 in another size on the avatar 1622.

Figure 17:
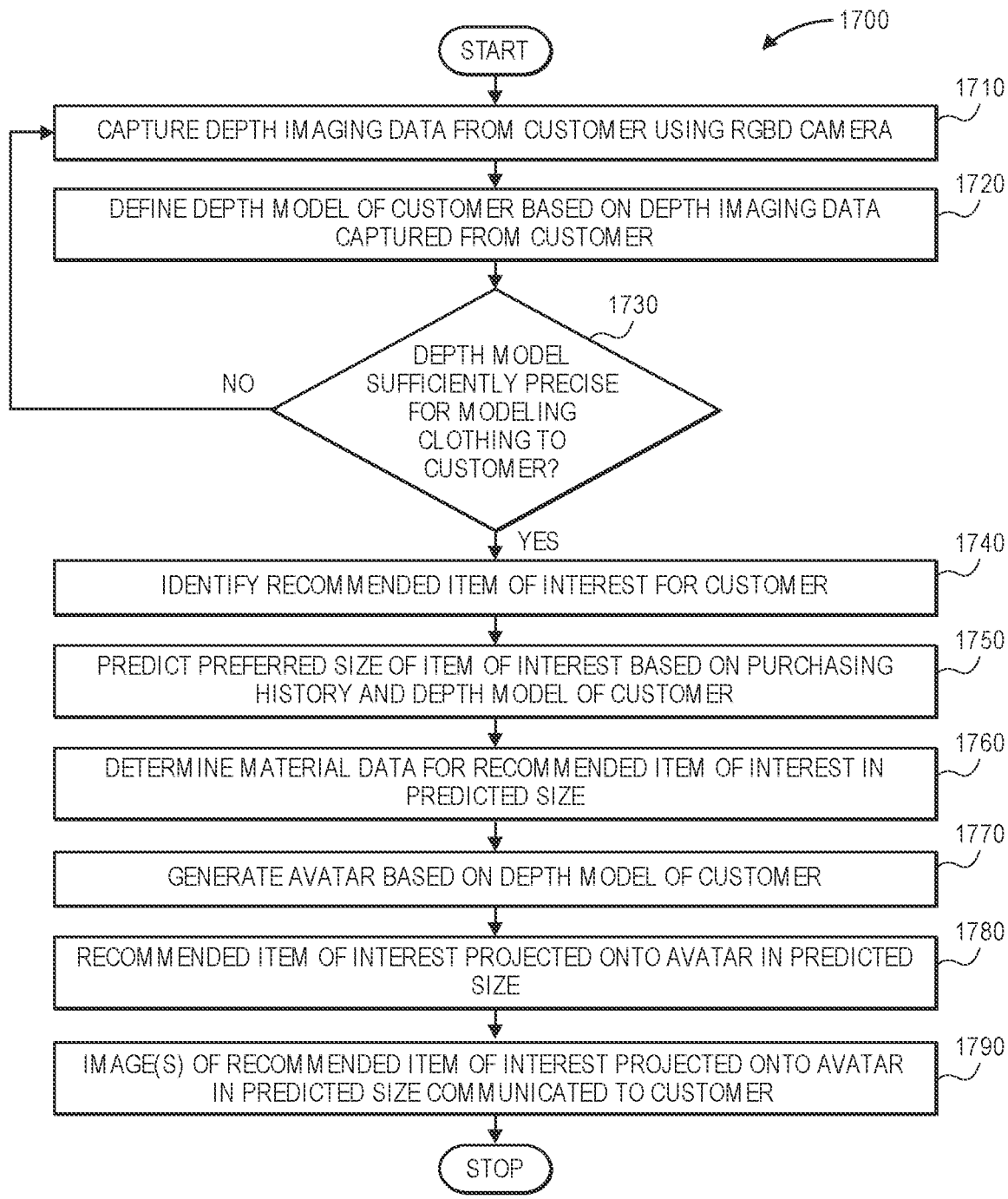
FIG. 17 is a flow chart of one process in accordance with embodiments of the present disclosure.

Once an avatar or another three-dimensional model of a customer has been defined based on imaging data (e.g., depth images and/or visual images), visual representations of the avatar or other three-dimensional model may be used for any purpose, including in print or electronic advertising of any kind. Referring to FIG. 17, a flow chart 1700 of one process in accordance with embodiments of the present disclosure is shown. At box 1710, depth imaging data is captured from a customer using an RGBD camera, and at box 1720, a depth model of the customer is defined based on the depth imaging data.

At box 1730, whether the depth model is sufficiently precise to enable modeling of the clothing by the customer is determined. If the depth model is not sufficiently precise, then the process returns to box 1710, where additional depth imaging data is captured from the customer, and where the depth model is updated based on the additional depth imaging data. Once the depth model is sufficiently precise, the process advances to box 1740, where a recommended item is identified for the customer. The recommended item may be identified on any basis. For example, the recommended item may be popular among customers having body shapes, sizes or dimensions that are similar to the shape, the size or the dimensions of the customer's body. Alternatively, the recommended item may have one or more attributes in common with items previously purchased by the customer, or by other customers who may have interests that are similar to those of the customer. The recommended item may also be based on any selections or other interactions received from the customer.

At box 1750, a preferred size of the recommended item is predicted based on the purchasing history and/or a depth model of the customer. The preferred size may be determined based on a prior history of purchasing items of the same type or category as the recommended item or based at least in part on a best fit with respect to the depth model. For example, where the customer has established a history of purchasing baggy jeans or tight shorts, the preferred size of the customer may be smaller than what might be expected in view of the depth model if the recommended item is a pair of jeans and larger than what might be expected in view of the depth model if the recommended item is a pair of shorts. At box 1760, material data for the recommended item in the predicted size is determined.

At box 1770, an avatar is generated based on the depth model of the customer. For example, where the depth model includes a point cloud, a textured mesh corresponding to the customer may be generated based on the point cloud. At box 1780, the recommended item of interest is projected onto the avatar in the predicted size, e.g., in a manner that depicts a simulated appearance or behavior of the recommended item while being worn or used by the customer. At box 1790, one or more images of the recommended item projected onto the avatar in the predicted size are communicated to the customer, and the process ends. For example, an image of the recommended item, on an avatar corresponding to the customer, may be included in a print catalog that is mailed or handed to the customer, displayed on a network page associated with an electronic marketplace from which the recommended item may be purchased, or shown on an electronic billboard or other sign at a retail establishment where the customer is believed to be located. The images may be communicated to the customer singly or in combination with one another, and in any manner. For example, a customized catalog for a hardware store may be generated with images depicting avatars corresponding to the customer using any number of hand tools or other items available at the hardware store and sent to the customer. Alternatively, avatars corresponding to the customer may be included in instructional videos, e.g., showing the customer how to properly use one or more power tools, with the avatars being depicted during the actual use of such tools.

Figure 18A:
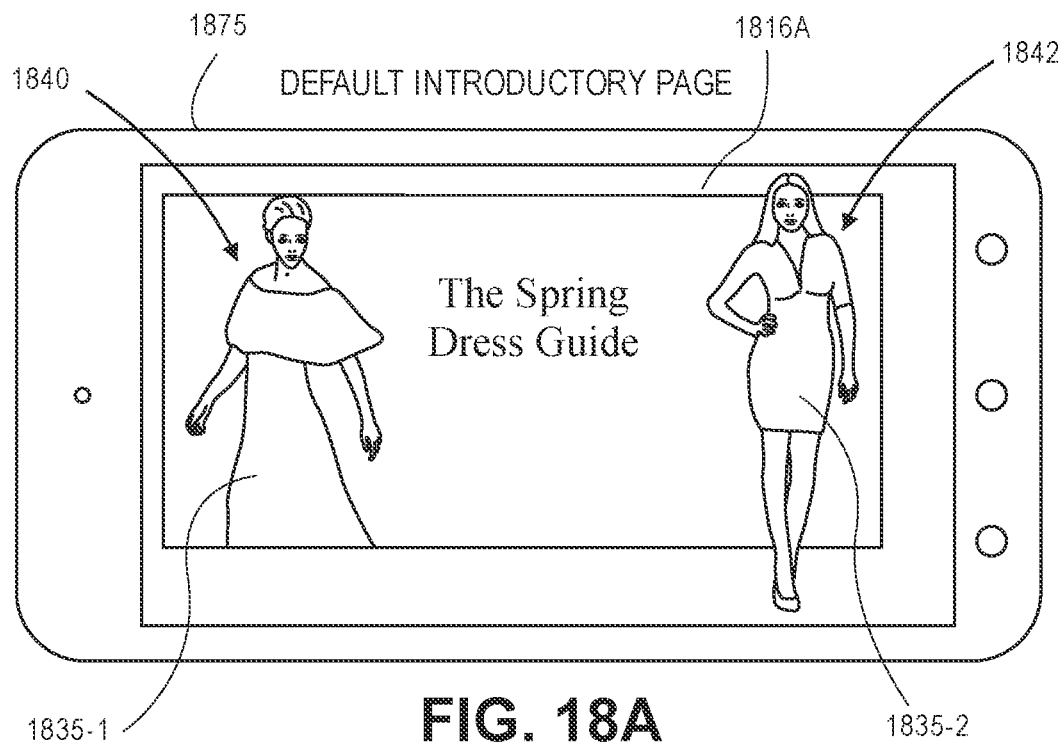
FIGS. 18A and 18B are views of user interfaces in accordance with embodiments of the present disclosure.
Figure 18B:

In some embodiments, customized electronic or print advertisements including visual representations of avatars corresponding to a customer wearing one or more articles of clothing may be displayed to the customer. Referring to FIGS. 18A and 18B, views of user interfaces in accordance with embodiments of the present disclosure are shown.

As is shown in FIG. 18A, a default introductory network page 1816A is displayed on a mobile device 1875. The network page 1816A includes a visual representation of a model 1840 wearing an article of clothing 1835-1 and a visual representation of a model 1842 wearing an article of clothing 1835-2. The network page 1816A may be displayed when an identity of a customer is unknown, or when imaging data regarding the customer is either unavailable, or is inadequate for generating an avatar of sufficiently high resolution. Alternatively, as is shown in FIG. 18B, a customized introductory network page 1816B is displayed on the mobile device 1875. The network page 1816B includes the visual representation of the model 1840 of FIG. 18A, and also includes a visual representation of an avatar 1822 of a customer wearing the article of clothing 1835-2 in a size corresponding to the size, shape and dimensions of the customer, as embodied in the avatar 1822. The network page 1816B may be displayed when the identity of the customer is known, and when imaging data regarding the customer is available and adequate for generating an avatar of sufficiently high resolution. Alternatively, the visual representations of the avatar 1822 wearing the article of clothing 1835-2 may be printed in a customized circular directed to the customer, or otherwise shown to the customer in any other manner.

It should be understood that, unless otherwise explicitly or implicitly indicated herein, any of the features, characteristics, alternatives or modifications described regarding a particular embodiment herein may also be applied, used, or incorporated with any other embodiment described herein, and that the drawings and detailed description of the present disclosure are intended to cover all modifications, equivalents and alternatives to the various embodiments as defined by the appended claims. Moreover, with respect to the one or more methods or processes of the present disclosure described herein, including but not limited to the flow charts shown in FIGS. 3A and 3B, 9A and 9B, 14 or 17, orders in which such methods or processes are presented are not intended to be construed as any limitation on the claimed inventions, and any number of the method or process steps or boxes described herein can be combined in any order and/or in parallel to implement the methods or processes described herein. Additionally, it should be appreciated that the detailed description is set forth with reference to the accompanying drawings, which are not drawn to scale. In the drawings, the use of the same or similar reference numbers in different figures indicates the same or similar items or features. Except where otherwise noted, one or more left-most digit(s) of a reference number identify a figure or figures in which the reference number first appears, while two right-most digits of a reference number in a figure indicate a component or a feature that is similar to components or features having reference numbers with the same two right-most digits in other figures.

Conditional language, such as, among others, "can," "could," "might," or "may," unless specifically stated otherwise, or otherwise understood within the context as used, is generally intended to convey in a permissive manner that certain embodiments could include, or have the potential to include, but do not mandate or require, certain features, elements and/or steps. In a similar manner, terms such as "include," "including" and "includes" are generally intended to mean "including, but not limited to." Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

The elements of a method, process, or algorithm described in connection with the embodiments disclosed herein can be embodied directly in hardware, in a software module stored in one or more memory devices and executed by one or more processors, or in a combination of the two. A software module can reside in RAM, flash memory, ROM, EPROM, EEPROM, registers, a hard disk, a removable disk, a CD-ROM, a DVD-ROM or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile. The processor and the storage medium can reside in an ASIC. The ASIC can reside in a user terminal. In the alternative, the processor and the storage medium can reside as discrete components in a user terminal.

Disjunctive language such as the phrase "at least one of X, Y, or Z," or "at least one of X, Y and Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

Although the invention has been described and illustrated with respect to illustrative embodiments thereof, the foregoing and various other additions and omissions may be made therein and thereto without departing from the spirit and scope of the present disclosure.

What is claimed is:

1. A method comprising:
receiving, by a computer system associated with an electronic marketplace, first information regarding a customer from a mobile device of the customer over a network, wherein the first information comprises:
  imaging data captured by the mobile device, wherein at least a portion of the imaging data depicts at least a portion of the customer;
  a height of the customer, wherein the height is entered into the mobile device by the customer; and
  a weight of the customer, wherein the weight is entered into the mobile device by the customer;
generating, by the computer system, a three-dimensional model of the customer based at least in part on the information regarding the customer received from the mobile device;
receiving, by the computer system, second information identifying a selection of a first article of clothing from the mobile device over the network, wherein the first article of clothing is adapted to be worn about a first portion of a human body;
receiving, by the computer system, third information identifying a selection of a second article of clothing from the mobile device over the network, wherein the second article of clothing is adapted to be worn about a second portion of a human body;
identifying, by the computer system, first material data regarding the first article of clothing, wherein the first material data comprises a tensile property of the at least one component of the first article of clothing and at least one of:
  a dimension of the at least one component of the first article of clothing; or
  a color of the at least one component of the first article of clothing;
identifying, by the computer system, second material data regarding the second article of clothing, wherein the second material data comprises a tensile property of the at least one component of the second article of clothing and at least one of:
  a dimension of the at least one component of the second article of clothing; or
  a color of the at least one component of the second article of clothing;
generating, by the computer system, a first predicted image of a first appearance of the customer wearing at least the first article of clothing and the second article of clothing in a first pose based at least in part on the three-dimensional model, the first material data and the second material data, wherein the first pose is at a first angle of orientation with respect to a vertical axis;
generating, by the computer system, a second predicted image of a second appearance of the customer wearing at least the first article of clothing and the second article of clothing in a second pose based at least in part on the three-dimensional model, the first material data and the second material data, wherein the second pose is at a second angle of orientation with respect to the vertical axis, and wherein the second angle of orientation is different from the first angle of orientation;
generating, by the computer system, code for displaying a page comprising the first predicted image and the second predicted image on a display of the mobile device; and transmitting, by the computer system, fourth information to the mobile device over the network, wherein the fourth information comprises the code.

2. The method of claim 1, wherein the imaging data comprises:
a first visual image captured with the customer facing a lens of a camera of the mobile device, and
a second visual image captured with the customer facing perpendicular to the lens of the camera of the mobile device.

3. The method of claim 1, wherein the imaging data comprises:
a plurality of depth images captured by the mobile device, wherein at least two of the plurality of depth images are captured with the customer at a different angle of orientation with respect to the vertical axis.

4. The method of claim 1, wherein the first article of clothing is one of a bracelet, a coat, a hat, a jacket, a shirt, a sweater, or an upper portion of a bathing suit, and
wherein the second article of clothing is one of a lower portion of the bathing suit, a pair of pants, a skirt, a stocking, or a shoe.

5. A method comprising:
receiving, from a first computer, first information regarding a customer, wherein the first computer is associated with the customer, and wherein the first information comprises:
a height of the customer;
a weight of the customer; and
imaging data depicting at least a portion of the customer;
generating, by a second computer, a three-dimensional model of the customer based at least in part on the first information;
receiving, from the first computer, second information regarding a first item, wherein the first item is configured for wearing about at least a first portion of a human body, and wherein the second information comprises:
a selection of a first category of items, wherein the first item is one of the first category of items; and
a selection of an attribute of at least a portion of the first item;
determining, by the second computer, first material data regarding a first component of the first item based at least in part on the second information, wherein the first material data comprises a tensile property of the first component and a dimension of the first component;
generating, by the second computer, a first predicted image of a first appearance of the customer wearing at least the first item in a first pose based at least in part on the three-dimensional model and the first material data, wherein the first pose is at a first angle of orientation with respect to a vertical axis;
generating, by the second computer, a second predicted image of a second appearance of the customer in a second pose based at least in part on the three-dimensional model, wherein the second pose is at a second angle of orientation with respect to the vertical axis;
generating, by the second computer, code for causing a display of at least the first predicted image and the second predicted image; and
causing a display of at least the first predicted image and the second predicted image on at least one display based at least in part on the code.

6. The method of claim 5, wherein the first computer is a mobile device associated with the customer, and
wherein the imaging data comprises at least a first depth image captured by the mobile device with the customer in a third pose and a second depth image captured by the mobile device with the customer in a fourth pose,
wherein the third pose is at a third angle of orientation with respect to the vertical axis, and
wherein the fourth pose is at a fourth angle of orientation with respect to the vertical axis.

7. The method of claim 5, wherein the imaging data comprises at least a first visual image captured with the customer in a third pose and a second visual image captured with the customer in a fourth pose,
wherein the third pose is at a third angle of orientation with respect to the vertical axis, and
wherein the fourth pose is at a fourth angle of orientation with respect to the vertical axis.

8. The method of claim 5, wherein causing the display of at least the first predicted image and the second predicted image on the at least one display based at least in part on the code comprises:
causing a display of a user interface on a display of the first computer, wherein the user interface comprises:
a first section for displaying at least the first predicted image; and
a second section adjacent the first section, wherein the second section comprises at least one selector for receiving the selection of the attribute.

9. The method of claim 8, wherein the attribute of at least the portion of the first item is one of:
a color of at least the portion of the first item;
a fabric from which at least the portion of the first item is formed;
a name of the first item; or
a size of at least the portion of the first item.

10. The method of claim 5, wherein the at least one display comprises at least one of:
a display of the first computer;
a display of a third computer, wherein the third computer is associated with at least one person other than the customer;
a display provided on a first location on a floor surface, wherein the imaging data was captured with the customer on a second location on the floor surface;
a display mounted to a wall; or
a display within a headset.

11. The method of claim 5, wherein the first information comprises a selection of the first item, and
wherein the method further comprises:
receiving, from the first computer, third information regarding a second item, wherein the second item is configured for wearing about at least the first portion of a human body, and wherein the second item is one of the first category of items; and
determining, by the second computer, second material data regarding a second component of the second item based at least in part on the third information, wherein the second material data comprises a tensile property of the second component and a dimension of the second component,
wherein generating the second predicted image comprises:
generating, by the second computer, the second predicted image of the first appearance of the customer wearing at least the second item in the second pose based at least in part on the three-dimensional model and the second material data.

12. The method of claim 5, further comprising:
receiving, from the first computer, third information regarding a second item, wherein the second item is configured for wearing about at least a second portion of a human body, and wherein the third information comprises:
   a selection of a second category of items, wherein the second item is one of the second category of items; and
   a selection of an attribute of at least a portion of the second item;
determining, by the second computer, second material data regarding a second component of the second item based at least in part on the third information, wherein the second material data comprises a tensile property of the second component and a dimension of the second component,
wherein generating the first predicted image comprises:
   generating, by the second computer, the first predicted image of the first appearance of the customer wearing at least the first item and the second item in the first pose based at least in part on the three-dimensional model, the first material data and the second material data, and
wherein generating the second predicted image comprises:
   generating, by the second computer, the second predicted image of the first appearance of the customer wearing at least the first item and the second item in the second pose based at least in part on the three-dimensional model, the first material data and the second material data.

13. The method of claim 5, wherein the attribute of at least the portion of the first item is a first size of the first item, wherein the method further comprises:
   identifying, based at least in part on the three-dimensional model and the first material data, a second size of the first item; and
   causing a display of third information on the at least one display, wherein the third information identifies the second size of the first item.

14. The method of claim 5, wherein the first item is a shirt configured for wearing about at least a portion of a torso of the human body.

15. A method comprising:
identifying, by a computer system associated with an electronic marketplace, a profile of a customer stored in at least one data store, wherein the profile comprises:
   a height of the customer; and
   a weight of the customer;
receiving, by the computer system from a mobile device associated with the customer, imaging data depicting at least a portion of the customer;
generating, by the computer system, a three-dimensional model of the customer based at least in part on the height of the customer, the weight of the customer, and the imaging data depicting at least the portion of the customer;
receiving, by the computer system from the mobile device, a selection of a first category of items, wherein each of the first category of items is configured to be worn about at least a first portion of a human body; and
receiving, by the computer system from the mobile device, a selection of an attribute of at least a portion of a first item in the first category of items;
determining, by the computer system, first material data regarding a first component of the first item based at least in part on the second information, wherein the first material data comprises a tensile property of the first component and a dimension of the first component;
generating, by the computer system based at least in part on the three-dimensional model, the first material data and the attribute, a visual representation comprising:
   a first predicted image depicting a first appearance of the customer wearing at least the first item in a first pose, wherein the first pose is at a first angle of orientation with respect to a vertical axis;
   a second predicted image depicting a second appearance of the customer wearing at least the first item in a second pose, wherein the second pose is at a second angle of orientation with respect to the vertical axis;
generating, by the computer system, code for displaying a page comprising the visual representation on at least one computer display; and
transmitting, by the computer system to the mobile device, the code for the displaying the page.

16. The method of claim 15, further comprising:
receiving, by the computer system from the mobile device, information identifying the height of the customer and the weight of the customer; and
storing, by the computer system, the information identifying the height of the customer and the weight of the customer in the profile of the customer.

17. The method of claim 15, wherein the imaging data comprises:
   a first visual image captured with the customer facing a lens of a camera of the mobile device, and
   a second visual image captured with the customer facing perpendicular to the lens of the camera of the mobile device.

18. The method of claim 15, further comprising:
determining, by the computer system, second material data regarding a second component of a second item, wherein the second item is one of a second category of items,
   wherein each of the second category of items is configured to be worn about at least a second portion of the human body,
   wherein the first predicted image depicts the first appearance of the customer wearing at least the first item and the second item in the first pose, and
   wherein the second predicted image depicts the second appearance of the customer wearing at least the first item and the second item in the second pose.

19. A method comprising:
identifying, by a first computer system associated with an electronic marketplace, a profile of a customer stored in at least one data store, wherein the profile comprises:
   a height of the customer; and
   a weight of the customer;
receiving, by the first computer system from a second computer system associated with the customer, imaging data depicting at least a portion of the customer;
generating, by the first computer system, a three-dimensional model of the customer based at least in part on the height of the customer, the weight of the customer, and the imaging data depicting at least the portion of the customer;
receiving, by the first computer system from the second computer system, a selection of a first category of items, wherein each of the first category of items is configured to be worn about at least a first portion of a human body; and receiving, by the first computer system from the second computer system, a selection of an attribute of at least a portion of a first item in the first category of items;

determining, by the first computer system, first material data regarding a first component of the first item based at least in part on the second information, wherein the first material data comprises a tensile property of the first component and a dimension of the first component;

generating, by the first computer system based at least in part on the three-dimensional model, the first material data and the attribute, a visual representation comprising:

a first predicted image depicting a first appearance of the customer wearing at least the first item in a first pose, wherein the first pose is at a first angle of orientation with respect to a vertical axis;

a second predicted image depicting a second appearance of the customer wearing at least the first item in a second pose, wherein the second pose is at a second angle of orientation with respect to the vertical axis;

causing, by the first computer system, at least the visual representation to be printed on at least one advertisement; and causing the at least one advertisement to be delivered to a location associated with the customer.

20. The method of claim 19, wherein the imaging data comprises:

a first visual image captured with the customer facing a lens of a camera, and a second visual image captured with the customer facing perpendicular to the lens of the camera.

\* \* \* \* \*